US012701619B2

(12) United States Patent
Ardah et al.

(10) Patent No.: US 12,701,619 B2
(45) Date of Patent: Aug. 4, 2026

(54) BEAM FREQUENCY EFFECTIVE REGIONS FOR INITIAL ACCESS

(71) Applicant: Lenovo (United States) Inc., Morrisville, NC (US)

(72) Inventors: Khaled Nafez Rauf Ardah, Ilmenau (DE); Karthikeyan Ganesan, Kronberg im Taunus (DE)

(73) Assignee: Lenovo (United States) Inc., Morrisville, NC (US)

( * ) Notice: Subject to any disclaimer, the term of this patent is extended or adjusted under 35 U.S.C. 154(b) by 0 days.

(21) Appl. No.: 18/885,537

(22) Filed: Sep. 13, 2024

(65) Prior Publication Data

US 2026/0082425 A1     Mar. 19, 2026

(51) Int. Cl.
    *H04W 74/0833*     (2024.01)
    *H04B 7/0426*     (2017.01)
    *H04W 56/00*     (2009.01)
(52) U.S. Cl.
    CPC ........ *H04W 74/0833* (2013.01); *H04B 7/043* (2013.01); *H04W 56/0035* (2013.01)
(58) Field of Classification Search
    CPC .......... H04W 74/0833; H04W 56/0035; H04B 7/043
    See application file for complete search history.

(56) References Cited

U.S. PATENT DOCUMENTS

2021/0127429 A1*    4/2021  Huang .............. H04W 74/0833
2022/0361253 A1    11/2022  Taherzadeh et al.
2023/0032007 A1*    2/2023  Ali ....................... H04B 7/0639

OTHER PUBLICATIONS

3GPP, "3rd Generation Partnership Project; Technical Specification Group Radio Access Network; Physical layer procedures for shared spectrum channel access (Release 18)", 3GPP TS 37.213 V18.3.0, Jun. 2024, pp. 1-49.
3GPP, "3rd Generation Partnership Project; Technical Specification Group Radio Access Network; NR; Base Station (BS) radio transmission and reception (Release 18)", 3GPP TS 38.104 V18.6.0, Jun. 2024, pp. 1-413.
3GPP, "3rd Generation Partnership Project; Technical Specification Group Radio Access Network; NR; Physical channels and modulation (Release 18)", 3GPP TS 38.211 V18.3.0, Jun. 2024, pp. 1-165.

(Continued)

*Primary Examiner* — Sung S Ahn
(74) *Attorney, Agent, or Firm* — Kunzler Needham & Hilton

(57)     ABSTRACT
Various aspects of the present disclosure relate to transmitting a plurality of SSB bursts within each of a plurality of beam frequency effective regions, each SSB burst comprising a plurality of SSBs. Aspects of the present disclosure relate to associating a RACH occasion with each beam frequency effective region of an SSB transmission based at least in part on the frequency region configuration. Aspects of the present disclosure relate to receiving a PRACH transmission from a UE, and determining a respective beam frequency effective region associated with the UE based on a PRACH configuration and the PRACH transmission. Aspects of the present disclosure relate to establishing a connection with the UE using resources associated with the respective beam frequency effective region.

20 Claims, 27 Drawing Sheets

(56)                   References Cited

OTHER PUBLICATIONS

3GPP, "3rd Generation Partnership Project; Technical Specification Group Radio Access Network; NR; Physical layer procedures for control (Release 18)", 3GPP TS 38.213 V18.3.0, Jun. 2024, pp. 1-306.
3GPP, "3rd Generation Partnership Project; Technical Specification Group Radio Access Network; NR; Radio Resource Control (RRC) protocol specification (Release 18)", 3GPP TS 38.331 V18.2.0, pp. 1-1686.

* cited by examiner

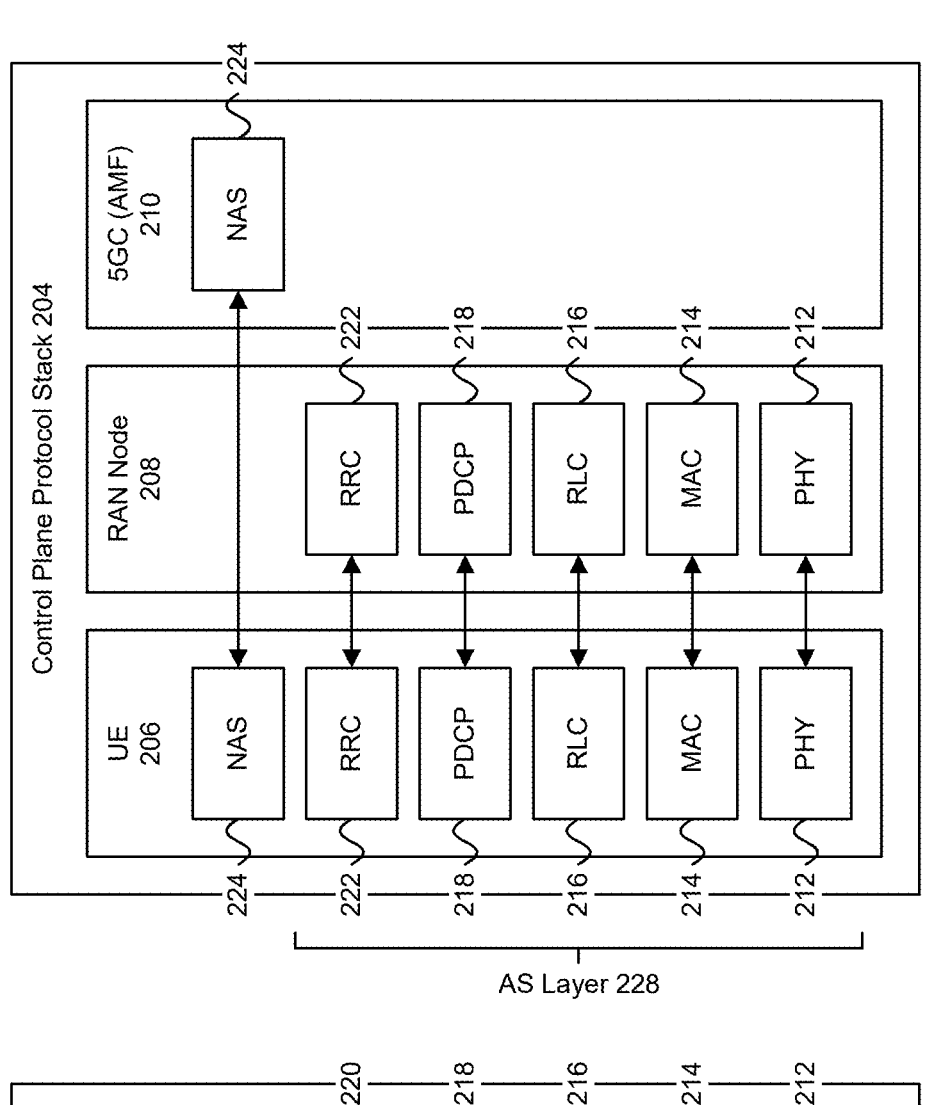
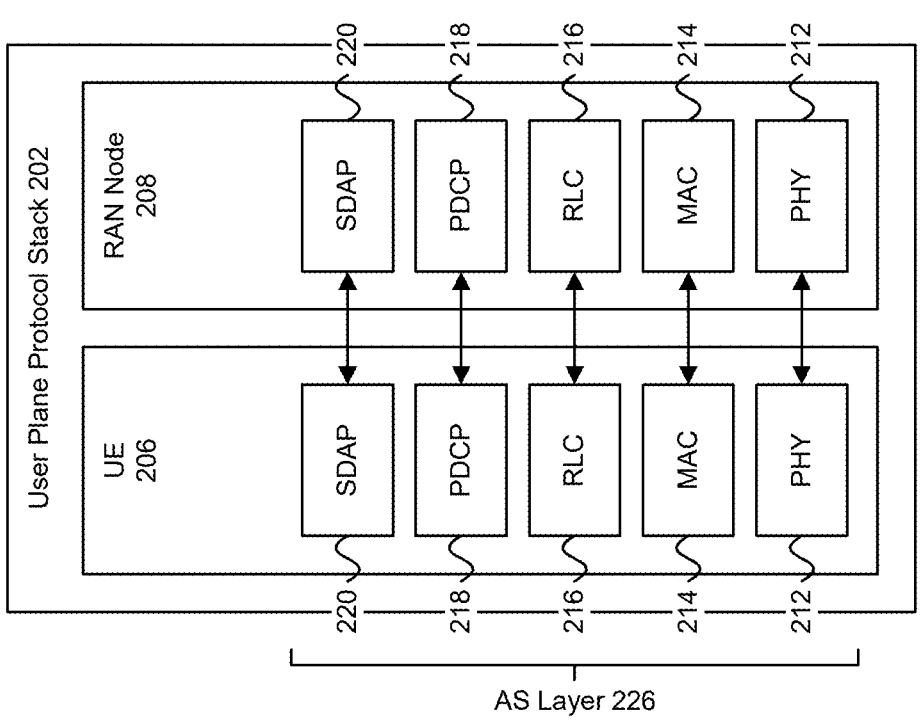
FIG. 2

300

```
-- ASN1START
-- TAG-RACH-CONFIGGENERIC-START

RACH-ConfigGeneric ::=          SEQUENCE {
    prach-ConfigurationIndex        INTEGER (0..255),
    msg1-FDM                        ENUMERATED {one, two, four, eight},
    msg1-FrequencyStart             INTEGER (0..maxNrofPhysicalResourceBlocks-1),
    ...
}

-- TAG-RACH-CONFIGGENERIC-STOP
-- ASN1STOP
```

FIG. 18

```
-- ASN1START
-- TAG-RACH-CONFIGCOMMON-START

RACH-ConfigCommon ::=                    SEQUENCE {
    rach-ConfigGeneric                   RACH-ConfigGeneric,
    totalNumberOfRA-Preambles            INTEGER (1..63)                OPTIONAL,    -- Need S
    ssb-perRACH-OccasionAndCB-PreamblesPerSSB    CHOICE {
        oneEighth ENUMERATED {n4,n8,n12,n16,n20,n24,n28,n32,n36,n40,n44,n48,n52,n56,n60,n64},
        oneFourth ENUMERATED {n4,n8,n12,n16,n20,n24,n28,n32,n36,n40,n44,n48,n52,n56,n60,n64},
        oneHalf   ENUMERATED {n4,n8,n12,n16,n20,n24,n28,n32,n36,n40,n44,n48,n52,n56,n60,n64},
        one       ENUMERATED {n4,n8,n12,n16,n20,n24,n28,n32,n36,n40,n44,n48,n52,n56,n60,n64},
        two       ENUMERATED {n4,n8,n12,n16,n20,n24,n28,n32},
        four      INTEGER (1..16),
        eight     INTEGER (1..8),
        sixteen   INTEGER (1..4)
    }
    OPTIONAL,    -- Need M
```

FIG. 19

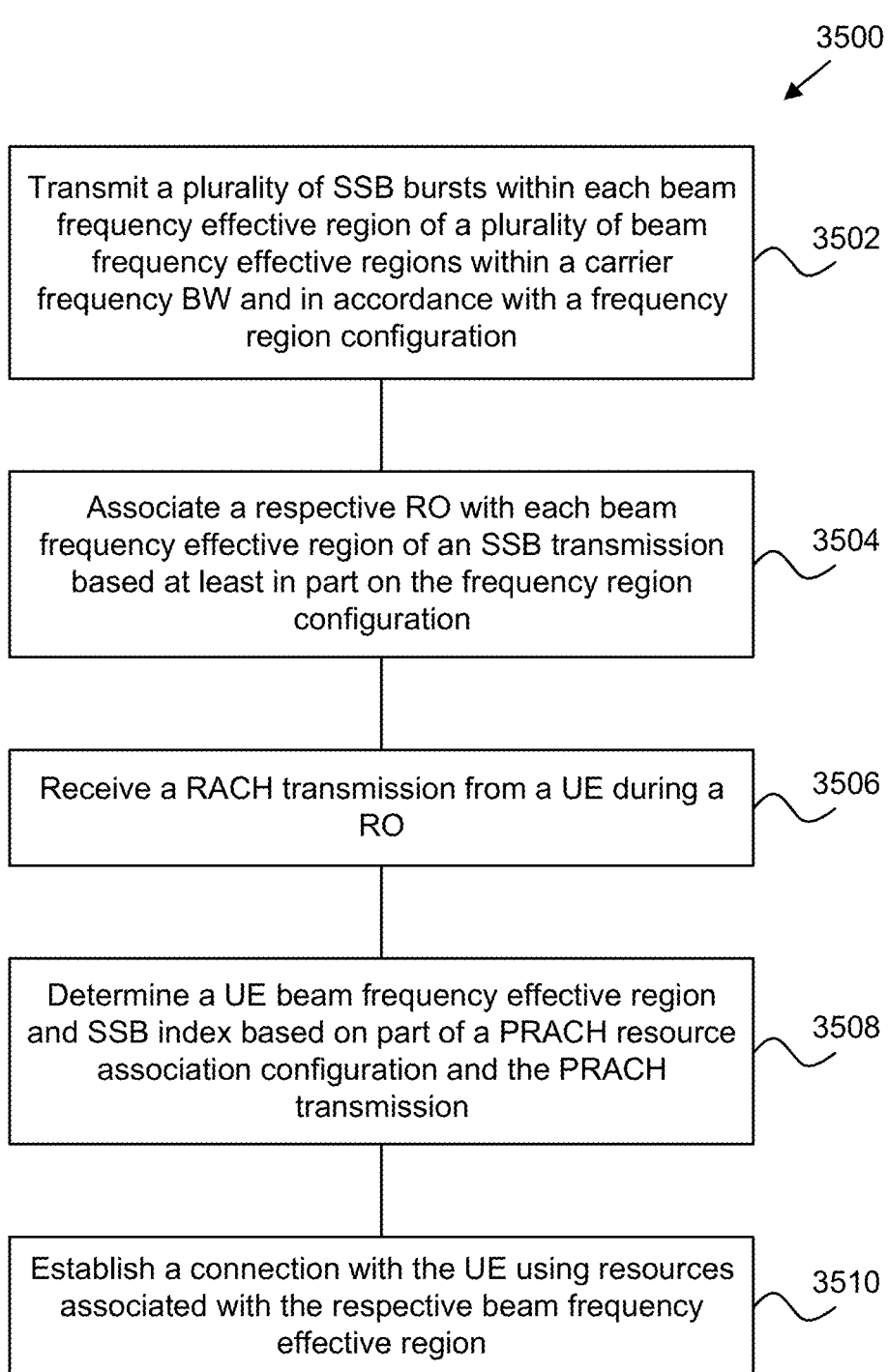

3500

Transmit a plurality of SSB bursts within each beam frequency effective region of a plurality of beam frequency effective regions within a carrier frequency BW and in accordance with a frequency region configuration — 3502

Associate a respective RO with each beam frequency effective region of an SSB transmission based at least in part on the frequency region configuration — 3504

Receive a RACH transmission from a UE during a RO — 3506

Determine a UE beam frequency effective region and SSB index based on part of a PRACH resource association configuration and the PRACH transmission — 3508

Establish a connection with the UE using resources associated with the respective beam frequency effective region — 3510

FIG. 35

BEAM FREQUENCY EFFECTIVE REGIONS FOR INITIAL ACCESS

TECHNICAL FIELD

The present disclosure relates to wireless communications, and more specifically to techniques for configuring a set of beam frequency effective regions for initial access.

BACKGROUND

A wireless communications system may include one or multiple network communication devices, such as base stations, which may support wireless communications for one or multiple user communication devices, which may be otherwise known as user equipment (UE), or other suitable terminology. The wireless communications system may support wireless communications with one or multiple user communication devices by utilizing resources of the wireless communication system (e.g., time resources (e.g., symbols, slots, subframes, frames, or the like) or frequency resources (e.g., subcarriers, carriers, or the like)). Additionally, the wireless communications system may support wireless communications across various radio access technologies including third generation (3G) radio access technology, fourth generation (4G) radio access technology, fifth generation (5G) radio access technology, among other suitable radio access technologies beyond 5G (e.g., sixth generation (6G)).

SUMMARY

An article "a" before an element is unrestricted and understood to refer to "at least one" of those elements or "one or more" of those elements. The terms "a," "at least one," "one or more," and "at least one of one or more" may be interchangeable. As used herein, including in the claims, "or" as used in a list of items (e.g., a list of items prefaced by a phrase such as "at least one of" or "one or more of" or "one or both of) indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Further, as used herein, including in the claims, a "set" may include one or more elements.

Some implementations of the method and apparatuses described herein may. transmit a plurality of synchronization signal block (SSB) bursts within each beam frequency effective region of a plurality of beam frequency effective regions within a carrier frequency bandwidth (BW) and in accordance with a frequency region configuration, wherein each SSB burst comprises a plurality of SSBs, wherein a number of the plurality of beam frequency effective regions is based at least in part on a width of each beam frequency effective region. In certain implementations, the method and apparatuses described herein may associate a respective random access channel (RACH) occasion (RO) with each beam frequency effective region of an SSB transmission based at least in part on the frequency region configuration. In certain implementations, the method and apparatuses described herein may receive a physical random access channel (PRACH) transmission from a UE during an RO, and determine a respective beam frequency effective region associated with the UE based on a PRACH configuration and the PRACH transmission. In certain implementations, the method and apparatuses described herein may establish a connection with the UE using resources associated with the respective beam frequency effective region.

BRIEF DESCRIPTION OF THE DRAWINGS

FIG. 2 illustrates an example of a protocol stack in accordance with aspects of the present disclosure.

FIG. 18 illustrates an example of a RACH-ConfigGeneric information element (IE) in accordance with aspects of the present disclosure.

FIG. 19 illustrates an example of a RACH-ConfigCommon IE in accordance with aspects of the present disclosure.

FIG. 35 illustrates a flowchart of a method performed by a NE in accordance with aspects of the present disclosure.

DETAILED DESCRIPTION

Figure 1:
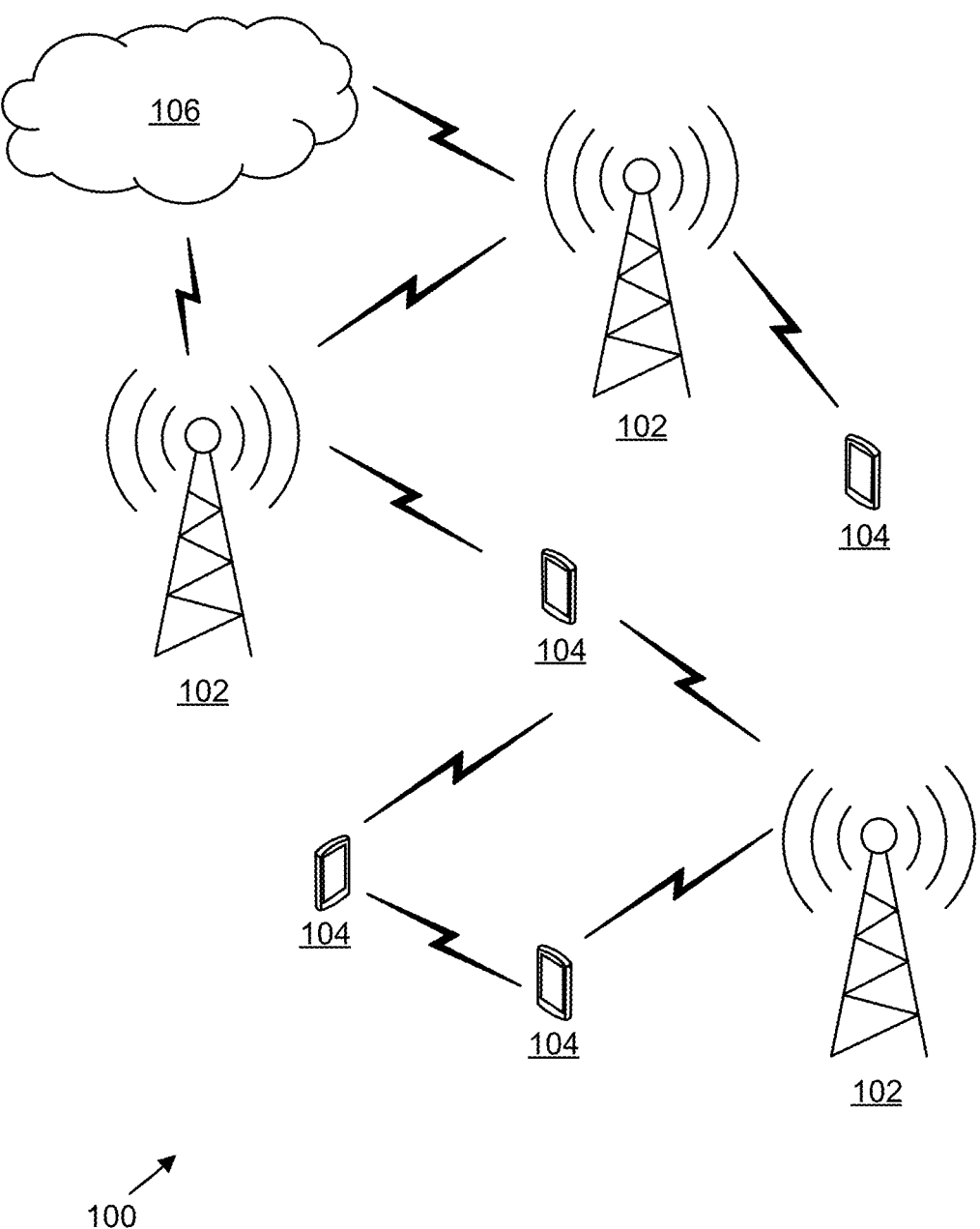
FIG. 1 illustrates an example of a wireless communications system in accordance with aspects of the present disclosure.

In a wireless communications system, one or more of NE and UE may perform wireless communication (e.g., downlink communication, uplink communication) over various frequency ranges. Wireless communications at high frequencies (e.g., 6 GHz and beyond) may support for wider carrier bandwidths (e.g., a range of frequencies for wireless communication). Additionally, wireless communications at high frequencies may facilitate more complex modulation and coding scheme (MCS), thereby increasing the data rate.

Accordingly, it may be desirable for future wireless communication systems to support wireless communications at the high frequencies.

In some wireless communication systems, such as 5G systems, a base station (e.g., a gNB) may support multiple-input, multiple-output (MIMO) technology to improve capacity, coverage, and spectral efficiency. In some implementations, the base station may be configured with a large number of antenna array elements to perform MIMO communications (also referred to as "massive MIMO"). For example, for a base station operating in the sub-6 GHz spectrum (i.e., frequencies below 6 GHz), the number of antenna array elements might range from 8 to 64 elements, where antenna configurations such as 8×8 (i.e., 8 transmit (Tx) antennas-by-8 receive (Rx) antennas), 16×16, and 32×32 may be deployed. As another example, for a base station operating in the mmWave spectrum (e.g., frequency of 24 GHz and above), the number of elements in the antenna array may be larger, such as antenna configurations from 64 to 256 elements. Because the physical dimension of an antenna element is proportional to the operating wavelength, the shorter wavelengths of mmWave deployments allow for more antenna array elements (e.g., of an antenna array) to be arranged into the same (or smaller) physical space (e.g., footprint).

Employing a large number of antenna array elements allows for advanced beamforming techniques, where the base station can focus a signal towards specific UEs, improving signal strength and reducing interference. This in turn allows the base station to utilize spatial multiplexing (SM) techniques, wherein the base station is able to serve multiple UEs simultaneously, each with their own beam, thereby increasing the overall capacity of the base station.

Moreover, future radio access technologies (e.g., 6G and beyond) may support frequency bands in the 7 GHz to 24 GHz range and NE (e.g., base stations) and/or UE may support antenna arrays composed of thousands of antenna array elements, referred to as "XL MIMO." For example, an XL MIMO deployment in 6G may comprise around 5000 antenna array elements.

However, as the system bandwidth and the number of antenna array elements increases, a problem known as "beam squint" becomes more pronounced. Beam squint is a phenomenon that occurs in phased array antennas, where the beam gain of a frequency-independent beam over a number of system subcarriers approaches zeros and the number of affected subcarriers increases with the increasing bandwidth and number of antenna array elements. An existing solution for beam squint is to utilize a frequency-dependent beamforming architecture that uses time-delay (TD) units to overcome the beam squint problem, provided that the number of TD units is sufficiently large for the system bandwidth. However, TD units are expensive and complex components and if the number of TD units is not sufficiently large, then the same beam squint problem can still be observed. Moreover, increasing the number of TD units increases the complexity, power consumption, and cost of the beamforming architecture, which calls for a careful consideration when designing a system operation (e.g., random access (RA)). RA (also referred to as "RACH procedure") is an essential part of wireless communication systems as it enables the NE and UE to establish and reestablish a connection.

Accordingly, aspects of the present disclosure include techniques for mitigating beam squint in XL MIMO and other large phases array antennas without depending solely on adding TD units into the beamforming architecture.

Consequently, the present disclosure describes solutions to the beam squint problem that reduce the complexity, power consumption, and overall cost at the base station by implementing multiple frequency effective regions to cover the system bandwidth, as described in more detail below.

Aspects of the present disclosure describe new configurations and signaling solutions for the downlink (DL) synchronization phase of the RA operation. Aspects of the present disclosure are described in the context of a wireless communications system.

FIG. 1 illustrates an example of a wireless communications system 100 in accordance with aspects of the present disclosure. The wireless communications system 100 may include one or more NE 102, one or more UE 104, and a core network (CN) 106. The wireless communications system 100 may support various radio access technologies. In some implementations, the wireless communications system 100 may be a 4G network, such as a Long-Term Evolution (LTE) network or an LTE-Advanced (LTE-A) network. In some other implementations, the wireless communications system 100 may be a New Radio (NR) network, such as a 5G network, a 5G-Advanced (5G-A) network, or a 5G ultra-wideband (5G-UWB) network.

In other implementations, the wireless communications system 100 may be a combination of a 4G network and a 5G network, or other suitable radio access technology (RAT) including Institute of Electrical and Electronics Engineers (IEEE) 802.11 (Wi-Fi), IEEE 802.16 (WiMAX), IEEE 802.20. The wireless communications system 100 may support radio access technologies beyond 5G, for example, 6G. Additionally, the wireless communications system 100 may support technologies, such as time division multiple access (TDMA), frequency division multiple access (FDMA), or code division multiple access (CDMA), etc.

The one or more NE 102 may be dispersed throughout a geographic region to form the wireless communications system 100. One or more of the NE 102 described herein may be or include or may be referred to as a network node, a base station, a network element, a network function, a network entity, a radio access network (RAN), a NodeB, an eNodeB (eNB), a next-generation NodeB (gNB), or other suitable terminology. An NE 102 and a UE 104 may communicate via a communication link, which may be a wireless or wired connection. For example, an NE 102 and a UE 104 may perform wireless communication (e.g., receive signaling, transmit signaling) over a Uu interface.

An NE 102 may provide a geographic coverage area for which the NE 102 may support services for one or more UEs 104 within the geographic coverage area. For example, an NE 102 and a UE 104 may support wireless communication of signals related to services (e.g., voice, video, packet data, messaging, broadcast, etc.) according to one or multiple radio access technologies. In some implementations, an NE 102 may be moveable, for example, a satellite associated with a non-terrestrial network (NTN). In some implementations, different geographic coverage areas associated with the same or different radio access technologies may overlap, but the different geographic coverage areas may be associated with different NE 102.

The one or more UE 104 may be dispersed throughout a geographic region of the wireless communications system 100. A UE 104 may include or may be referred to as a remote unit, a mobile device, a wireless device, a remote device, a subscriber device, a transmitter device, a receiver device, or some other suitable terminology. In some implementations, the UE 104 may be referred to as a unit, a station, a terminal, or a client, among other examples. Additionally, or alternatively, the UE 104 may be referred to as an internet-of-things (IoT) device, an internet-of-everything (IoE) device, or machine-type communication (MTC) device, among other examples.

A UE 104 may be able to support wireless communication directly with other UEs 104 over a communication link. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link may be referred to as a sidelink. For example, a UE 104 may support wireless communication directly with another UE 104 over a PC5 interface.

An NE 102 may support communications with the CN 106, or with another NE 102, or both. For example, an NE 102 may interface with other NE 102 or the CN 106 through one or more backhaul links (e.g., S1, N2, N3, or network interface). In some implementations, the NE 102 may communicate with each other directly. In some other implementations, the NE 102 may communicate with each other indirectly (e.g., via the CN 106). In some implementations, one or more NE 102 may include subcomponents, such as an access network entity, which may be an example of an access node controller (ANC). An ANC may communicate with the one or more UEs 104 through one or more other access network transmission entities, which may be referred to as a radio heads, smart radio heads, or transmission-reception points (TRPs).

The CN 106 may support user authentication, access authorization, tracking, connectivity, and other access, routing, or mobility functions. The CN 106 may be an evolved packet core (EPC), or a 5G core (5GC), which may include a control plane entity that manages access and mobility (e.g., a mobility management entity (MME), an access and mobility management function (AMF)) and a user plane entity that routes packets or interconnects to external networks (e.g., a serving gateway (S-GW), a Packet Data Network (PDN) gateway (P-GW), or a user plane function (UPF)). In some implementations, the control plane entity may manage non-access stratum (NAS) functions, such as mobility, authentication, and bearer management (e.g., data bearers, signaling bearers, etc.) for the one or more UEs 104 served by the one or more NE 102 associated with the CN 106.

The CN 106 may communicate with a packet data network over one or more backhaul links (e.g., via an S1, N2, N3, or another network interface). The packet data network may include an application server. In some implementations, one or more UEs 104 may communicate with the application server. A UE 104 may establish a session (e.g., a protocol data unit (PDU) session, or a PDN connection, or the like) with the CN 106 via an NE 102. The CN 106 may route traffic (e.g., control information, data, and the like) between the UE 104 and the application server using the established session (e.g., the established PDU session). The PDU session may be an example of a logical connection between the UE 104 and the CN 106 (e.g., one or more network functions of the CN 106).

In the wireless communications system 100, the NEs 102 and the UEs 104 may use resources of the wireless communications system 100 (e.g., time resources (e.g., symbols, slots, subframes, frames, or the like) or frequency resources (e.g., subcarriers, carriers)) to perform various operations (e.g., wireless communications). In some implementations, the NEs 102 and the UEs 104 may support different resource structures. For example, the NEs 102 and the UEs 104 may support different frame structures. In some implementations, such as in 4G, the NEs 102 and the UEs 104 may support a single frame structure. In some other implementations, such as in 5G and among other suitable radio access technologies, the NEs 102 and the UEs 104 may support various frame structures (i.e., multiple frame structures). The NEs 102 and the UEs 104 may support various frame structures based on one or more numerologies.

One or more numerologies may be supported in the wireless communications system 100, and a numerology may include a subcarrier spacing and a cyclic prefix. A first numerology (e.g., $\mu=0$) may be associated with a first subcarrier spacing (e.g., 15 kHz) and a normal cyclic prefix. In some implementations, the first numerology (e.g., $\mu=0$) associated with the first subcarrier spacing (e.g., 15 kHz) may utilize one slot per subframe. A second numerology (e.g., $\mu=1$) may be associated with a second subcarrier spacing (e.g., 30 kHz) and a normal cyclic prefix. A third numerology (e.g., $\mu=2$) may be associated with a third subcarrier spacing (e.g., 60 kHz) and a normal cyclic prefix or an extended cyclic prefix. A fourth numerology (e.g., $\mu=3$) may be associated with a fourth subcarrier spacing (e.g., 120 kHz) and a normal cyclic prefix. A fifth numerology (e.g., $\mu=4$) may be associated with a fifth subcarrier spacing (e.g., 240 kHz) and a normal cyclic prefix.

A time interval of a resource (e.g., a communication resource) may be organized according to frames (also referred to as radio frames). Each frame may have a duration, for example, a 10 millisecond (ms) duration. In some implementations, each frame may include multiple subframes. For example, each frame may include 10 subframes, and each subframe may have a duration, for example, a 1 ms duration. In some implementations, each frame may have the same duration. In some implementations, each subframe of a frame may have the same duration.

Additionally, or alternatively, a time interval of a resource (e.g., a communication resource) may be organized according to slots. For example, a subframe may include a number (e.g., quantity) of slots. The number of slots in each subframe may also depend on the one or more numerologies supported in the wireless communications system 100. For instance, the first, second, third, fourth, and fifth numerologies (i.e., $\mu=0$, $\mu=1$, $\mu=2$, $\mu=3$, $\mu=4$) associated with respective subcarrier spacings of 15 kHz, 30 kHz, 60 kHz, 120 kHz, and 240 kHz may utilize a single slot per subframe, two slots per subframe, four slots per subframe, eight slots per subframe, and 16 slots per subframe, respectively.

Each slot may include a number (e.g., quantity) of symbols (e.g., orthogonal frequency domain multiplexing (OFDM) symbols). In some implementations, the number (e.g., quantity) of slots for a subframe may depend on a numerology. For a normal cyclic prefix, a slot may include 14 symbols. For an extended cyclic prefix (e.g., applicable for 60 kHz subcarrier spacing), a slot may include 12 symbols. The relationship between the number of symbols per slot, the number of slots per subframe, and the number of slots per frame for a normal cyclic prefix and an extended cyclic prefix may depend on a numerology. It should be understood that reference to a first numerology (e.g., $\mu=0$) associated with a first subcarrier spacing (e.g., 15 kHz) may be used interchangeably between subframes and slots.

In the wireless communications system 100, an electromagnetic (EM) spectrum may be split, based on frequency or wavelength, into various classes, frequency bands, frequency channels, etc. By way of example, the wireless communications system 100 may support one or multiple operating frequency bands, such as frequency range designations FR1 (410 MHz-7.125 GHz), FR2 (24.25 GHz-52.6

GHz), FR3 (7.125 GHz-24.25 GHz), FR4 (52.6 GHz-114.25 GHz), FR4a or FR4-1 (52.6 GHz-71 GHz), and FR5 (114.25 GHz-300 GHz). In some implementations, the NEs 102 and the UEs 104 may perform wireless communications over one or more of the operating frequency bands. In some implementations, FR1 may be used by the NEs 102 and the UEs 104, among other equipment or devices for cellular communications traffic (e.g., control information, data). In some implementations, FR2 may be used by the NEs 102 and the UEs 104, among other equipment or devices for short-range, high data rate capabilities.

FR1 may be associated with one or multiple numerologies (e.g., at least three numerologies). For example, FR1 may be associated with a first numerology (e.g., $\mu=0$), which includes 15 kHz subcarrier spacing; a second numerology (e.g., $\mu=1$), which includes 30 kHz subcarrier spacing; and a third numerology (e.g., $\mu=2$), which includes 60 kHz subcarrier spacing. FR2 may be associated with one or multiple numerologies (e.g., at least 2 numerologies). For example, FR2 may be associated with a third numerology (e.g., $\mu=2$), which includes 60 kHz subcarrier spacing; and a fourth numerology (e.g., $\mu=3$), which includes 120 kHz subcarrier spacing.

According to implementations, one or more of the NEs 102 and the UEs 104 are operable to implement various aspects of the techniques described with reference to the present disclosure.

FIG. 2 illustrates an example of a protocol stack 200 in accordance with aspects of the present disclosure. While FIG. 2 shows a UE 206, a RAN node 208, and a 5G core network (5GC) 210 (e.g., comprising at least an AMF), these are representative of a set of UEs 104 interacting with an NE 102 (e.g., base station) and a CN 106. As depicted, the protocol stack 200 comprises a user plane protocol stack 202 and a control plane protocol stack 204. The user plane protocol stack 202 includes a physical (PHY) layer 212, a medium access control (MAC) sublayer 214, a radio link control (RLC) sublayer 216, a packet data convergence protocol (PDCP) sublayer 218, and a service data adaptation protocol (SDAP) sublayer 220. The control plane protocol stack 204 includes a PHY layer 212, a MAC sublayer 214, a RLC sublayer 216, and a PDCP sublayer 218. The control plane protocol stack 204 also includes a radio resource control (RRC) layer 222 and a NAS layer 224.

Note that in some transparent satellite architectures, the satellite may act as a repeater, but does not terminate the NR-Uu interface. In some embodiments, the NTN may relay signaling for one or more layers between the UE 206 and the RAN node 208. In other embodiments, the NTN may relay NAS layer signaling between the RAN node 208 and the 5GC 210 (note that NAS singling is transparent to the RAN node 208).

The AS layer 226 (also referred to as "AS protocol stack") for the user plane protocol stack 202 consists of at least SDAP, PDCP, RLC and MAC sublayers, and the physical layer. The AS layer 228 for the control plane protocol stack 204 consists of at least RRC, PDCP, RLC and MAC sublayers, and the physical layer. The layer-1 (L1) includes the PHY layer 212. The layer-2 (L2) is split into the SDAP sublayer 220, PDCP sublayer 218, RLC sublayer 216, and MAC sublayer 214. The layer-3 (L3) includes the RRC layer 222 and the NAS layer 224 for the control plane and includes, e.g., an internet protocol (IP) layer and/or PDU Layer (not depicted) for the user plane. L1 and L2 are referred to as "lower layers," while L3 and above (e.g., transport layer, application layer) are referred to as "higher layers" or "upper layers."

The PHY layer 212 offers transport channels to the MAC sublayer 214. The PHY layer 212 may perform a beam failure detection procedure using energy detection thresholds, as described herein. In certain embodiments, the PHY layer 212 may send an indication of beam failure to a MAC entity at the MAC sublayer 214. The MAC sublayer 214 offers logical channels to the RLC sublayer 216. The RLC sublayer 216 offers RLC channels to the PDCP sublayer 218. The PDCP sublayer 218 offers radio bearers to the SDAP sublayer 220 and/or RRC layer 222. The SDAP sublayer 220 offers QoS flows to the core network (e.g., 5GC). The RRC layer 222 manages the addition, modification, and release of carrier aggregation and/or dual connectivity. The RRC layer 222 also manages the establishment, configuration, maintenance, and release of signaling radio bearers (SRBs) and data radio bearers (DRBs).

The NAS layer 224 is between the UE 206 and an AMF in the 5GC 210. NAS messages are passed transparently through the RAN. The NAS layer 224 is used to manage the establishment of communication sessions and for maintaining continuous communications with the UE 206 as it moves between different cells of the RAN. In contrast, the AS layers 226 and 228 are between the UE 206 and the RAN (i.e., RAN node 208) and carry information over the wireless portion of the network. While not depicted in FIG. 2, the IP layer exists above the NAS layer 224, a transport layer exists above the IP layer, and an application layer exists above the transport layer.

The MAC sublayer 214 is the lowest sublayer in the L2 architecture of the NR protocol stack. Its connection to the PHY layer 212 below is through transport channels, and the connection to the RLC sublayer 216 above is through logical channels. The MAC sublayer 214 therefore performs multiplexing and demultiplexing between logical channels and transport channels: the MAC sublayer 214 in the transmitting side constructs MAC PDUs (also known as transport blocks (TBs)) from MAC service data units (SDUs) received through logical channels, and the MAC sublayer 214 in the receiving side recovers MAC SDUs from MAC PDUs received through transport channels.

In the radio protocol architectures described herein, the term "SDU" refers to a data unit that is received by a sublayer from a higher sublayer, or that is sent by a sublayer to a higher sublayer. Likewise, the term "PDU" refers to a data unit that is sent by a sublayer to a lower sublayer, or that is received by a sublayer from a lower sublayer.

The MAC sublayer 214 provides a data transfer service for the RLC sublayer 216 through logical channels, which are either control logical channels which carry control data (e.g., RRC signaling) or traffic logical channels which carry user plane data. On the other hand, the data from the MAC sublayer 214 is exchanged with the PHY layer 212 through transport channels, which are classified as uplink (UL) or downlink (DL). Data is multiplexed into transport channels depending on how it is transmitted over the air.

The PHY layer 212 is responsible for the actual transmission of data and control information via the air interface, i.e., the PHY layer 212 carries all information from the MAC transport channels over the air interface on the transmission side. Some of the important functions performed by the PHY layer 212 include coding and modulation, link adaptation (e.g., adaptive modulation and coding (AMC)), power control, cell search and random access (for initial access synchronization and handover purposes) and other measurements (inside the Third Generation Partnership Project (3GPP) system (i.e., NR and/or LTE system) and between systems) for the RRC layer 222. The PHY layer 212 performs transmissions based on transmission parameters, such as the modulation scheme, the coding rate (i.e., the modulation and coding scheme (MCS)), the number of physical resource blocks (PRBs), etc.

In some embodiments, the protocol stack 200 may be an NR protocol stack used in a 5G NR system. Note that an LTE protocol stack comprises similar structure to the protocol stack 200, with the differences that the LTE protocol stack lacks the SDAP sublayer 220 in the AS layer 226, that an EPC replaces the 5GC 210, and that the NAS layer 224 is between the UE 206 and an MME in the EPC. Also note that the present disclosure distinguishes between a protocol layer (such as the aforementioned PHY layer 212, MAC sublayer 214, RLC sublayer 216, PDCP sublayer 218, SDAP sublayer 220, RRC layer 222 and NAS layer 224) and a transmission layer in multiple-input multiple-output (MIMO) communication (also referred to as a "MIMO layer" or a "data stream").

As noted above, as the system bandwidth and the number of antenna array elements increases largely, the beam squint issue becomes more pronounced, where the beam gain of a frequency independent beam over a number of system subcarriers approaches zeros and the number of affected subcarriers increases with the increasing bandwidth and number of antenna array elements. Frequency dependent beamforming architectures can overcome the beam squint issue if the number of time-delay (TD) units are sufficiently large, otherwise the same issue can still be observed.

However, increasing the number of TD units increases the complexity and cost of the beamforming architectures, which calls for a careful consideration when designing a system operation, e.g., a random-access operation, which is an essential part of wireless communication systems as it plays a significant role in establishing and reestablishing a connection between a device and a network. Aspects of the present disclosure, describe new configurations and signaling solutions for the downlink synchronization phase of the RA operation.

Figure 3:
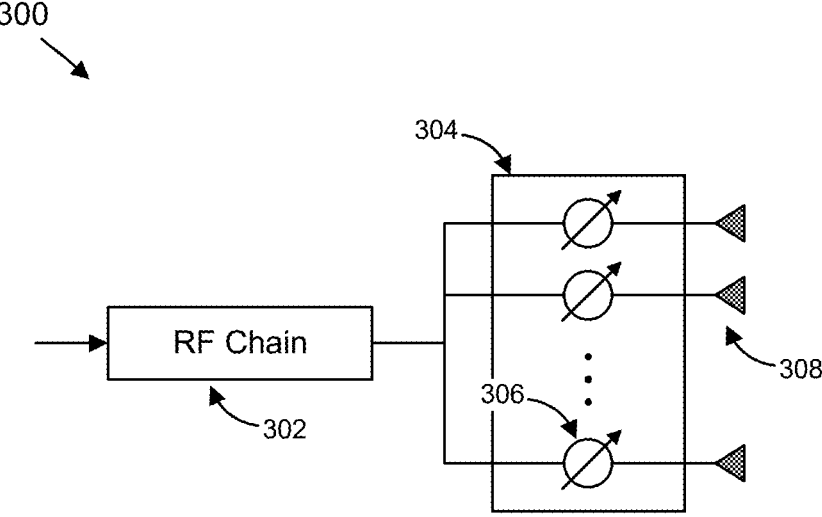
FIG. 3 illustrates an example of an analog phase array precoding architecture in accordance with aspects of the present disclosure.

FIG. 3 illustrates an example of an analog phase array precoding architecture 300 in accordance with aspects of the present disclosure. The analog phase array precoding architecture 300 comprises a radio frequency (RF) chain 302 connected to an analog phase array 304 comprising N phase shifters (PSs) 306 and N antennas 308. Assume a simple system model based on the analog phase array precoding architecture 300, where a single Tx node (e.g., a gNB) communicates with a single Rx node using an OFDM-based system with M total subcarriers. Here, the Tx node has a uniform linear array (ULA) of N antennas 308 connected to a single RF chain 302 with N PSs 308 (i.e., an analog phase array 304), while the Rx node has a single antenna.

Let $f_c$ denote the central carrier frequency (e.g., {7.5, 15, 20} GHz) and B denote system bandwidth (e.g., {100, 400, 1000} MHz). Then, the mth subcarrier (SC) frequency is given as $$f_m = f_c + \frac{B}{M}\left(m - 1 - \frac{M-1}{2}\right).$$

Based on the analog phase array precoding architecture 300 of FIG. 3, the normalized antenna array beam gain is denotes as $g(w(f_c,\theta), v(f_m,\theta)) = |w(f_c,\theta)^H v(f_m,\theta)|$, m=0, . . . , 128, (i.e., assuming M=129), where $w(f_c,\theta)$ is the "central frequency" based analog precoding vector/beam with steering angle θ and is denoted as:

$$w(f_c, \theta) = \frac{1}{\sqrt{N}} \left[ 1, e^{j2\pi d \frac{f_c}{c} sin\theta}, \dots, e^{j2\pi d(N-1)\frac{f_c}{c} sin\theta} \right]^T$$

and where $v(f_c, \theta)$ is the mth subcarrier steering vector with steering angle θ (i.e., the response vector for a Tx/Rx far-field signal with AoD/AoA θ), denoted as:

$$v(f_m, \theta) = \frac{1}{\sqrt{N}} \left[ 1, e^{j2\pi d \frac{f_m}{c} sin\theta}, \dots, e^{j2\pi d(N-1)\frac{f_m}{c} sin\theta} \right]^T$$

Here, it is assumed that the inter-element spacing $$d = \frac{\lambda_c}{2},$$

where $$\lambda_c = \frac{c}{f_c}$$

is the wavelength of $f_c$. As such, the "central frequency" analog precoding vector/beam $w(f_c, \theta)$ simplifies to $$w(\theta) = \frac{1}{\sqrt{N}} \left[ 1, e^{j\pi sin\theta}, \dots, e^{j\pi(N-1)sin\theta} \right]^T$$

Figure 4:
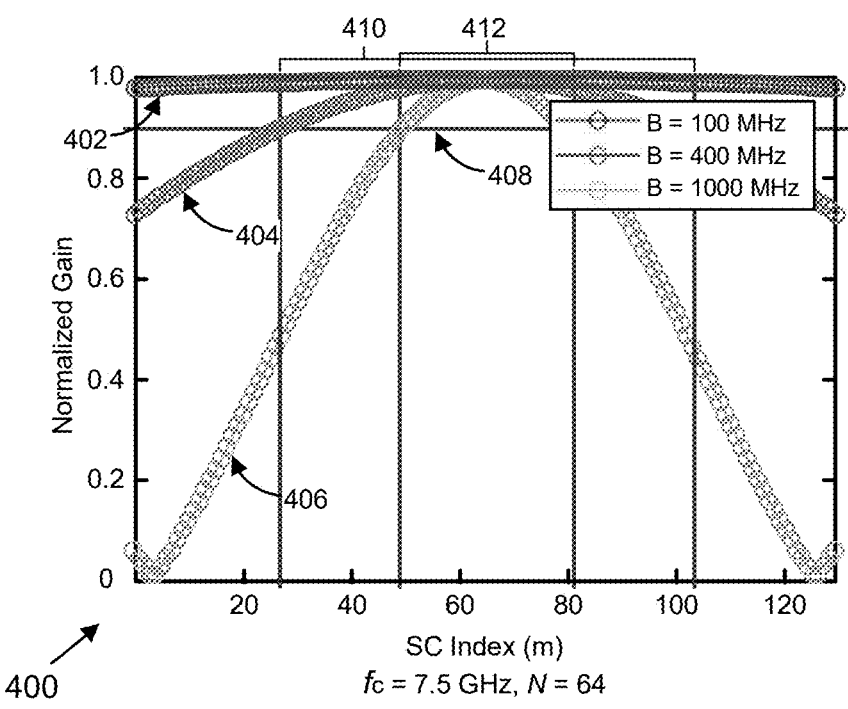
FIG. 4 illustrates an example of normalized frequency-independent beam gain over different system bandwidths with a central carrier frequency of 7.5 GHz and 64 antenna array elements.

FIG. 4 illustrates an example of normalized frequency-independent beam gain over different system bandwidths with a central carrier frequency ($f_c$) of 7.5 GHz and the number of antenna array elements (N)=64. The graph 400 shows the normalized antenna array gain (i.e., normalized beam gain) over 129 subcarriers comprising the system bandwidth, B. A first set of points 402 corresponds to B=100 MHz. A second set of points 404 corresponds to B=400 MHz. A third set of points 406 corresponds to B=1000 MHz. In FIG. 4, it is assumed that θ=π/6. Note that the frequency-independent beam gain decreases with the increase in B (i.e., frequency-dependent behavior becomes more apparent as the system BW increases).

In the example of FIG. 4, a gain threshold 408 corresponds to 90% normalized gain. For B=100 MHz, the frequency-independent beam gain stays above the gain threshold 408, thus the effective region for B=100 MHz comprises all 129 subcarriers. For B=400 MHz, the frequency-independent beam gain exceeds the gain threshold 408 only in the frequency effective region 410. For B=1000 MHz, the frequency-independent beam gain exceeds the gain threshold 408 only in the frequency effective region 412.

Figure 5:
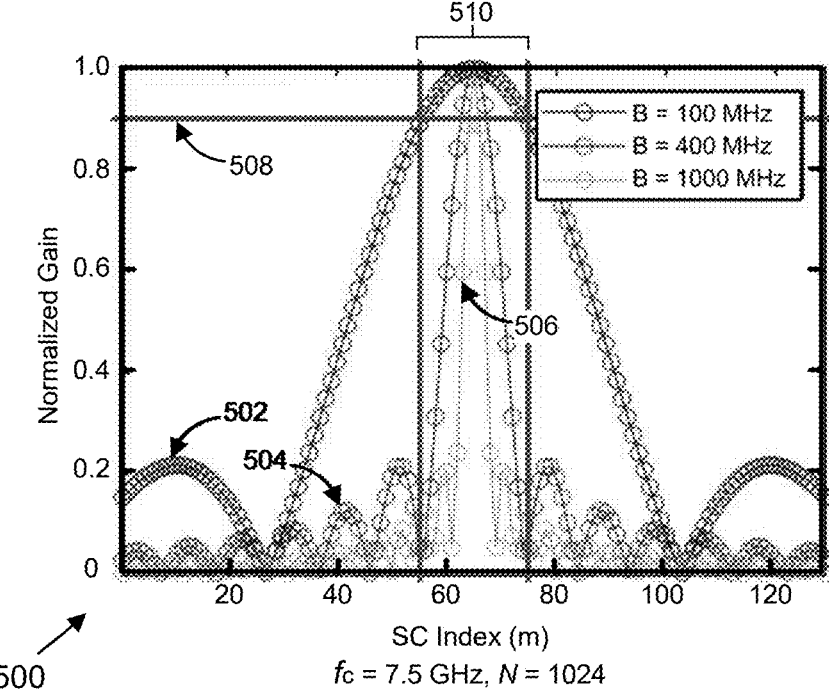
FIG. 5 illustrates an example of normalized frequency-independent beam gain over different system bandwidths with a central carrier frequency of 7.5 GHz and 1024 antenna array elements.

FIG. 5 illustrates an example of normalized frequency-independent beam gain over different system bandwidths with a central carrier frequency ($f_c$) of 7.5 GHz and the number of antenna array elements (N)=1024. The graph 500 shows the normalized antenna array gain (i.e., normalized beam gain) over 129 subcarriers comprising the system bandwidth, B. A first set of points 502 corresponds to B=100

MHz. A second set of points 504 corresponds to B=400 MHz. A third set of points 506 corresponds to B=1000 MHz. In FIG. 5, it is assumed that θ=π/6. Note that the frequency-independent beam gain decreases sharply when using a large number of antenna array elements N (due to increase of beamwidth) and increase in B (where frequency-dependent behavior becomes more apparent).

In the example of FIG. 5, a gain threshold 508 corresponds to 90% normalized gain. For B=100 MHz, the frequency-independent beam gain exceeds the gain threshold 508 only in the frequency effective region 510. For B=400 MHz and B=1000 MHz, the frequency-independent beam gain only exceeds the gain threshold for a few subcarriers near the center frequency.

Figure 6:
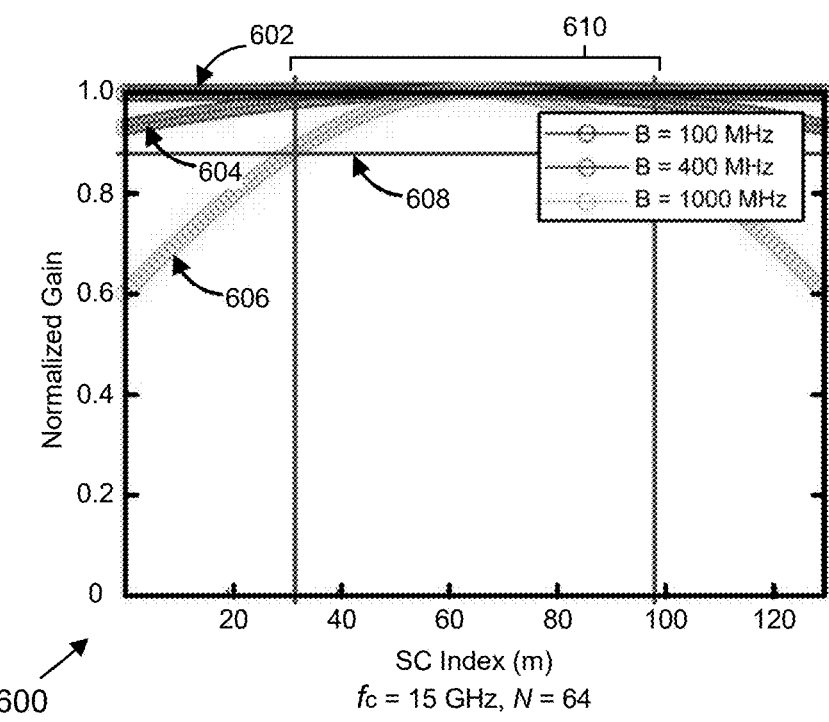
FIG. 6 illustrates an example of normalized frequency-independent beam gain over different system bandwidths with a central carrier frequency of 15 GHz and 64 antenna array elements.

FIG. 6 illustrates an example of normalized frequency-independent beam gain over different system bandwidths with a central carrier frequency ($f_c$) of 15 GHz and the number of antenna array elements (N)=64. The graph 600 shows the normalized antenna array gain (i.e., normalized beam gain) over 129 subcarriers comprising the system bandwidth, B. A first set of points 602 corresponds to B=100 MHz. A second set of points 604 corresponds to B=400 MHz. A third set of points 606 corresponds to B=1000 MHz. In FIG. 6, it is assumed that θ=π/6. Note that the frequency-independent beam gain decreases with the increase in B (i.e., frequency-dependent behavior becomes more apparent as the system BW increases).

In the example of FIG. 6, a gain threshold 608 corresponds to 90% normalized gain. For B=100 MHz and B=400 MHz, the frequency-independent beam gain stays above the gain threshold 608, thus the effective region for B=100 MHz and B=400 MHz comprises all 129 subcarriers. However, for B=1000 MHz, the frequency-independent beam gain exceeds the gain threshold 408 only in the frequency effective region 610.

Figure 7:
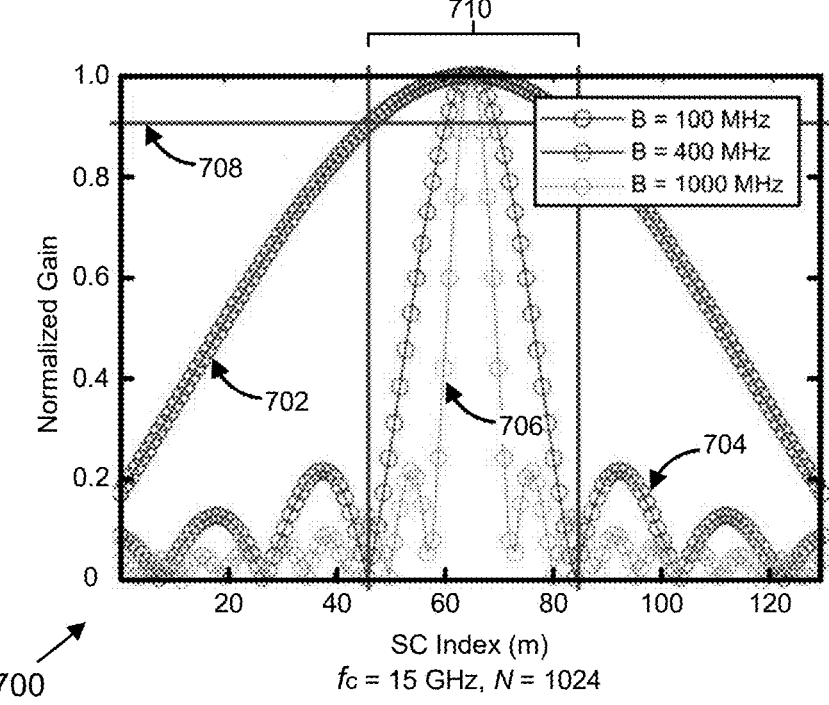
FIG. 7 illustrates an example of normalized frequency-independent beam gain over different system bandwidths with a central carrier frequency of 15 GHz and 1024 antenna array elements.

FIG. 7 illustrates an example of normalized frequency-independent beam gain over different system bandwidths with a central carrier frequency ($f_c$) of 15 GHz and the number of antenna array elements (N)=1024. The graph 700 shows the normalized antenna array gain (i.e., normalized beam gain) over 129 subcarriers comprising the system bandwidth, B. A first set of points 702 corresponds to B=100 MHz. A second set of points 704 corresponds to B=400 MHz. A third set of points 706 corresponds to B=1000 MHz. In FIG. 7, it is assumed that θ=π/6. Note that the frequency-independent beam gain decreases sharply when using a large number of antenna array elements N (due to increase of beamwidth) and increase in B (where frequency-dependent behavior becomes more apparent).

In the example of FIG. 7, a gain threshold 708 corresponds to 90% normalized gain. For B=100 MHz, the frequency-independent beam gain exceeds the gain threshold 708 only in the frequency effective region 710. For B=400 MHz and B=1000 MHz, the frequency-independent beam gain only exceeds the gain threshold for a few subcarriers near the center frequency.

Figure 8:
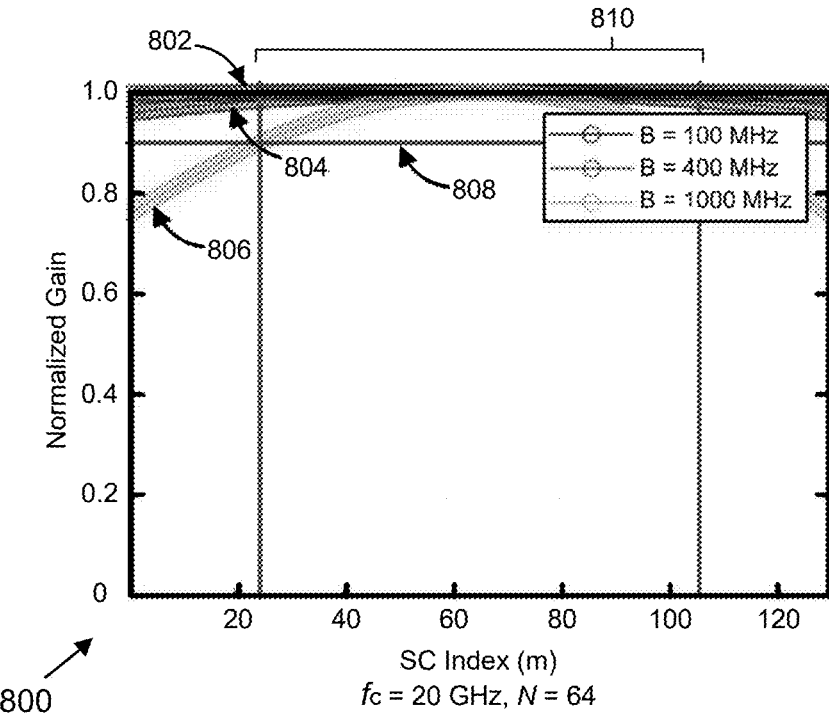
FIG. 8 illustrates an example of normalized frequency-independent beam gain over different system bandwidths with a central carrier frequency of 20 GHz and 64 antenna array elements.

FIG. 8 illustrates an example of normalized frequency-independent beam gain over different system bandwidths with a central carrier frequency ($f_c$) of 20 GHz and the number of antenna array elements (N)=64. The graph 800 shows the normalized antenna array gain (i.e., normalized beam gain) over 129 subcarriers comprising the system bandwidth, B. A first set of points 802 corresponds to B=100 MHz. A second set of points 804 corresponds to B=400 MHz. A third set of points 806 corresponds to B=1000 MHz. In FIG. 8, it is assumed that θ=π/6. Note that the frequency-independent beam gain decreases with the increase in B (i.e., frequency-dependent behavior becomes more apparent as the system BW increases).

In the example of FIG. 8, a gain threshold 808 corresponds to 90% normalized gain. For B=100 MHz and B=400 MHz, the frequency-independent beam gain stays above the gain threshold 808, thus the effective region for B=100 MHz and B=400 MHz comprises all 129 subcarriers. For B=1000 MHz, the frequency-independent beam gain exceeds the gain threshold 808 only in the frequency effective region 810.

Figure 9:
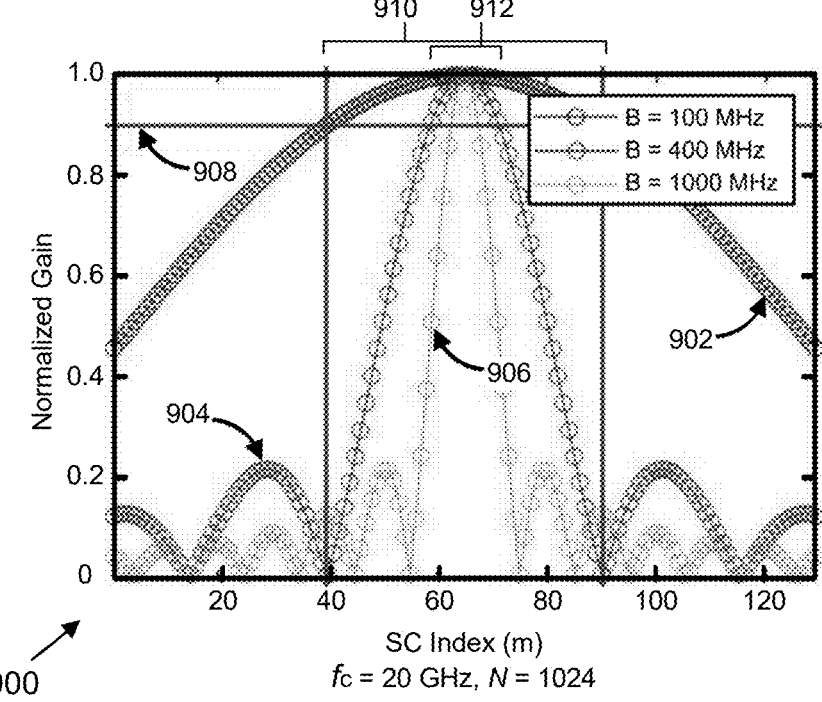
FIG. 9 illustrates an example of normalized frequency-independent beam gain over different system bandwidths with a central carrier frequency of 20 GHz and 1024 antenna array elements.

FIG. 9 illustrates an example of normalized frequency-independent beam gain over different system bandwidths with a central carrier frequency ($f_c$) of 20 GHz and the number of antenna array elements (N)=1024. The graph 900 shows the normalized antenna array gain (i.e., normalized beam gain) over 129 subcarriers comprising the system bandwidth, B. A first set of points 902 corresponds to B=100 MHz. A second set of points 904 corresponds to B=400 MHz. A third set of points corresponds to B=1000 MHz. In FIG. 9, it is assumed that $\theta=\pi/6$. Note that the frequency-independent beam gain decreases sharply when using a large number of antenna array elements N (due to increase of beamwidth) and increase in B (where frequency-dependent behavior becomes more apparent).

In the example of FIG. 9, a gain threshold 908 corresponds to 90% normalized gain. For B=100 MHz, the frequency-independent beam gain exceeds the gain threshold 908 only in the frequency effective region 910. For B=400 MHz, the frequency-independent beam gain exceeds the gain threshold 908 only in the frequency effective region 912. For B=1000 MHz, the frequency-independent beam gain only exceeds the gain threshold for a few subcarriers near the center frequency.

From FIGS. 4-9 it can be observed that the antenna array gain $g(w(f_c,\theta), v(f_m,\theta))$ depends on $f_c$, B, and N. Specifically, if one or more of $f_c$, B, and N increases to a large value, e.g., when N increases from 64 to 1024, the array beam gain $g(w(f_c,\theta), v(f_m,\theta))$ over some "edge" subcarriers (SCs) decreases sharply, e.g., becoming smaller than a threshold amount (e.g., 90%) of the ideal beam gain, while the array beam gain achieves a "good" beam gain, e.g., over a threshold amount (e.g., 90%) of the ideal beam gain, for some "central" SCs. As used herein, the edge SCs are referred to as "out-of-coverage" SCs and the central SCs are referred to as "in-coverage" SCs for the beam, as illustrated FIGS. 5, 7, and 9. The frequency region formed using the "in-coverage" SCs or resource blocks (RBs) is referred to herein as the beam "frequency effective region".

The beam squint behavior in FIGS. 5, 7, and 9 can be resolved using fully digital precoding architectures, which allow for an "optimal" precoding vector for each subcarrier. However, since large $f_c$ and/or B requires a large N, fully digital precoding architectures become impractical as they become very complex and expensive to realize in practice.

Accordingly a more practical solution is to use a delay-phase precoding (DPP) architecture to resolve the beam squint issues causes by large values of $f_c$ and/or B.

Figure 10:
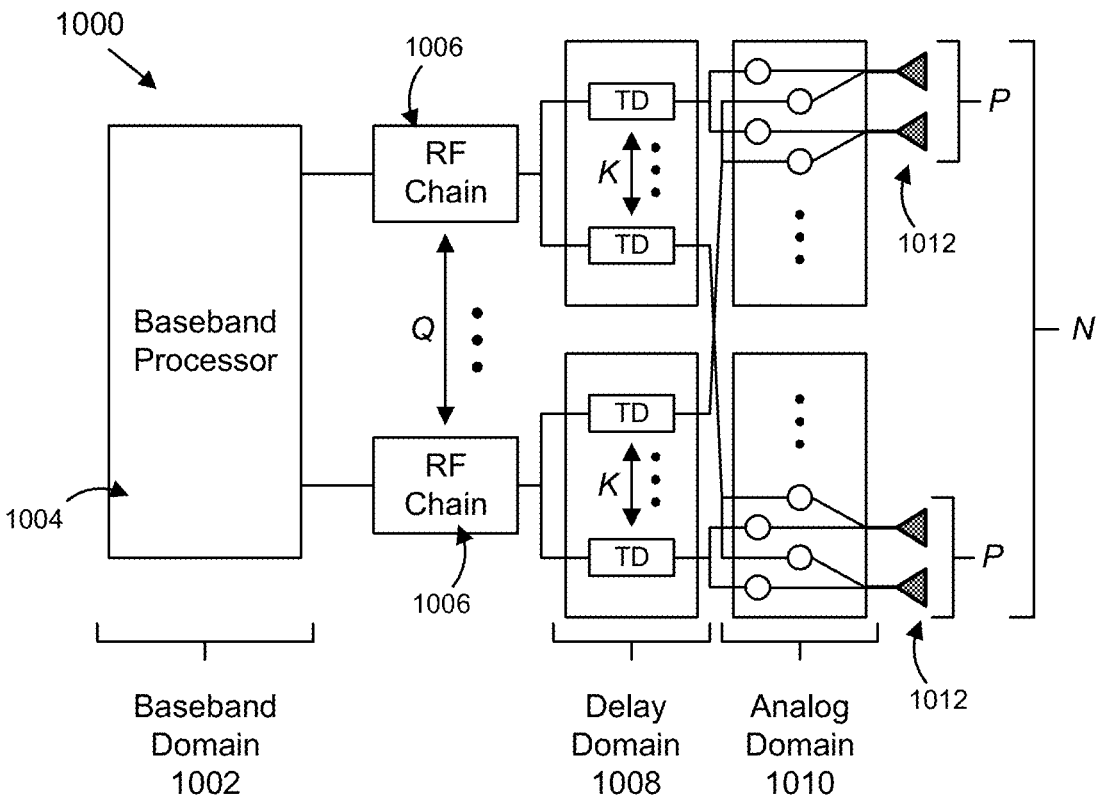
FIG. 10 illustrates an example of a delay-phase precoding (DPP) architecture in accordance with aspects of the present disclosure.

FIG. 10 illustrates an example of a DPP architecture 1000 in accordance with aspects of the present disclosure. The DPP architecture 1000 comprises a baseband domain 1002, including baseband processor 1004, and a plurality of RF chains 1006. In the DPP architecture 1000, the RF chains 1006 are connected to a plurality of antenna array elements 1012 via a delay domain 1008 and an analog domain 1010. The delay domain 1008 includes a network of delay array realized using a network of time-delay (TD) units, and is inserted between the baseband domain 1002 and the analog domain 1010.

For example, in the depicted DPP architecture 1000, each RF chain 1006 of Q RF chains is connected to K TD units and each TD unit is connected to $$P\left(\text{e.g., } P = \frac{N}{K}\right)$$

antenna array elements 1012 using a network of P phase-shifters (PSs). In this way, the signal at the mth subcarrier passing through a TD unit can be delayed by a t ms in the time domain, which corresponds to $-2\pi f_m t$ frequency-dependent phase rotation in the frequency domain. The DPP architecture 1000 can be employed instead of the phase arrays or fully digital precoding architectures to overcome the high complexity and the antenna gain loss on "edge" subcarriers.

Figure 11:
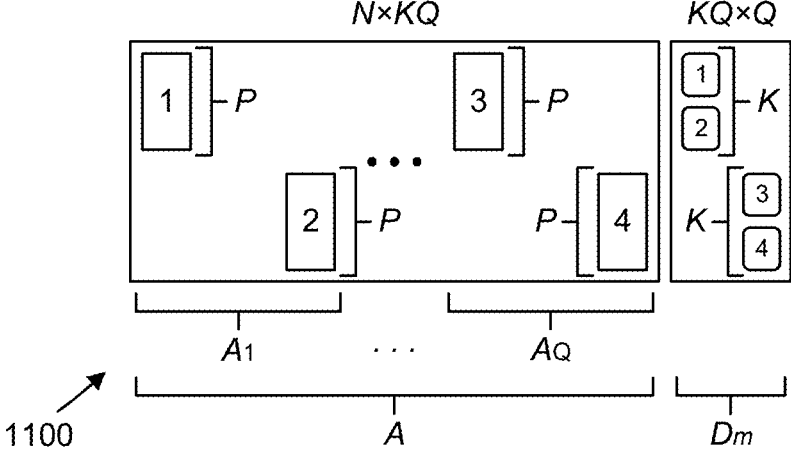
FIG. 11 illustrates an example of a precoding vector using a DPP architecture in accordance with aspects of the present disclosure.

FIG. 11 illustrates an example of a precoding vector using a DPP architecture in accordance with aspects of the present disclosure. The example of FIG. 11 shows a picturization of an exemplary precoding vector 1100 for the DPP architecture 1000. For the DPP architecture 1000, the precoding vector 1100 of the mth subcarrier can be expressed as $$w_m = AD_m f_m,$$

where $A=[A_1, \ldots, A_Q]\in C^{N\times KQ}$ is the analog domain precoding matrix and $D_m\in C^{KQ\times Q}$ is the delay domain precoding matrix of the mth subcarrier, where $A_q=\text{blkdiag}\{a_{q,1}, \ldots, a_{q,K}\}\in C^{N\times K}$ has a block-diagonal structure as illustrated in FIG. 11, where $a_{q,k}\in C^{P\times 1}$. Moreover, $f_m\in C^{Q\times 1}$ is the baseband precoding vector of the mth subcarrier.

Regarding the DPP analog beam design, with reference to FIG. 10, the frequency dependent beam of the mth subcarrier can designed as follows: First, assume that the number of radio chains is 1 (i.e., Q=1). Note that the optimal analog frequency dependent precoding vector of the mth subcarrier pointing to a desired angle $\theta$ is given by $$w_m^* = v(f_m, \theta) = \frac{1}{\sqrt{N}}\left[1, e^{j2\pi d\frac{f_m}{c}\sin\theta}, \ldots, e^{j2\pi d(N-1)\frac{f_m}{c}\sin\theta}\right]^T \in C^{N\times 1}$$

such that $$g(w_m^*, v(f_m, \theta)) = g(v(f_m, \theta), v(f_m, \theta)) = 1.$$

Given $$w_m^*$$

, a simple analog frequency dependent precoding design can be obtained by factorizing $$w_m^*$$

such that the cost function $$\|w_m^* - Ad_m\|$$

is minimized.

A solution to the above design challenge may be obtained using a two-step procedure. In the first step, the analog domain matrix $A \in C^{N \times K}$ is updated or designed using a desired method. For example, let $z = v(f_c, \theta) =$ $$[z_1^T, \ldots, z_K^T]^T \in C^{N \times 1},$$

where $z_k \in C^{P \times 1}$ is the kth block of steering vector z. Then, the kth block of A is updated as $a_k = z_k$. In the second step, due to the block structure of the analog domain matrix A, the frequency dependent delay vector $d_m$ is updated elementwise, wherein the problem for each element can be expressed as $\|w^*_{m,k} - a_k d_{m,k}\|$, wherein $w_{m,k}^* \in C^{P \times 1}$ is the kth block of $w^*_m$ and $d_{m,k}$ is the kth entry of $d_m$. Therefore, the solution of $d_{m,k}$ can be obtained as:

$$d_{m,k} = a_k^+ w_{m,k}^* = (a_k^H a_k)^{-1} a_k^H w_{m,k}^*.$$

The same procedure can be used for the case when Q>1, i.e., $A_q \in C^{N \times K}$, for q=1, . . . , Q can be designed similarly using same angle $\theta$ for all Q RF chains or different angle $\theta$ for each Q RF chain, where $$d_{m,k}^{(q)}$$

corresponding to the qth RF chain (i.e., to qth column of $D_m$ matrix) can be designed similarly as for Q=1 case (due to the block-structure of A and $D_m$).

Figure 12:
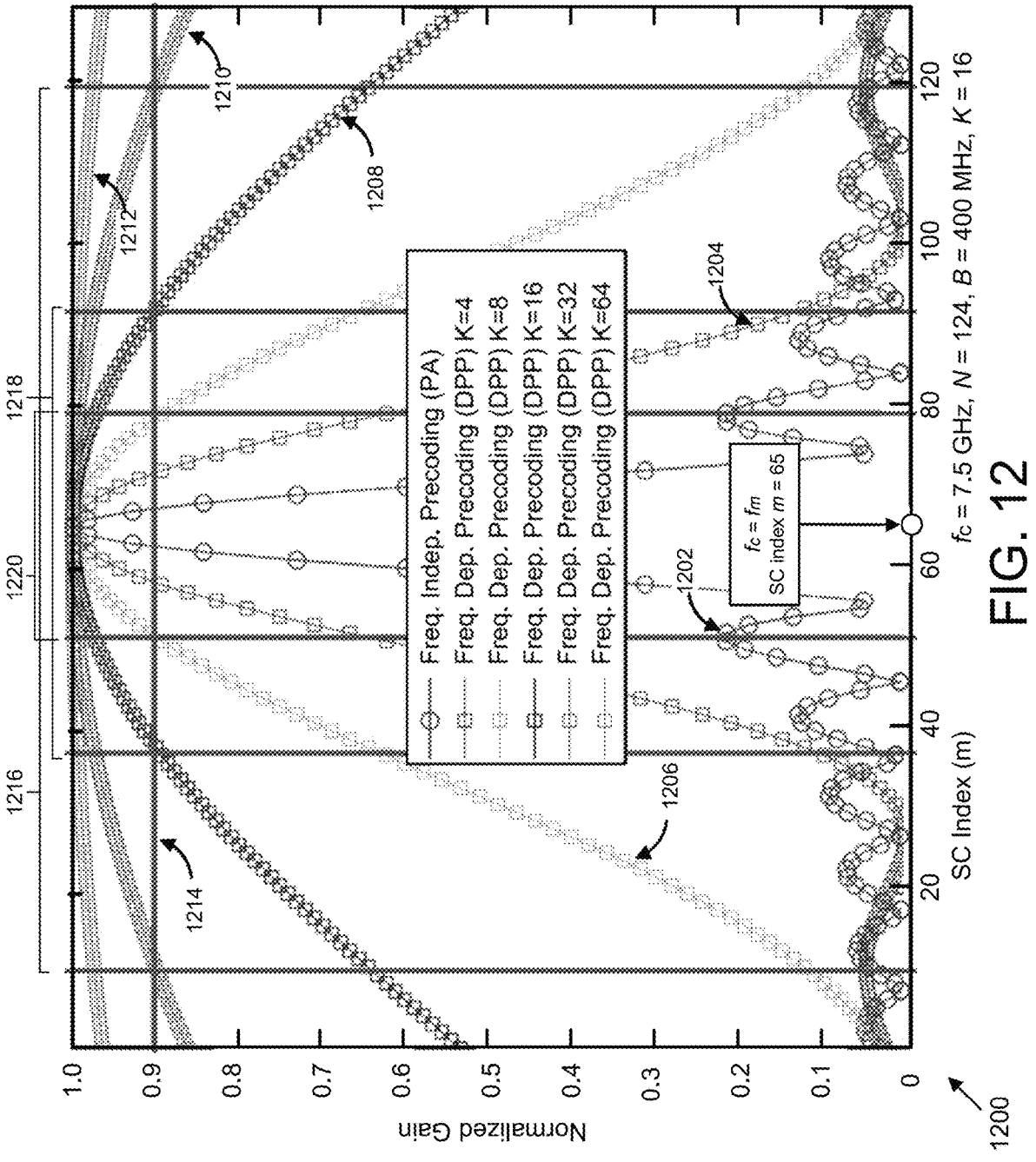
FIG. 12 illustrates an example of a normalized beam gain of frequency-independent beam and frequency-dependent beams realized using a DPP architecture in accordance with aspects of the present disclosure.

FIG. 12 illustrates an example of a normalized beam gain of frequency-independent beam and frequency-dependent beams realized using a DPP architecture in accordance with aspects of the present disclosure. The graph 1200 illustrates the normalized beam gain vs. subcarrier (SC) index m of a frequency-independent beam and frequency-dependent beams realized using a DPP architecture for $f_c$=7.5 GHz, N=1024, and B=400 MHz, assuming Q=1, M=129, and $$\theta = \frac{\pi}{6}.$$

A first set of points 1202 corresponds to a phase array (PA) frequency independent beam, i.e., $g(w(f_c, \theta), v(f_m, \theta))$, $\forall$m. As depicted, the frequency-independent beam gain only exceeds the gain threshold for a few subcarriers near the center frequency.

A second set of points 1204 corresponds to a DPP frequency dependent beam, i.e., $g(w_m, v(f_m, \theta))$, where K=4. A third set of points 1206 corresponds to a DPP frequency dependent beam, i.e., $g(w_m, v(f_m, \theta))$, where K=8. A fourth set of points 1208 corresponds to a DPP frequency dependent beam, i.e., $g(w_m, v(f_m, \theta))$, where K=16. A fifth set of points 1210 corresponds to a DPP frequency dependent beam, i.e., $g(w_m, v(f_m, \theta))$, where K=32. A sixth set of points 1212 corresponds to a DPP frequency dependent beam, i.e., $g(w_m, v(f_m, \theta))$, where K=64.

In the example of FIG. 12, a gain threshold 1214 corresponds to 90% normalized gain. For K=64, the frequency-dependent beam gain exceeds the gain threshold 908 for all 129 subcarriers, thus the frequency effective region for the beam when K=64 comprises the entire system bandwidth. For K=32, the frequency-dependent beam gain exceeds the gain threshold 1214 only in the frequency effective region 1216, which comprises all but a few edge subcarriers. For K=16, the frequency-dependent beam gain exceeds the gain threshold 1214 only in the frequency effective region 1218. For K=8, the frequency-dependent beam gain exceeds the gain threshold 1214 only in the frequency effective region 1220. For K=4, the frequency-dependent beam gain only exceeds the gain threshold for a few subcarriers near the center frequency.

From FIG. 12, it can be observed that by increasing K, e.g., to 64 (and thus reducing the number of PSs P connected to a TD unit; recall that $$P = \frac{N}{K}),$$

the system subcarriers can observe more than 90% of the "ideal" antenna gain. In other words, $\|g(w_m, v(f_m, \theta)) \geq \beta\|_0$, $\beta \in [0,1]$, increases with increasing K, where $\|\cdot\|_0$ is the norm-zero operator counting the number of the nonzero entries, e.g., $\|g(w_m, v(f_m, \theta)) \geq 0.9\|_0$ return the number of subcarriers their beam gain is above 90% of the ideal beam gain.

Note that, for every K value, the maximum is centered around $f_m$=65, which coincides with the central frequency $f_c$, i.e., $f_m = f_c$ when m=65 (recall that in our example, M=129 and 65 is the central point). Note that, if Q>1, i.e., the DPP architecture have more than one RF chain, two or more frequency dependent beams can be designed either both pointing to the same direction, or each one is pointing to a different direction. For example, if Q=2, two frequency dependent beams can be designed to point to the same direction where the first beam maximizes the beam gain of a first group of subcarriers around their "central frequency" $f_1$ and the second beam maximizes the beam gain of a second group of subcarriers around their "central frequency" $f_2$.

Figure 13:
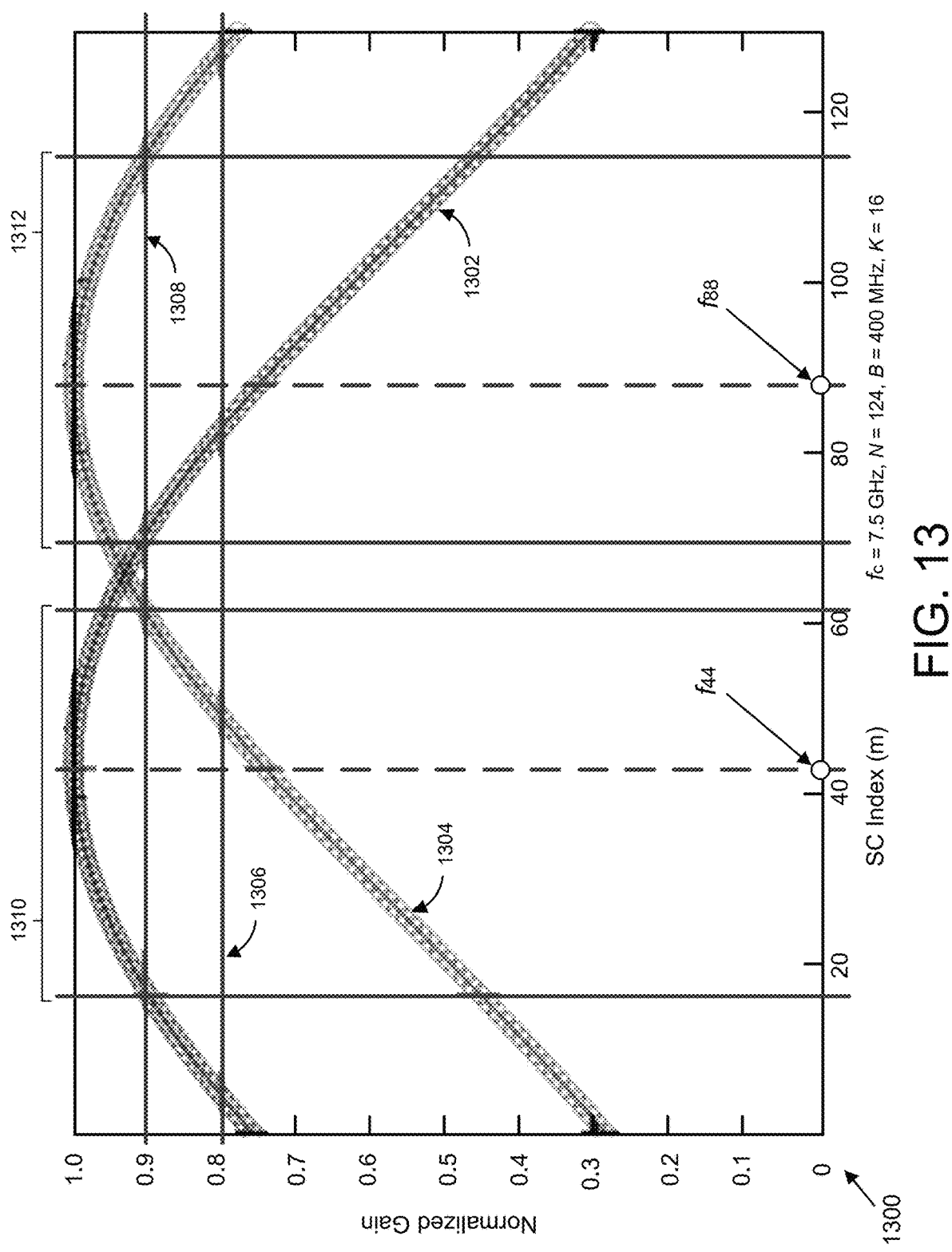
FIG. 13 illustrates an example of a normalized beam gain of two frequency-dependent beams realized using a DPP architecture in accordance with aspects of the present disclosure.

FIG. 13 illustrates an example of a normalized beam gain of two frequency-dependent beams realized using a DPP architecture in accordance with aspects of the present disclosure. The graph 1300 shows the normalized antenna array gain (i.e., normalized beam gain) vs. subcarrier (SC) index m of two frequency-dependent beams realized using a DPP architecture of M=129 subcarriers for $f_c$=7.5 GHz, N=1024, B=400 MHz, and K=16, assuming Q=1, M=129, and $$\theta = \frac{\pi}{6}.$$

A first set of points 1302 corresponds to a DPP frequency dependent beam centered around $f_m$=44, generated using a first RF chain. A second set of points 1304 corresponds to a DPP frequency dependent beam centered around $f_m$=88, generated using a second RF chain.

In the example of FIG. 13, a first gain threshold 1306 corresponds to 80% normalized gain and a second gain threshold 1308 corresponds to 90% normalized gain. For the first gain threshold 1306, the frequency-dependent beam gain over the combined coverage of the two frequency-dependent beams exceed the first gain threshold 1306 for all 129 subcarriers, thus the frequency effective region for the combined beams comprises the entire system bandwidth. For the second gain threshold 1308, the frequency-dependent beam gain of the first beam centered around $f_m=44$ exceeds the second gain threshold 1308 only in the frequency effective region 1310, and the frequency-dependent beam gain of the second beam centered around $f_m=88$ exceeds the second gain threshold 1308 only in the frequency effective region 1312. However, between the two beams, the frequency effective regions almost cover the entire system bandwidth, excepting some subcarriers near the center and near the edges.

In the multiple RF chain DPP architecture, the analog beamforming matrix of the first RF chain is designed from $z_1=v(f_{44},\theta_1)\in C^{N\times 1}$ and the analog beamforming matrix of the second RF chain is designed from $z_2=v(f_{88},\theta_2)\in C^{N\times 1}$, where $$\theta_1 = \frac{\pi}{6} \text{ and } \theta_2 = \frac{\pi}{5},$$

while the delay domain vectors of both RF chains are designed similarly as explained above.

An additional technique to mitigate beam squint is beam splitting. The beam-split approach can also be used to design a beam to points to multiple directions. In frequency independent architecture, one simple approach is to divide the total number of antennas N into multiple subarrays, and then design the steering vector for each subarray to maximize the gain toward a desired direction.

Figure 14:
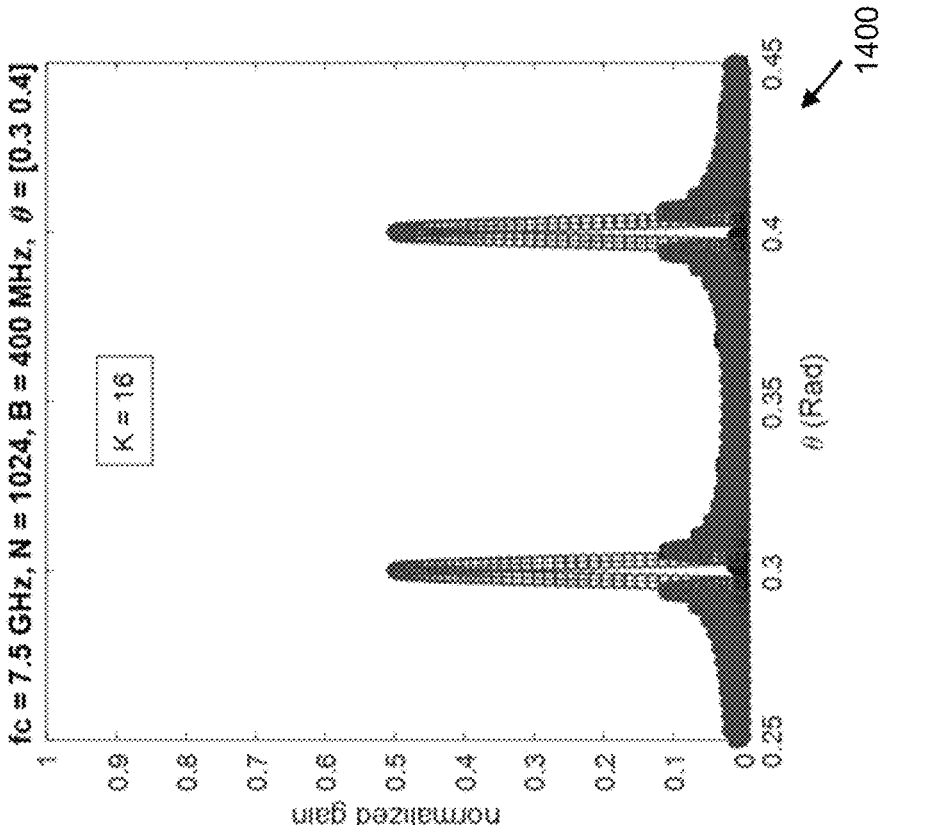
FIG. 14 illustrates an example of a normalized beam gain of frequency-independent beam splitting using 16 time delay units in accordance with aspects of the present disclosure.

FIG. 14 illustrates an example of a normalized beam gain 1400 of frequency-independent beam splitting using 16 time delay units (K=16) in accordance with aspects of the present disclosure.

Figure 15:
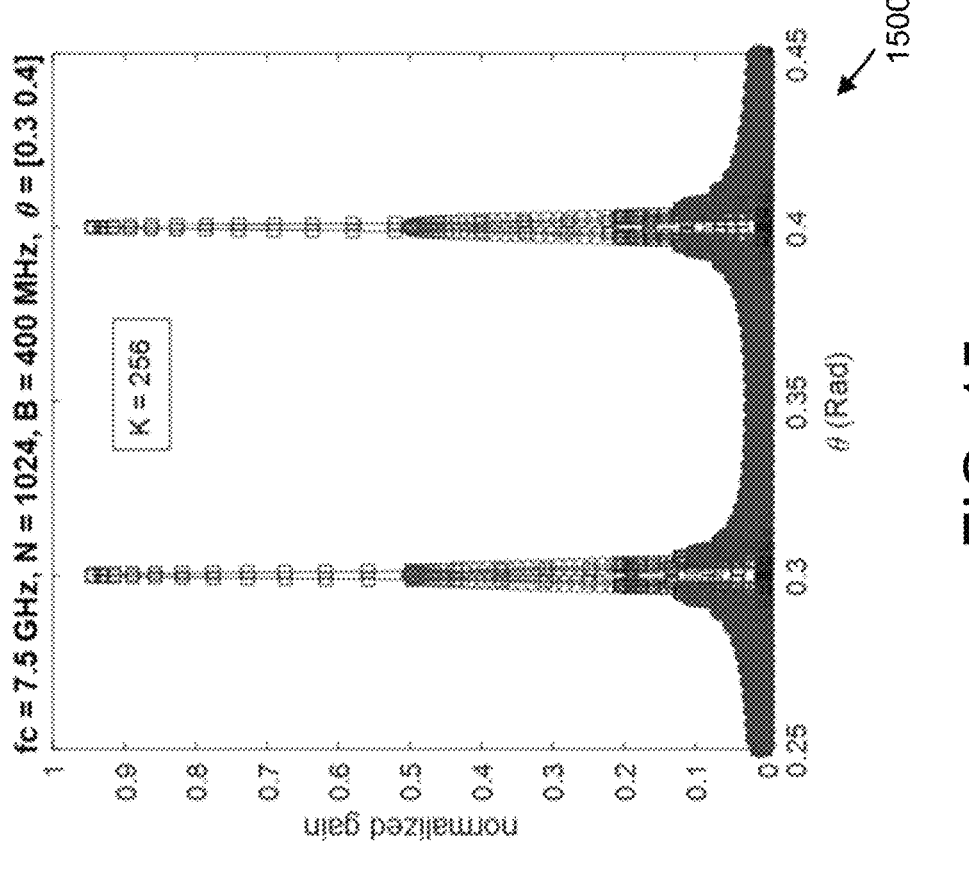
FIG. 15 illustrates an example of a normalized beam gain of frequency-independent beam splitting using 256 time delay units in accordance with aspects of the present disclosure.

FIG. 15 illustrates an example of a normalized beam gain 1500 of frequency-independent beam splitting using 256 time delay units in accordance with aspects of the present disclosure. Note that, with frequency-dependent beams, increasing the number of TDs K reduces gain loss of analog beam split.

In the examples of FIGS. 14-15, the beam gain $g(w(f_c,\theta)$, $v(f_m,\theta)),\forall\theta$, of the frequency independent beam $w(f_c,\theta)$ designed so that the first subarray of two subarrays is pointing toward $\theta=0.3$ angle and the second subarray of two subarrays is pointing toward $\theta=0.4$ angle, where the total N=1024 array is divided equally between the two subarrays, i.e., $$w(f_c, \theta = \{0.3, 0.4\}) =$$
$$\left[w(f_c, \theta = 0.3)_1^T w(f_c, \theta = 0.4)_2^T\right]^T \text{ where } w(f_c, \theta = 0.3)_1^T$$

and $$w(f_c, \theta = 0.4)_2^T$$

each has 512 elements. It can be observed that the beam gain for each direction is approximately halved when compared to the ideal normalized beam gain.

Differently, using DPP architectures, where the analog domain matrix A is designed similarly as the frequency independent beam and the delay domain vector is designed by firstly dividing the total number of 129 subcarriers into two "equal" groups and then design TDs of each group using the method explained above, i.e., $1^{st}$ group to point at direction $\theta=0.3$ and second to point at direction $\theta=0.4$. From FIG. 15, it can be observed that if K increases and becomes sufficiently large, e.g., K=256@N=1024, i.e., P=4, the frequency dependent DPP beam gain of $60^{th}$ (belonging to $1^{st}$ group) and $70^{th}$ (belonging to $2^{nd}$ group) SCs improves and approaches the ideal normalized beam gain.

Figure 16:
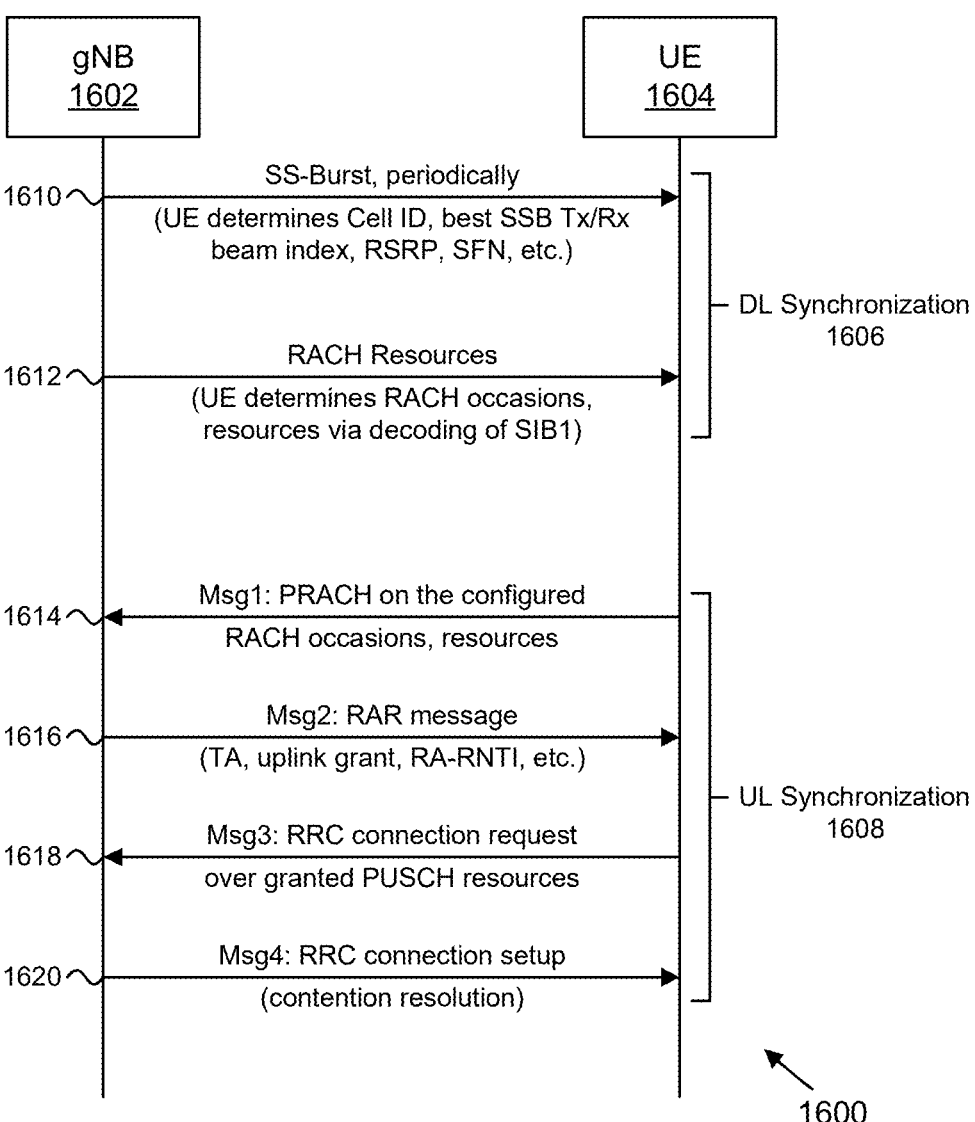
FIG. 16 illustrates an example of an initial access procedure in accordance with aspects of the present disclosure.

FIG. 16 illustrates an example of an initial access procedure 1600 in accordance with aspects of the present disclosure. In 5G NR wireless communication systems, the UE 1604 uses the initial access procedure to (re)synchronize itself with a serving network node (e.g., the gNB 1602), (re)acquire the system information, and (re)establish a radio link.

For initial access, a UE 1604 detects a candidate cell and performs downlink (DL) synchronization. For example, the gNB 1602 may transmit a synchronization signal/physical broadcast channel (SS/PBCH) transmission, referred to as a synchronization signal block (SSB). The synchronization signal is a predefined data sequence known to the UE 1604 (or derivable using information already stored at the UE 1604) and is in a predefined location in time relative to frame/subframe boundaries, etc. The UE 1604 searches for the SSB and uses the SSB to obtain DL timing information (e.g., symbol timing) for the DL synchronization. The UE 1604 may also decode system information (SI) based on the SSB. Note that with beam-based communication, each DL beam may be associated with a respective SSB.

After performing DL synchronization and acquiring essential SI, such as the master information block (MIB) and the system information block #1 (SIB1), the UE 104 performs uplink (UL) synchronization and resource request by performing a random-access procedure, referred to as "RACH procedure" by selecting and transmitting a preamble on the PRACH. The PRACH preamble is transmitted during a RACH occasion (RO), i.e., a predetermined set of time-frequency resources that are available for the reception of the PRACH preamble. Note that with beam-based communication, the UE 104 may select a certain DL beam and transmit the PRACH preamble on a corresponding UL beam. In such embodiments, there may be a mapping between SSB and RO, allowing the network to determine which beam the UE 104 has selected.

The initial access procedure 1600 can be categorized into two main steps: DL synchronization 1606, which is done via detecting and decoding an SSB beam, and UL synchronization 1608, which is done via the RACH procedure.

During the DL synchronization step 1606, the gNB 1602 transmits a SSB burst, e.g., periodically (see signaling 1610). The UE 1604 measures and then selects the Tx and Rx beam pair indices associated with the best SSB, where SSB consists of the primary synchronization signal (PSS), the secondary synchronization signal (SSS), and the physical broadcast channel (PBCH). Additionally, the gNB 1602 indicates the RACH resources, e.g., by transmitting SIB1 (see signaling 1612). The UE 1604 determines the RO resources, e.g., via decoding the SIB1.

After that, during the UL synchronization step 1608, the UE 1604 first selects a RACH preamble from the configured preamble pool associated with the selected SSB Tx beam and transmits a PRACH message (Msg1 or MsgA) using the identified SSB Rx beam over one or more of the ROs associated with the selected SSB Tx beam index (see signaling 1614). As used herein, a RO refers to a time period (e.g., interval or scheduling window) during which the UE 1604 is permitted to attempt to access the gNB 1602 using a RACH procedure. Within a RO, there may be multiple PRACH resource occasions, depending on the system configuration. As used herein, a PRACH resource occasion refers to a specific set of time-frequency resources allocated for the UE to perform a PRACH transmission (i.e., transmit a PRACH preamble). For example, the PRACH resource occasion may correspond to specific resource blocks (RBs) and subframes within a RO.

Regarding random access, two types of RACH procedure are supported in a 3GPP wireless communication network: A) a 4-step random-access (RA) type initiated by the sending of a RACH message 1 (Msg1) and 2-step RA type with RACH message A (MsgA). Both types of RACH procedure support contention-based random access (CBRA) and contention-free random access (CFRA).

The UE 104 selects the RA type at the initiation of the RACH procedure, e.g., based on network configuration. In one example, when CFRA resources are not configured, a reference signal received power (RSRP) threshold is used by the UE 104 to select between 2-step RA type and 4-step RA type. In another example, when CFRA resources for 4-step RA type are configured, the UE 104 performs random access with 4-step RA type. In another example, when CFRA resources for 2-step RA type are configured, the UE 104 performs random access with 2-step RA type.

Note that the network does not configure CFRA resources for 4-step and 2-step RA types at the same time for a bandwidth part (BWP). Additionally, the CFRA with 2-step RA type is only supported for handover.

The Msg1 of the 4-step RA type consists of a preamble transmitted on a PRACH. After the Msg1 transmission, the UE 104 monitors for a response from the network within a configured window. For CFRA, a dedicated preamble for Msg1 transmission is assigned by the network and upon receiving a random access response (RAR) from the network, the UE 104 ends the random access procedure. For CBRA, upon reception of the RAR (see signaling 1616), the UE 104 sends a RACH message 3 (Msg3) using a UL grant scheduled in the RAR and monitors for contention resolution (see signaling 1618). If contention resolution is successful, the gNB 1602 transmits a RACH message 4 (Msg4) for RRC connection setup (see signaling 1620). However, if the contention resolution is not successful after Msg3 (re) transmission(s), then the UE 104 goes back to Msg1 transmission.

The MsgA of the 2-step RA type includes a preamble on the PRACH and a payload on a physical uplink shared channel (PUSCH). After the MsgA transmission, the UE 104 monitors for a response from the network within a configured window. For CFRA, a dedicated preamble and PUSCH resource are configured for MsgA transmission and upon receiving the network response, the UE 104 ends the random access procedure. For CBRA, if contention resolution is successful upon receiving the network response, then the UE 104 ends the random access procedure; however, if a fallback indication is received in a RACH message B (MsgB), the UE 104 performs Msg3 transmission using the UL grant scheduled in the fallback indication and monitors for contention resolution. If contention resolution is not successful after Msg3 (re)transmission(s), the UE 104 goes back to MsgA transmission. If the random access procedure with 2-step RA type is not completed after a number of MsgA transmissions, the UE 104 can be configured to switch to CBRA with 4-step RA type.

Figure 17:
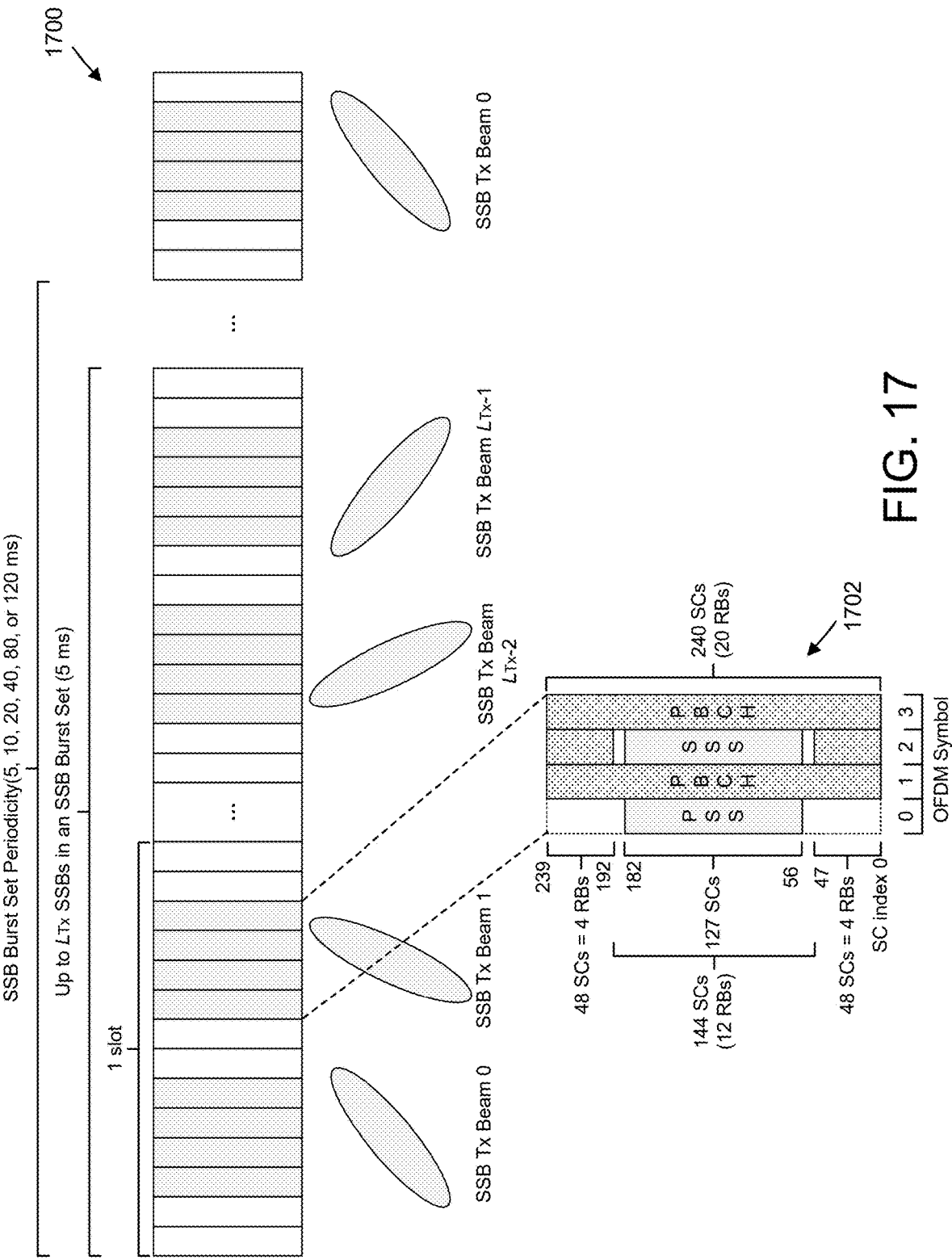
FIG. 17 illustrates an example of an SSB burst comprising multiple SSB transmissions in accordance with aspects of the present disclosure.

FIG. 17 illustrates an example of an SSB burst 1700 comprising multiple SSB transmissions in accordance with aspects of the present disclosure. The gNB may transmit the SSB burst 1700 with a periodicity, such as 5 ms, 10 ms, 20 ms, 40 ms, 80 ms, or 120 ms. There are up to $L_{TX}$ SSBs in the SSB burst 1700, each associated with a different beam.

A respective SSB transmission 1702 include the PSS, the SSS, and the PBCH. In the depicted embodiment, the SSB transmission duration is 4 OFDM symbols in the time domain, with the PSS and SSS each transmitted over 1 OFDM symbol, and the PBCH transmitted over 3 OFDM symbols.

In 5G NR, the SSB transmission 1702 spans 240 SCs in the frequency domain. The PSS and SSS span 127 SCs at the center of the SSB transmission 1702. In the second and fourth OFDM symbols, the PBCH spans 240 SCs, while in the third OFDM symbol, the PBCH covers the 48 lowest SCs and the 48 highest SCs of the SSB transmission 1702.

In 5G NR, the resource block (RB) typically spans 12 SCs, and the bandwidth of the RB depends on the SC spacing (SCS) used in the 5G NR system. For example, for 15 kHz SCS, the bandwidth of one RB is 180 kHz, while for 30 kHz SCS, the bandwidth of one RB is 360 kHz. Similarly, for 60 kHz SCS, the bandwidth of one RB is 720 kHz, while for 120 kHz SCS, the bandwidth of one RB is 1.44 MHz.

The duration of an RB in time is one slot, which may be composed of, e.g., 14 OFDM symbols in the time domain. In 5G NR, the time duration of an RB is based on the slot duration, which may vary according to the numerology and SCS used. For example, for 15 kHz SCS, the time duration of one RB (i.e., slot duration) is 1 ms, while for 30 kHz SCS, the time duration of one RB (slot duration) is 0.5 ms. Similarly, for 60 kHz SCS, the time duration of one RB (i.e., slot duration) is 0.25 ms, while for 120 kHz SCS, the time duration of one RB (slot duration) is 0.125 ms.

For 5G NR, the starting symbols and number of SSB blocks as function of system carrier frequency and SCS are defined in 3GPP technical specification (TS) 38.213.

Regarding the mapping of random-access preambles to physical resources in 5G NR, the preamble sequence shall be mapped to physical resources according to the formula $$a_k^{(p,RA)} = \beta_{PRACH} y_{u,v}(k)$$

$$k = 0, 1, \ldots, L_{RA} - 1$$

where $\beta_{PRACH}$ is an amplitude scaling factor in order to conform to the transmit power (e.g., as specified in 3GPP TS 38.213), and p=4000 is the antenna port.

Random access preambles can only be transmitted in the time resources obtained from specified tables and depends on FR1 or FR2 and the spectrum type. The PRACH configuration index may be given by the higher-layer parameter prach-ConfigurationIndex, or by msgA-PRACH-ConfigurationIndex, if configured; and may be given by the higher-layer parameter prach-ConfigurationIndex, or by msgA-PRACH-ConfigurationIndex, if configured.

Random access preambles can only be transmitted in the frequency resources given by either the higher-layer parameter msg1-FrequencyStart or msgA-RO-FrequencyStart if configured. The PRACH frequency resources $n_{RA} \in \{0, 1, \ldots, M-1\}$, where M equals the higher-layer parameter msg1-FDM or msgA-RO-FDM if configured, are numbered in increasing order within the initial uplink bandwidth part during initial access, starting from the lowest frequency. Otherwise, $n_{RA}$ are numbered in increasing order within the active uplink bandwidth part, starting from the lowest frequency.

An example of random access preamble configurations for FR1 and unpaired spectrum is shown in Table 1, below:

TABLE 1

| PRACH Configuration Index | Preamble format | $n_f \bmod x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
| | | x | y | | | | | |
|---|---|---|---|---|---|---|---|---|
| 118 | A3 | 2 | 1 | 2, 3, 4, 7, 8, 9 | 0 | 1 | 2 | 6 |

FIG. 18 illustrates an example of a RACH-ConfigGeneric IE in accordance with aspects of the present disclosure. The RACH-ConfigGeneric IE may be used by the network (e.g., gNB) to configure the UE with a PRACH configuration, including the pattern of valid ROs, the number of PRACH transmission occasions frequency division multiplexed (FDMed) in one time instance, and the offset of lowest PRACH transmission occasion in frequency domain with respective to PRB 0.

A description of the fields of the RACH-ConfigGeneric IE is given in Table 2, below.

TABLE 2

| msg1-FDM | The number of PRACH transmission occasions FDMed in one time instance. (see 3GPP TS 38.211, clause 6.3.3.2). |
|---|---|
| msg1-FrequencyStart | Offset of lowest PRACH transmission occasion in frequency domain with respective to PRB 0. The value is configured so that the corresponding RACH resource is entirely within the bandwidth of the UL BWP. (see 3GPP TS 38.211, clause 6.3.3.2). |
| prach-ConfigurationIndex | PRACH configuration index. For prach-ConfigurationIndex configured under beamFailureRecoveryConfig, the prach-ConfigurationIndex can only correspond to the short preamble format, (see 3GPP TS 38.211, clause 6.3.3.2). If the field prach-ConfigurationIndex-v1610 is present, the UE shall ignore the value provided in prach-ConfigurationIndex (without suffix). |

FIG. 19 illustrates an example of a RACH-ConfigCommon IE in accordance with aspects of the present disclosure. The RA CH-ConfigCommon IE may be used by the network (e.g., gNB) to configure the UE with a PRACH configuration, including the number of PRACH preambles, and a mapping of SSBs per RO, and preambles per SSB.

A description of the field of the RACH-ConfigCommon IE is given in Table 3, below.

TABLE 3

| ssb-perRACH-OccasionAndCB-PreamblesPerSSB | The meaning of this field is twofold: the CHOICE conveys the information about the number of SSBs per RACH occasion. Value oneEighth corresponds to one SSB associated with 8 RACH occasions, value oneFourth corresponds to one SSB associated with 4 RACH occasions, and so on. The ENUMERATED part indicates the number of Contention Based preambles per SSB. Value n4 corresponds to 4 Contention Based preambles per SSB, value n8 corresponds to 8 Contention Based preambles per SSB, and so on. The total number of CB preambles in a RACH occasion is given by CB-preambles-per-SSB * max(1, SSB-per-rach-occasion). See TS 38.213. |
|---|---|

For unpaired spectrum, if a UE is not provided tdd-UL-DL-ConfigurationCommon, a PRACH occasion in a PRACH slot is valid if it does not precede a SS/PBCH block in the PRACH slot and starts at least $N_{gap}$ symbols after a last SS/PBCH block reception symbol, where $N_{gap}$ is provided in Table 8.1-2 and, if channelAccessMode="semiStatic" is provided, does not overlap with a set of consecutive symbols before the start of a next channel occupancy time where the UE does not transmit. The candidate SS/PBCH block index of the SS/PBCH block corresponds to the SS/PBCH block index provided by ssb-PositionsInBurst in SIB1 or in ServingCellConfigCommon.

For unpaired spectrum, if a UE is provided tdd-UL-DL-ConfigurationCommon, a PRACH occasion in a PRACH slot is valid if 1) it is within UL symbols, or 2) it does not precede a SS/PBCH block in the PRACH slot and starts at least $N_{gap}$ symbols after a last downlink symbol and at least $N_{gap}$ symbols after a last SS/PBCH block symbol, where $N_{gap}$ is provided in Table 8.1-2, and if channelAccessMode="semiStatic" is provided, does not overlap with a set of consecutive symbols before the start of a next channel occupancy time where there shall not be any transmissions. Note that the candidate SS/PBCH block index of the SS/PBCH block corresponds to the SS/PBCH block index provided by ssb-PositionsInBurst in SIB1 or in ServingCellConfigCommon.

The SS/PBCH block indexes provided by ssb-PositionsInBurst in SIB1 or in ServingCellConfigCommon are mapped to valid PRACH occasions in the following order: 1) in increasing order of preamble indexes within a single PRACH occasion; 2) in increasing order of frequency resource indexes for frequency multiplexed PRACH occasions; 3) in increasing order of time resource indexes for time multiplexed PRACH occasions within a PRACH slot; and 4) in increasing order of indexes for PRACH slots.

In the time domain, the ROs may be configured using higher-layer signaling. Because random access preambles can only be transmitted in the specified time resources (e.g., obtained from Tables 6.3.3.2-2 to 6.3.3.2-4 of 3GPP TS 38.211), it follows that the time resources depend on the frequency band (e.g., FR1 or FR2) and the spectrum type.

Figure 20:
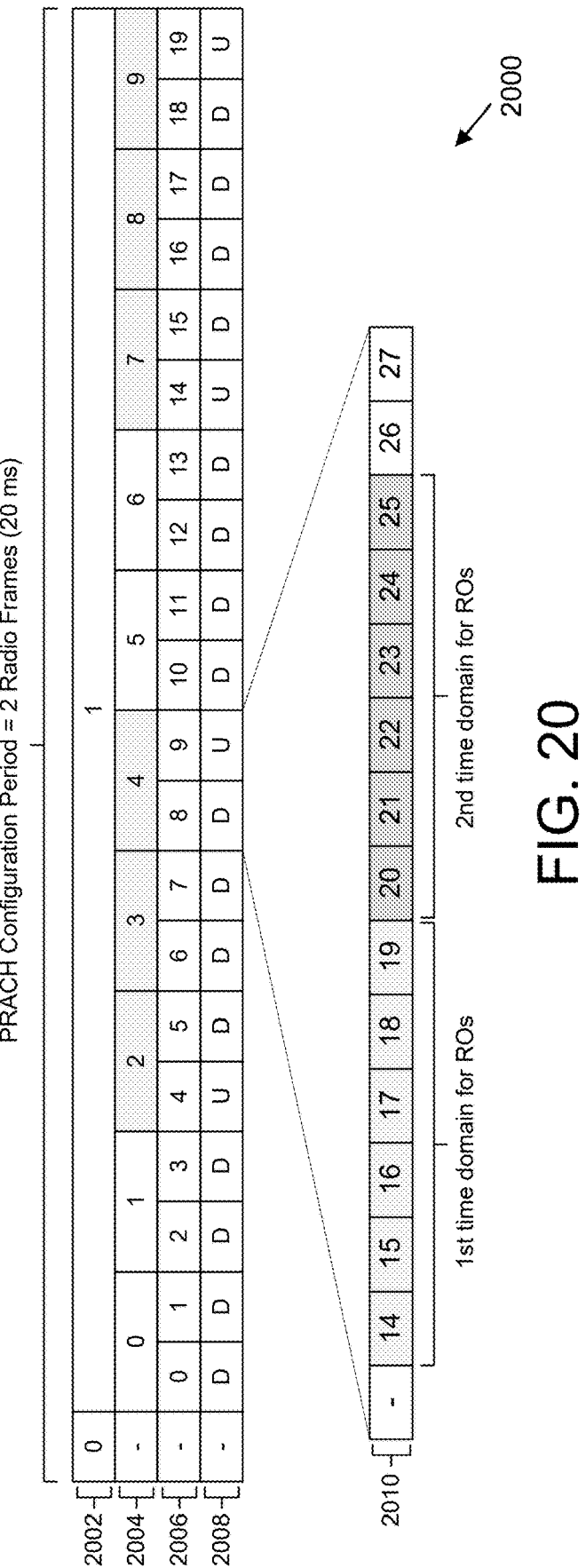
FIG. 20 illustrates an example of a PRACH configuration with random access channel (RACH) occasions (ROs) in accordance with aspects of the present disclosure.

FIG. 20 illustrates an example of a PRACH configuration 2000 with RACH occasions (ROs) in accordance with aspects of the present disclosure. For example, the PRACH configuration 2000 may be based on PRACH Configuration Index 118 (as specified in 3GPP TS 38.211 Table 6.3.3.2-3), assuming SCS of 30 kHz. The PRACH configuration 2000 may have a duration of 2 radio frames (e.g., 20 ms). The PRACH configuration 2000 corresponds to a set of frames 2002, a set of subframes 2004, and a set of slots 2006. The set of slots 2006 has a time division duplexing (TDD) UL/DL pattern 2008, wherein each slot is designated as UL or DL. In the depicted embodiment, slot indices {4, 9, 14, 19} correspond to the UL slots. Moreover, the set of slots 2006 may be subdivided into a set of OFDM symbols 2010.

It is assumed that the random access preamble configuration corresponding to the PRACH configuration 2000 is as shown in Table 1. Because the PRACH configuration 2000 has a period of two (x=2) frames, i.e., $n_f$={0, 1}, and since y=1, it implies that the RACH Occasions (ROs) occur in subframes {2, 3, 4, 7, 8, 9} of the 2nd frame. Moreover, since (1) a subframe has 2 slots for 30 kHz SCS, (2) the "number of PRACH slots within a subframe" is equal to 1, (3) the "number of time-domain PRACH occasions within a PRACH slot" is equal to 2, and (4) the "PRACH duration" is equal to 6, it implies that the ROs are within slots {5, 7, 9, 15, 17, 19}. Assuming that the common TDD-UL-DL pattern is DDDDU, then the valid ROs are only on the uplink (UL) slots {9, 19} since the other slots are downlink (DL) slots.

In the frequency domain, on the other hand, the ROs are configured using two parameters: msg1-FDM, which indicates "The number of PRACH transmission occasions FDMed in one time instance", which could be one of 1,2,4, or 8; and msg1-FrequencyStart, which indicates "Offset of lowest PRACH transmission occasion in frequency domain with respective to PRB 0".

Additionally, a UE maps the provided $$N_{TX}^{SSB} \ SSBs$$

to valid ROs according to RRC parameter ssb-per-RACH-OccasionAndCB-PreamblesPerSSB, as defined in Table 3. Moreover, SS/PBCH block (SSB) indexes provided by ssb-PositionsInBurst in SIB1 or in ServingCellConfigCommon are mapped to valid PRACH occasions in the following order:

1) in increasing order of preamble indexes within a single PRACH occasion; 2) in increasing order of frequency resource indexes for frequency multiplexed PRACH occasions; 3) in increasing order of time resource indexes for time multiplexed PRACH occasions within a PRACH slot; and 4) in increasing order of indexes for PRACH slots.

The above essentially implies that SSBs mapping to valid ROs are performed following a frequency first and time second ordering rule.

For example, if the number of $$SSBs \ N_{TX}^{SSB} = 8$$

and msg1-FDM=4. Then, FIG. 20 shows the SSBs to valid ROs mapping using the above mapping rules for different ssb-perRACH-Occasion (N) value. From FIG. 20, it can be observed that the required number of valid time domain ROs to map the provided SSBs depend on the configured ssb-perRACH-Occasion (N) value. For example, if N=1, i.e., one SSB is associated with one RO, then two time-domain of valid ROs are required to map the eight $$\left(N_{TX}^{SSB} = 8\right) \ SSBs.$$

However, one time-domain of valid ROs is required to map the eight $$\left(N_{TX}^{SSB} = 8\right) \ SSBs$$

if N=2 or N=4, whereas four time-domain of valid ROs are required to map the eight $$\left(N_{TX}^{SSB} = 8\right) \ SSBs \ if \ N = 1/2.$$

More importantly, FIG. 20 shows that if the valid time domain for ROs occur on single-bit full-duplex (SBFD) symbols, then some of the configured ROs (i.e., via msg1-FDM and msg1-FrequencyStart) might be allocated outside the SBFD UL subband. Moreover, depending on the provided number of SSBs per RO, i.e., ssb-perRACH-Occasion (N), some of the SSBs might be only mapped to a RO outside the configured SBFD UL subband, e.g., SSBs #0, SSBs #3, SSBs #4, and SSBs #7 when ssb-perRACH-Occasion (N) is equal to one. However, when ssb-per-RACH-Occasion (N) is equal to 4, it can be observed that every SSB is mapped, at least once, to a RO within the configured SBFD UL subband. The same is true when ssb-perRACH-Occasion (N) is equal to 1/2. Therefore, with SBFD UL subband, different SSBs to ROs mapping rules are required.

Figure 21:
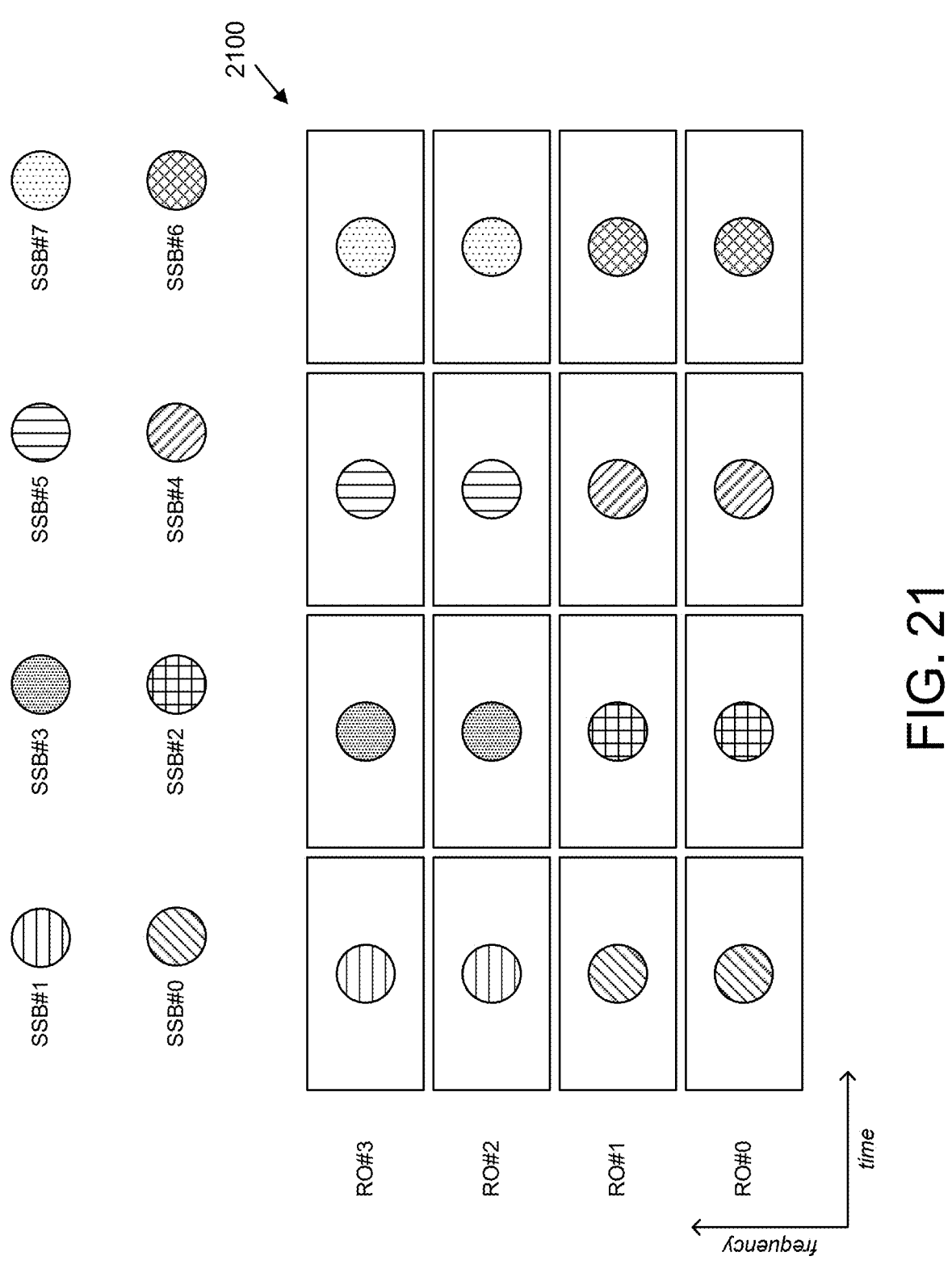
FIG. 21 illustrates an example of an SSB-to-RO mapping when one SSB is associated with two ROs in accordance with aspects of the present disclosure.

FIG. 21 illustrates an example of a first SSB-to-RO mapping 2100 when one SSB is associated with two ROs (i.e., ssb-perRACH-Occasion (N)=1/2) in accordance with aspects of the present disclosure. In the example of FIG. 21, it is assumed that msg1-FDM 4 and number of $$SSBs \ N_{TX}^{SSB} = 8.$$

Figure 22:
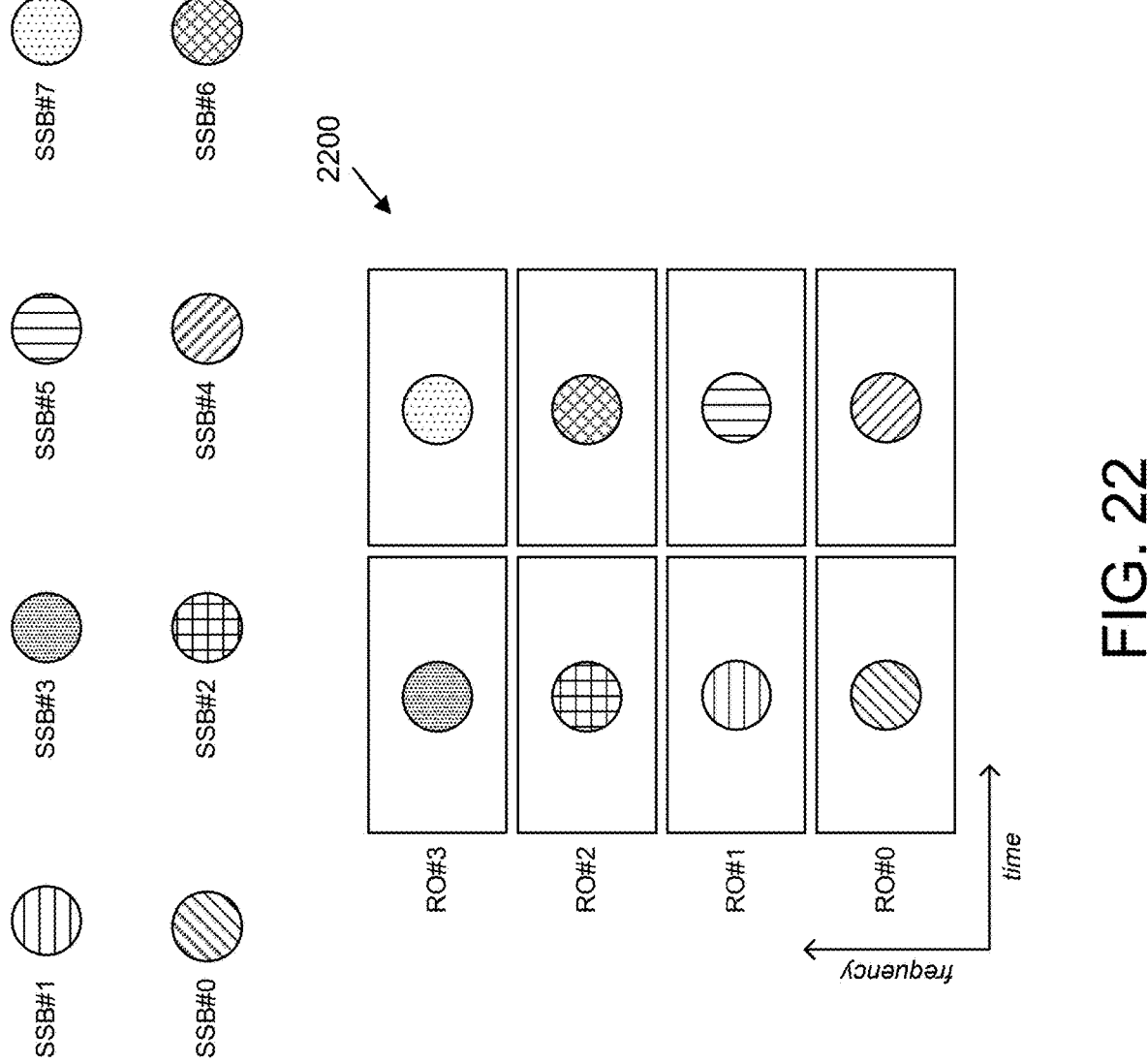
FIG. 22 illustrates an example of an SSB-to-RO mapping when one SSB is associated with one RO in accordance with aspects of the present disclosure.

FIG. 22 illustrates an example of a second SSB-to-RO mapping 2200 when one SSB is associated with one RO (i.e., ssb-perRACH-Occasion (N)=1) in accordance with aspects of the present disclosure. In the example of FIG. 22, it is assumed that msg1-FDM=4 and number of $$SSBs \ N_{TX}^{SSB} = 8.$$

Figure 23:
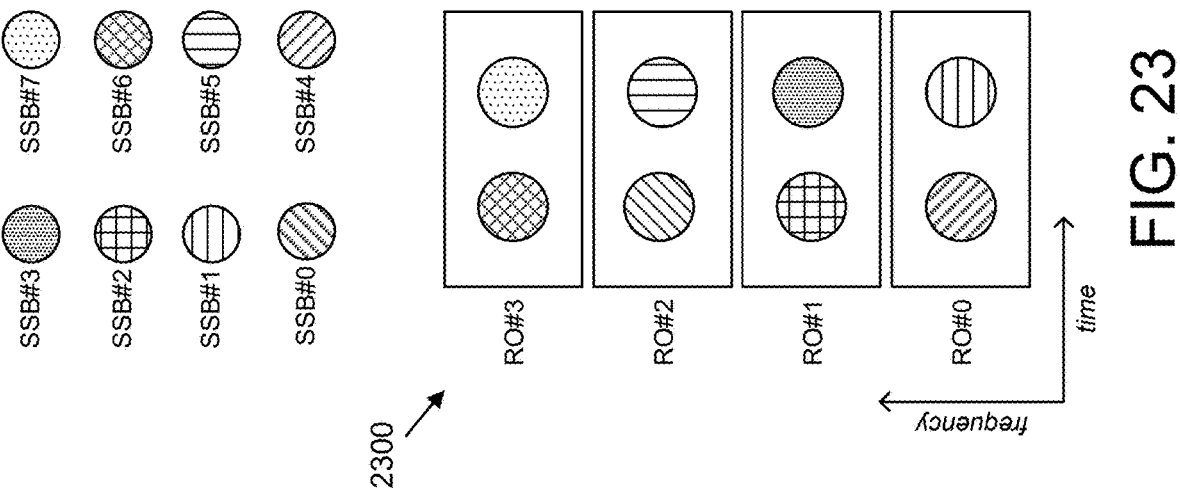
FIG. 23 illustrates an example of an SSB-to-RO mapping when two SSBs are associated with one RO in accordance with aspects of the present disclosure.

FIG. 23 illustrates an example of a third SSB-to-RO mapping 2300 when two SSBs are associated with one RO (i.e., ssb-perRACH-Occasion (N)=2) in accordance with aspects of the present disclosure. In the example of FIG. 23, it is assumed that msg1-FDM=4 and number of $$SSBs \ N_{TX}^{SSB} = 8.$$

Figure 24:
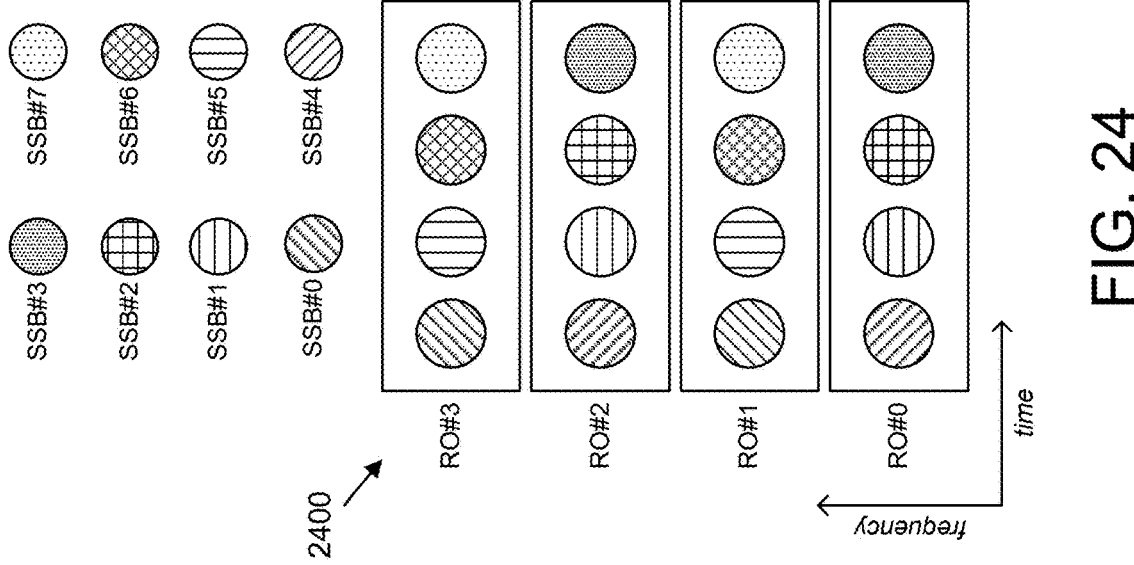
FIG. 24 illustrates an example of an SSB-to-RO mapping when four SSBs are associated with one RO in accordance with aspects of the present disclosure.

FIG. 24 illustrates an example of a fourth SSB-to-RO mapping 2400 when four SSBs are associated with one RO (i.e., ssb-perRACH-Occasion (N)=4) in accordance with aspects of the present disclosure. In the example of FIG. 24, it is assumed that msg1-FDM $$SSBs \ N_{TX}^{SSB} = 8.$$

From the above, it can be observed that if the system bandwidth B and the number of antenna array elements N increases largely, the beam gain of a frequency independent beam over a number of system subcarriers approaches zeros and the number of affected subcarriers increases with increasing B and N.

In some circumstances, DPP beamforming architectures can be used to counter such impact if the number of TD units is sufficiently large. Otherwise, the same impact can still be observed.

For example, with $f_c$=7.5 GHz, B=400 MHz, and N=1024, when K=4, it can be observed in FIG. 4 that the beam gain of DPP beam is a slightly better than the frequency independent beam, but still approaches zero over most of the subcarriers. However, increasing K to 64, the beam gain over all system subcarriers is above a desired threshold, e.g., 90% of ideal beam gain.

Increasing the number of TDs K increases the complexity and cost of the precoding architectures, which calls for a careful system design, where the following observations need to be considered when designing a system operation, e.g., a random-access operation for a system with a large frequency bandwidth B and number of antenna array elements N.

If the precoding architecture of a gNB has a single RF chain and a small number of TD units, a generated beam cannot cover the whole system frequency bandwidth. This means that a user with a BWP located outside the beam "frequency effective region" will suffer from the very low beam gain. Note that, in the current systems, where the frequency bandwidth B and the number of antenna array elements N are relatively small, a user can be called "out-of-beam-coverage" only if the beam direction does not match the "user location/channel". Differently, when frequency bandwidth B and the number of antenna array elements N are too large, a user can be called "out-of-beam-coverage" if the beam direction does not match the "user location/channel" AND its allocated BWP is outside the beam "frequency effective region".

A solution to this issue is to use a "beam-hopping" approach, or in other words, a "frequency beam sweeping" approach where the same beam is repeated over multiple "frequency regions" covering the total system bandwidth. Beam sweeping refers to the operation of covering a spatial area by transmitting via multiple beam each beam pointing in a different spatial direction, with beams transmitted and/or received during a time interval in a predetermined way.

If the precoding architecture of a gNB has multiple RF chains and a small number of TD units, multiple beams can be generated, either pointing to the same/different direction or covering the same/different frequency region.

This can be used to enable fast "beam-hopping" where multiple beam directions and/or frequency regions can be swept jointly.

If the precoding architecture of a gNB has multiple RF chains and a large number of TD units, the whole system bandwidth can be within a beam "frequency effective region" and multiple beams can be generated covering multiple directions, where each beam can be detected by any BWP. A BWP refers to a particular subset of the overall channel bandwidth within a carrier, allowing for flexible and efficient use of the frequency resources within the carrier. For example, the gNB may dynamically enable a respective BWP based on user demand and/or network conditions. In some examples, the BWP may consist of at least one DL BWP and at least one UL BWP.

A BWP is different than the frequency effective region, as the frequency effective region is based on the antenna design and precoding architecture of the gNB, while the BWP is a logical organization of the system bandwidth into subsections. However, in some embodiments, a respective BWP may coincide with a frequency effective region of a serving beam. In other embodiments, however, a respective frequency effective region may include more than one BWP. Conversely, a configured BWP may encompass more than one frequency effective region.

In some implementations, the gNB may configure a UE with a bandwidth part (BWP) for initial access to a cell. For initial access to the cell, the UE may be configured with a set of default parameters that defines the initial BWP, i.e., the BWP that the UE uses to perform initial access procedures, e.g., when entering a cell or transitioning to the RRC_Connected mode. Initial access procedures include, but are not limited to, cell search, synchronization, random access, and connection establishment. An initial BWP has index zero and is referred to as BWP #0. The initial BWP carries essential common channels and signals required for initial access, such as the physical downlink control channel (PDCCH), the physical downlink shared channel (PDSCH), the PRACH, and the SIBs.

During the initial access, the UE performs cell search based on a SSB composed of the PSS, the SSS, and the PBCH. To access the system, the UE needs to further read the SIB1, which carries important information including the initial DL/UL BWP configuration. The SIB1 is transmitted on the PDSCH, which is scheduled by downlink control information (DCI) on the PDCCH using the control resource set with index zero (CORESET #0). As used herein, the control resource set (CORESET) refers to the time-frequency resources within a bandwidth part (BWP) where the PDCCH can be located. A cell may have multiple CORESETs. In some examples, each CORESET may be defined by several parameters, including the number of OFDM symbols, the frequency domain location, and the time domain allocation.

According to aspects of a first embodiment, a network node, e.g., a gNB configures and signals a frequency regions configuration message, wherein the total carrier bandwidth is divided into R≥1 frequency effective regions, uniformly or non-uniformly, wherein each frequency region comprises one or more of: resource blocks (RBs) that are completely non-overlapped or partially overlapped. In some examples, the configuration message comprises one or more of: 1) the number of frequency effective regions R≥1; 2) the RB length of one or more regions; 3) the RB start of a reference region, e.g., lowest/first region or the RB start of one or more frequency regions; 4) a bitmap indicating symbols/slots/subframes/frames wherein the frequency divisions are applied; 5) a time periodicity; 6) a time behavior (e.g., semi-static, periodic, aperiodic); or some combination thereof.

In some implementations of the first embodiment, the number of frequency effective regions R depends on the width of a beam "frequency effective region" (here, the beam "width" is expressed in terms of number of SC/RBs), wherein the beam gain for all subcarriers within the beam "frequency effective region" is above a desired threshold (e.g., above 90% of ideal beam gain) and wherein the beam is generated by maximizing the beam gain for all subcarriers within the frequency effective region, e.g., by considering the region's "central frequency".

Therefore, for a given total carrier bandwidth $$B^c_{RBs}$$

and a width of a beam "frequency effective region"

$$B^r_{RBs},$$

the number of frequency effective regions that are required to cover the total carrier bandwidth are given as $$X = \left\lceil \frac{B^c_{RBs}}{B^r_{RBs}} \right\rceil.$$

For example, if the width of a beam "frequency effective region" is 6 RBs and the total carrier bandwidth has 20 RBs, then $$X = \left\lceil \frac{20}{6} \right\rceil = 4.$$

Figures 25, 28:
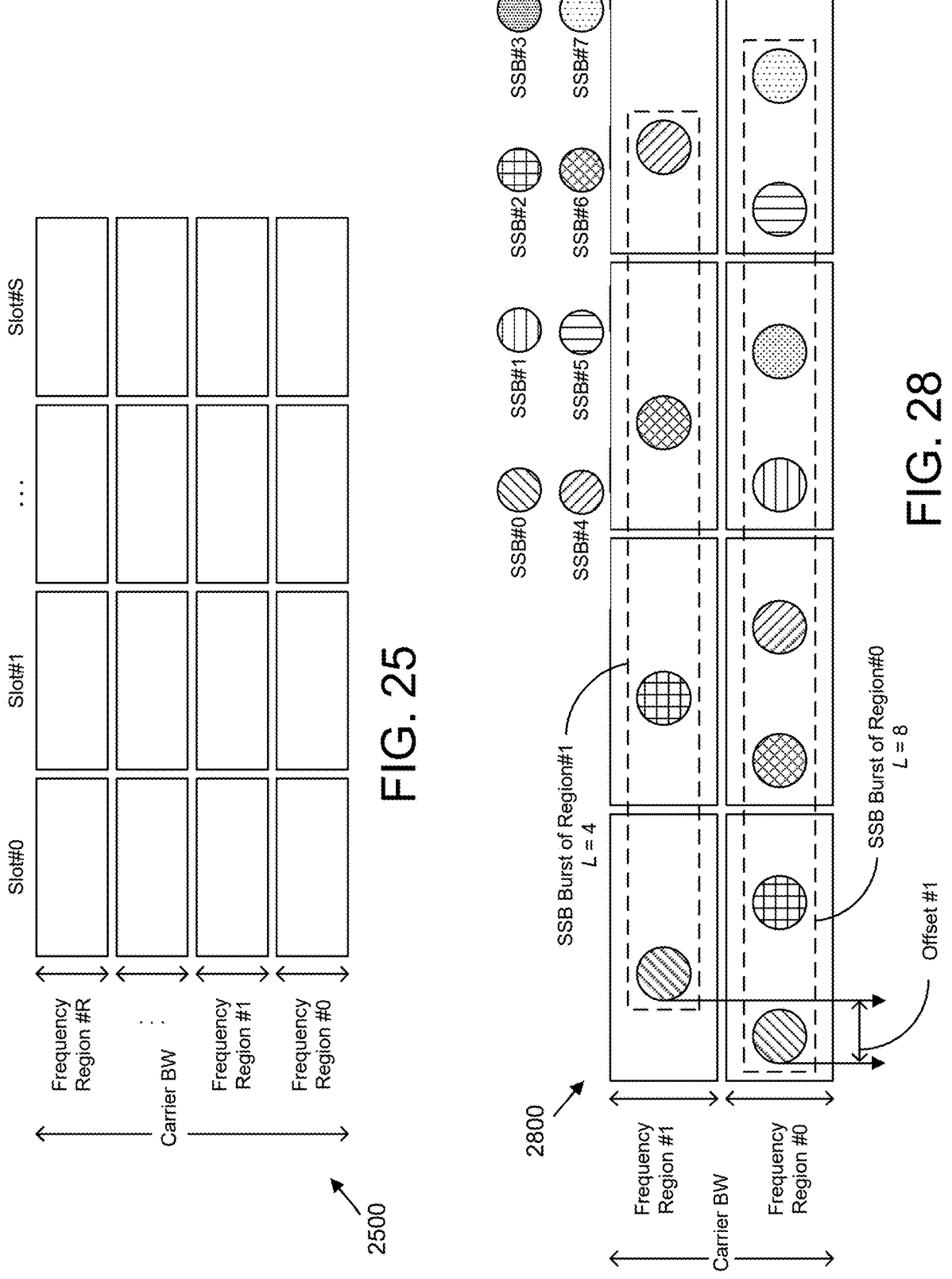
FIG. 25 illustrates an example of a carrier bandwidth divided into multiple beam frequency effective regions in accordance with aspects of the present disclosure.
FIG. 28 illustrates an example of different SSB patterns for different SSB bursts and multiple beam frequency effective regions in accordance with aspects of the present disclosure.

FIG. 25 illustrates an example of a carrier bandwidth divided into multiple beam frequency effective regions in accordance with aspects of the present disclosure. In the example of FIG. 25, the carrier bandwidth 2500 is divided into R frequency effective regions over S slots.

During the DL synchronization process, according to an embodiment, the gNB may configure and transmit an R SSB Bursts with a predefined or a configured SSB beam pattern, one SSB Burst per configured beam frequency effective region, where all the R SSB Bursts has L SSBs.

Figure 26:
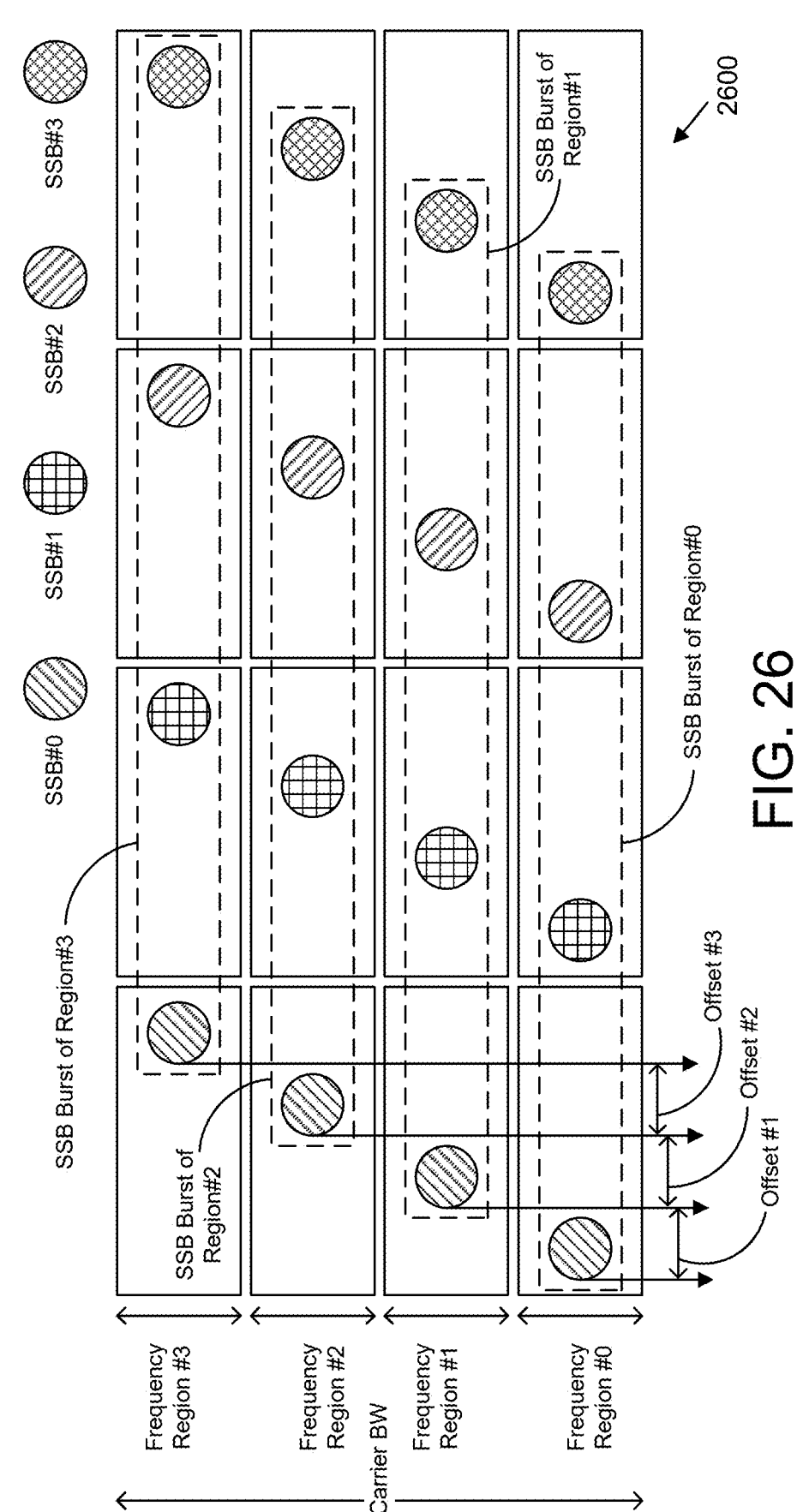
FIG. 26 illustrates an example of an SSB pattern for multiple SSB bursts and multiple beam frequency effective regions in accordance with aspects of the present disclosure.

FIG. 26 illustrates an example of an SSB pattern for multiple SSB bursts and multiple beam frequency effective regions in accordance with aspects of the present disclosure. In the example of FIG. 26, the SSB pattern comprises a non-interleaved SSB pattern 2600 for the SSB bursts and beam frequency effective regions. The base station (e.g., gNB) transmits one SSB Burst per Frequency effective region, wherein all regions have L SSBs. In certain embodiments, the base station uses a beam sweeping procedure to transmit the multiple SSB burst according to the SSB pattern.

Figure 27:
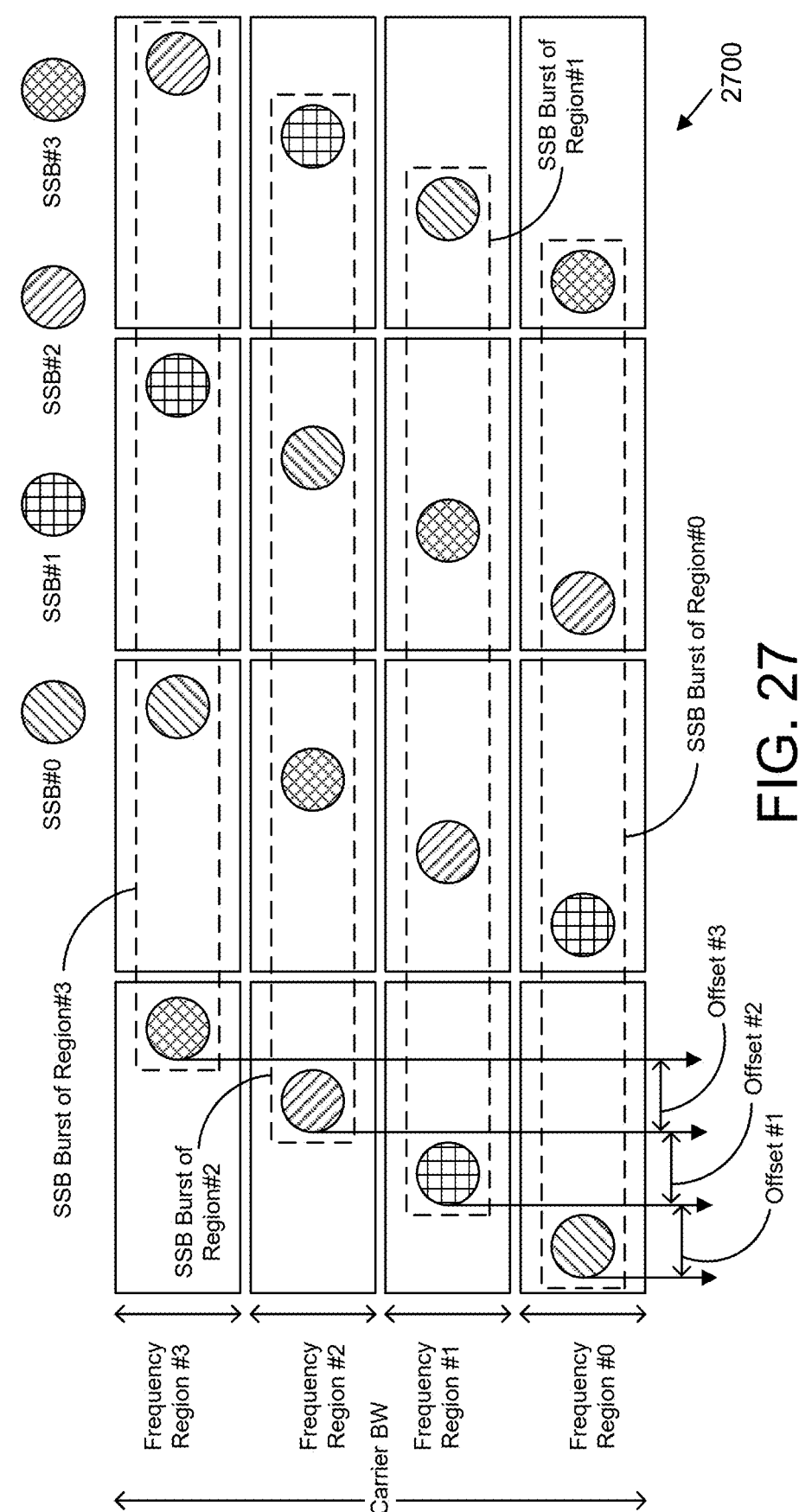
FIG. 27 illustrates another example of an SSB pattern for multiple SSB bursts and multiple beam frequency effective regions in accordance with aspects of the present disclosure.

FIG. 27 illustrates another example of an SSB pattern for multiple SSB bursts and multiple beam frequency effective regions in accordance with aspects of the present disclosure. In the example of FIG. 27, the SSB pattern comprises an interleaved SSB pattern 2700 for the SSB bursts and beam frequency effective regions. The base station (e.g., gNB) transmits one SSB Burst per Frequency effective region, wherein all regions have L SSBs. In certain embodiments, the base station uses a beam sweeping procedure to transmit the multiple SSB burst according to the SSB pattern. For example, the base station may transmit the same SSB using the same spatial filter within one or more ROs before transmitting a different (e.g., next) SSB during a different set of ROs.

In some implementations, the start symbols of one or more of SSB bursts of the beam frequency effective regions other than Region #0 are shifted relative to the start symbols of SSB burst of Region #0, as noted by Offset #1, . . . Offset #R in the examples of FIGS. 26-27. Accordingly, the Region #0 may be a reference region in the examples of FIGS. 26-27, such that other beam frequency effective regions may be described relative to Region #0.

In some implementations, the offset values are configured per SCS and carrier frequency, e.g., by updating the determination equations used to determine starting symbols and number of SSBs.

In some implementations, the offset values are indicated within, e.g., the SIB1 configuration message or an RRC configuration message or a DCI message.

In some implementations, the offset values are determined using a combination of the above options, e.g., by updating the determination equations used to determine starting symbols and number of SSBs, and indicated within, e.g., the SIB1 configuration message or an RRC configuration message or a DCI message.

Note that an offset value can shift the start symbols of an SSB burst to start before (i.e., negative shift), same as (i.e., zero shift), or after (i.e., positive shift) the start symbols of the SSB burst of Region #0. Here, the Region #0 functions as a reference region (i.e., other beam frequency effective regions can be described with differential characteristics (e.g., center subcarrier) relative to those defined for Region #0). Moreover, the SSB burst in Region #0 functions as a reference SSB burst, meaning other SSB bursts can be described with differential characteristics (e.g., start symbol, frequency resource, etc.) relative to these defined for the reference SSB burst in Region #0. Also, note that the Reference Region #0 is used here as an example. Other reference region or reference frequency point can also be used, e.g., Point A.

Further note that it is possible that two or more SSBs are transmitted at the same time (i.e., zero shift case so that all have the same start symbol, but different frequency resources/regions), which depends on the gNB capability, e.g., having two or more RF chains or by utilizing the beam split approach.

In some implementations, the transmitted or muted SSBs within each region are indicated within the configuration message, e.g., by providing a different bitmap for each region. In some other examples, if only one bitmap is provided, the bitmap applies for all regions.

In some implementations, the gNB configures and transmits SSB Bursts on one or more of selected regions, as indicated by the configuration message via, e.g., a bitmap.

In some implementations, all the R SSB Bursts have the same time periodicity. In some other examples, the periodicity of one or more SSB Bursts are indicated separately, e.g., by the configuration message.

In some implementations, one or more of transmitted SSBs within an SSB Burst or an SSB Burst of a frequency region are Cell-Defining SSBs (CD-SSBs) and others transmitted SSBs are None-Cell-Defining SSBs (NCD-SSBs).

As used herein, a CD-SSB is an SSB where its associated MIB carries information of the scheduled SIB1, which contains initial access information related to the cell. For example, a CD-SSB may have a CORESET #0 transmission associated with it and hence contain required minimum system information blocks, including SIB 1. In contrast, an NCD-SSB, as used herein, is an SSB that is not associated with any SIB1, meaning there is no CORESET #0 associated with it and hence there is no required minimum system information blocks (e.g., no SIB1).

According to a second embodiment, the gNB may configure and transmit an R SSB Bursts with a predefined or a configured SSB beam pattern, one SSB Burst per configured beam frequency effective region, where the rth SSB Burst of the rth Region has $L_r$ SSBs. In some examples, the number of SSBs per region $L_r$ is indicated within the configuration message, e.g., the SIB1 configuration message or an RRC configuration message.

FIG. 28 illustrates an example of different SSB patterns 2800 for different SSB bursts and multiple beam frequency effective regions in accordance with aspects of the present disclosure. The base station (e.g., gNB) transmits one SSB Burst per Frequency effective region, wherein the rth region has $L_r$ SSBs. The SSB burst of Region #0 has 8 SSBs (i.e., $L_0$=8), while the SSB burst of Region #1 has 4 SSBs (i.e., $L_1$=4). In certain embodiments, the base station uses a beam sweeping procedure to transmit the multiple SSB burst according to the SSB pattern.

In some implementations, the start symbols of one or more of SSB bursts of the beam frequency effective regions other than Region #0 are shifted relative to the start symbols of SSB burst of Region #0, as noted by Offset #1 in the example of FIG. 28.

As described above, during the UL Sync phase, a transmitted Msg1 PRACH needs to indicate, jointly, a selected SSB and a selected frequency region. Because the legacy RACH configuration is able to indicate only the selected SSB, in various embodiments the RACH configuration may be enhanced as follows:

According to aspects of a third embodiment, during the UL synchronization step, the UE receives a RACH configuration message, e.g., via SIB1 signaling and/or via a dedicated RRC/DCI signaling, wherein the configuration message indicates one or more of: 1) a PRACH configuration index, 2) a msg1-FDM, 3) a msg1-FrequencyStart, 4) a ssb-perRACH-OccasionAndCB-PreamblesPerSSB.

In certain implementations of the third embodiment, the provided RACH configuration message is intended for all R regions.

In some examples, the preamble index set of an SSB is divided into R subsets, equally or as indicated by the configuration message, so that a UE can jointly indicate a selected SSB and a selected Region by selecting a preamble index belonging to the corresponding preamble index subset. The SSB-to-RO mapping may be as described above, e.g., with reference to FIGS. 21-24. In certain implementations, legacy SSB-to-RO mapping rules can be used.

Figure 29:
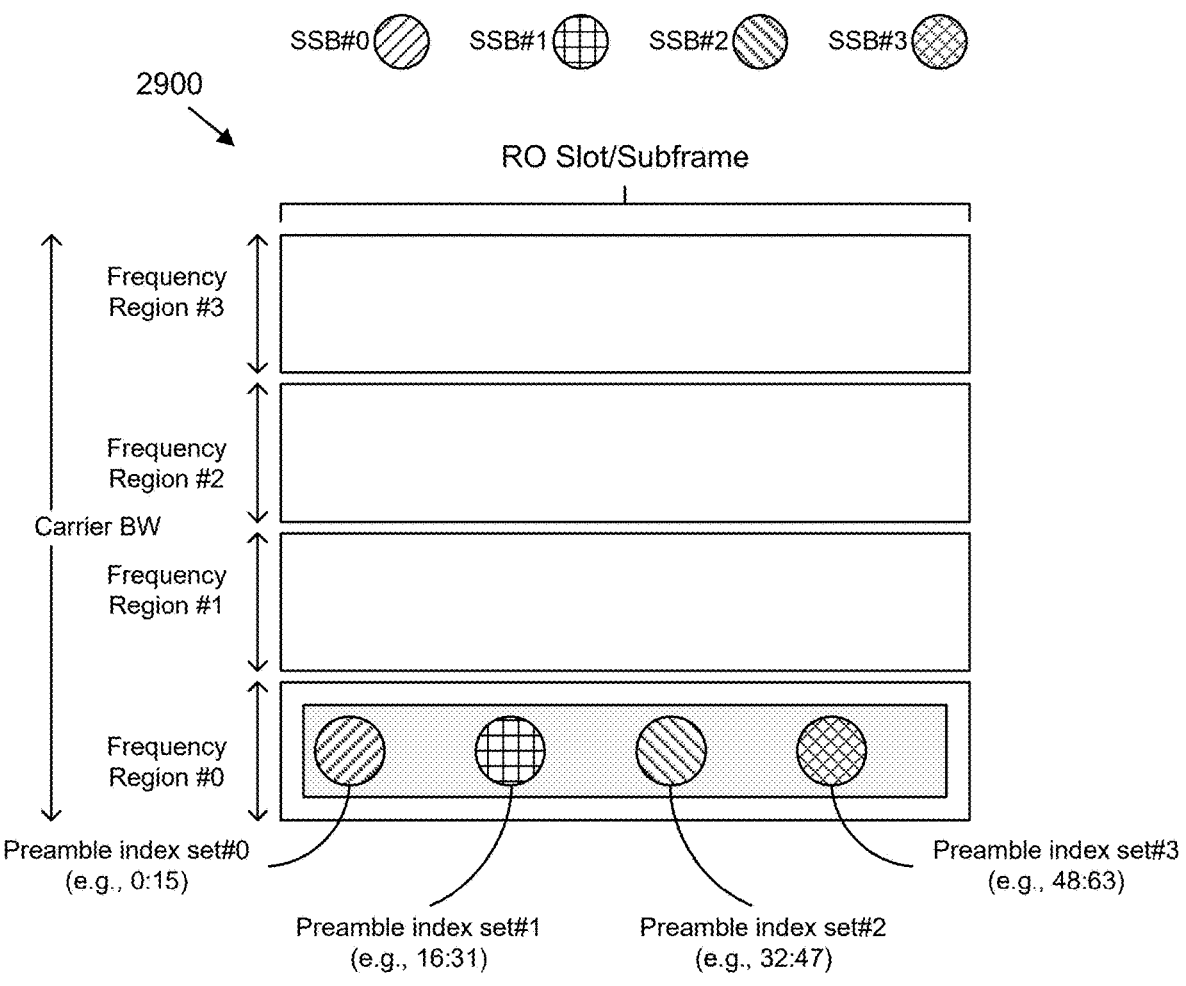
FIG. 29 illustrates an example of mapping preamble indices to different SSBs and beam frequency effective regions in accordance with aspects of the present disclosure.

FIG. 29 illustrates an example of mapping preamble indices to different SSBs and beam frequency effective regions in accordance with aspects of the present disclosure. In the example of FIG. 29, the ssb-perRACH-Occasion (N)=4, and the msg1-FDM=1. The RO 2900 represents a valid RO slot/subframe, wherein a RACH message is received from a UE, e.g., in Region #0. In one embodiment, the RO 2900 corresponds to an SSB pattern for the SSB bursts and beam frequency effective regions SSB burst, such as the non-interleaved SSB pattern 2600 described above, wherein each SSB burst corresponds to a particular beam frequency effective region with different SSBs transmitted in different slots.

In some embodiments, the configured 64 preamble indices may be divided into 4 preamble index set, each preamble index set corresponding to an SSB. For example, the preamble index set {0:15} may correspond to SSB #0, the preamble index set {16:31} may correspond to SSB #1, the preamble index set {32:47} may correspond to SSB #2, and the preamble index set {48:63} may correspond to SSB #3. Moreover, each preamble index set may be organized into multiple subsets based on the beam frequency effective regions. For example, the preamble index subset {0:3} may correspond to Region #0, the preamble index subset {4:7} may correspond to Region #1, the preamble index subset {8:11} may correspond to Region #2, and the preamble index subset {12:15} may correspond to Region #3.

In some other examples, the parameters msg1-FDM and msg1-FrequencyStart indicated in a RACH-ConfigGeneric IE are reinterpreted as follows: 1) msg1-FDM may be reinterpreted as the number of PRACH transmission occasions FDMed in one time instance in one beam frequency effective region; and 2) msg1-FrequencyStart may be reinterpreted as the offset of lowest PRACH transmission occasion in frequency domain with respective to first PRBO of the corresponding beam frequency effective region.

In such implementations, the SSB-to-RO mapping is performed separately for each ROs group within a beam frequency effective region. In this case, a UE can jointly indicate a selected SSB and a selected beam frequency effective region by selecting a preamble index belonging to the SSB and by transmitting a PRACH on a RO within the selected region. In certain embodiments, this implementation may involve enhancements to the legacy SSB-to-RO mapping rules.

Figure 30:
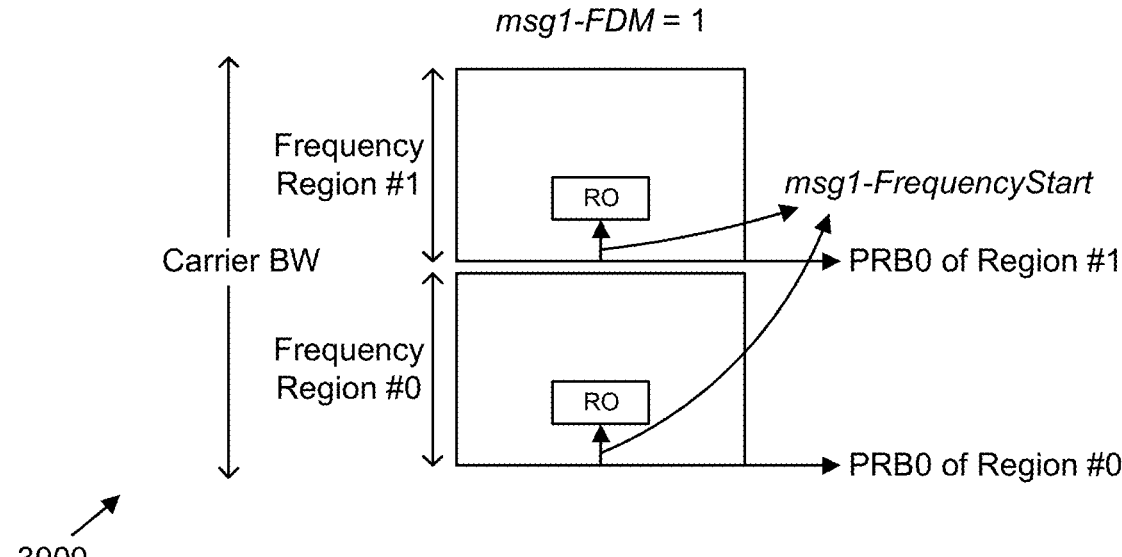
FIG. 30 illustrates an example of valid ROs per beam frequency effective regions in accordance with aspects of the present disclosure.

FIG. 30 illustrates an example of valid ROs per beam frequency effective regions in accordance with aspects of the present disclosure. In the example of FIG. 30 an exemplary configuration 3000 indicates the valid ROs per beam frequency effective regions. In some examples, a RO is considered invalid if its frequency resources overlap outside the frequency resources of the corresponding beam frequency effective region. In the depicted embodiment, the msg1-FDM may indicate that the number of PRACH transmission occasions FDMed in one time instance in one Region is 1. As described above, the parameter msg1-FrequencyStart, may indicate that the offset of lowest PRACH transmission occasion in frequency domain with respective to first PRBO of the corresponding Region.

Figure 31:
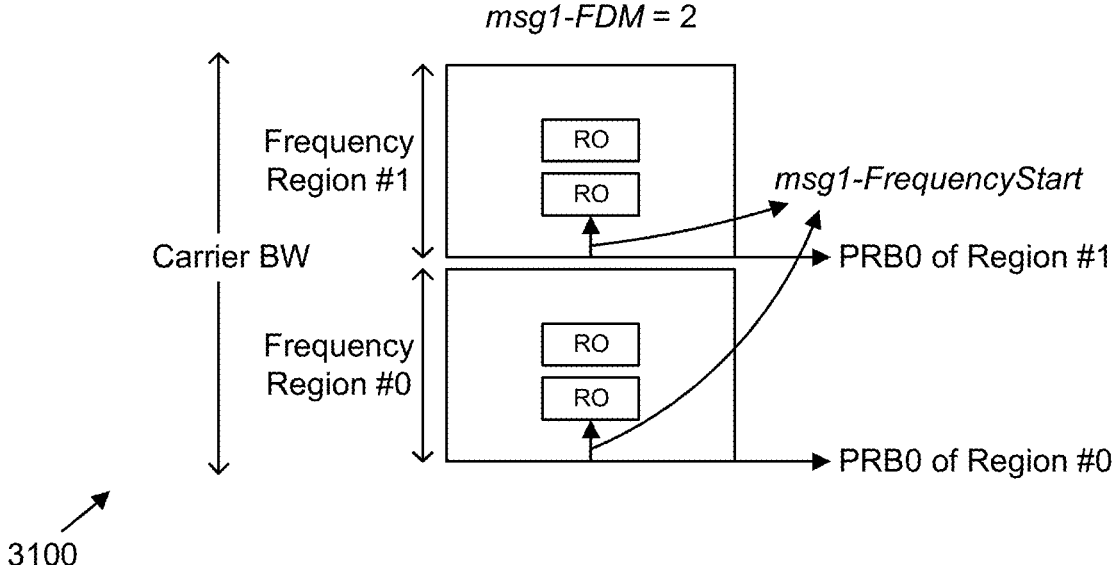
FIG. 31 illustrates another example of valid ROs per beam frequency effective regions in accordance with aspects of the present disclosure.

FIG. 31 illustrates another exemplary configuration 3100 of valid ROs per beam frequency effective regions in accordance with aspects of the present disclosure. In some examples, a RO is considered invalid if its frequency resources overlap outside the frequency resources of the corresponding beam frequency effective region. In the depicted embodiment, the msg1-FDM may indicate that the number of PRACH transmission occasions FDMed in one time instance in one Region is 2. As described above, the parameter msg1-FrequencyStart, may indicate that the offset of lowest PRACH transmission occasion in frequency domain with respective to first PRB0 of the corresponding Region.

In other implementations of the third embodiment, the UE receives a RACH configuration message comprising R RACH sub-configurations, one for each region. In some examples, the indicated R sub configurations are independent from each other, i.e., each sub configuration comprise, at least, one or more of: 1) a PRACH configuration index, 2) a msg1-FDM, 3) a msg1-FrequencyStart, and 4) a ssb-perRACH-OccasionAndCB-PreamblesPerSSB.

In some other examples, one sub-configuration indicates the common configurations, while one or more of the other sub-configurations indicate only the dedicated configuration. For example, subConfig #0 is the common one and has 1) PRACH configuration index=118; 2) msg1-FDM=2; 3) msg1-FrequencyStart=10; and 4) ssb-perRACH-OccasionAndCB-PreamblesPerSSB=1, while subConfig #1 inherits the common configuration and only has msg1-FDM=4 as the dedicated configuration (i.e., that overrides the common configuration). Accordingly, for subConfig #1, the parameter msg1-FrequencyStart is equal to that indicated by subConfig #0, and so on. In certain embodiments, these implementations may require an extension and/or change to RACH configuration signaling.

Note that this disclosure is not limited to any single embodiment and/or implementation elements individually, and one or more elements from one or more implementations and/or embodiments may be combined to construct a new embodiment.

Figure 32:
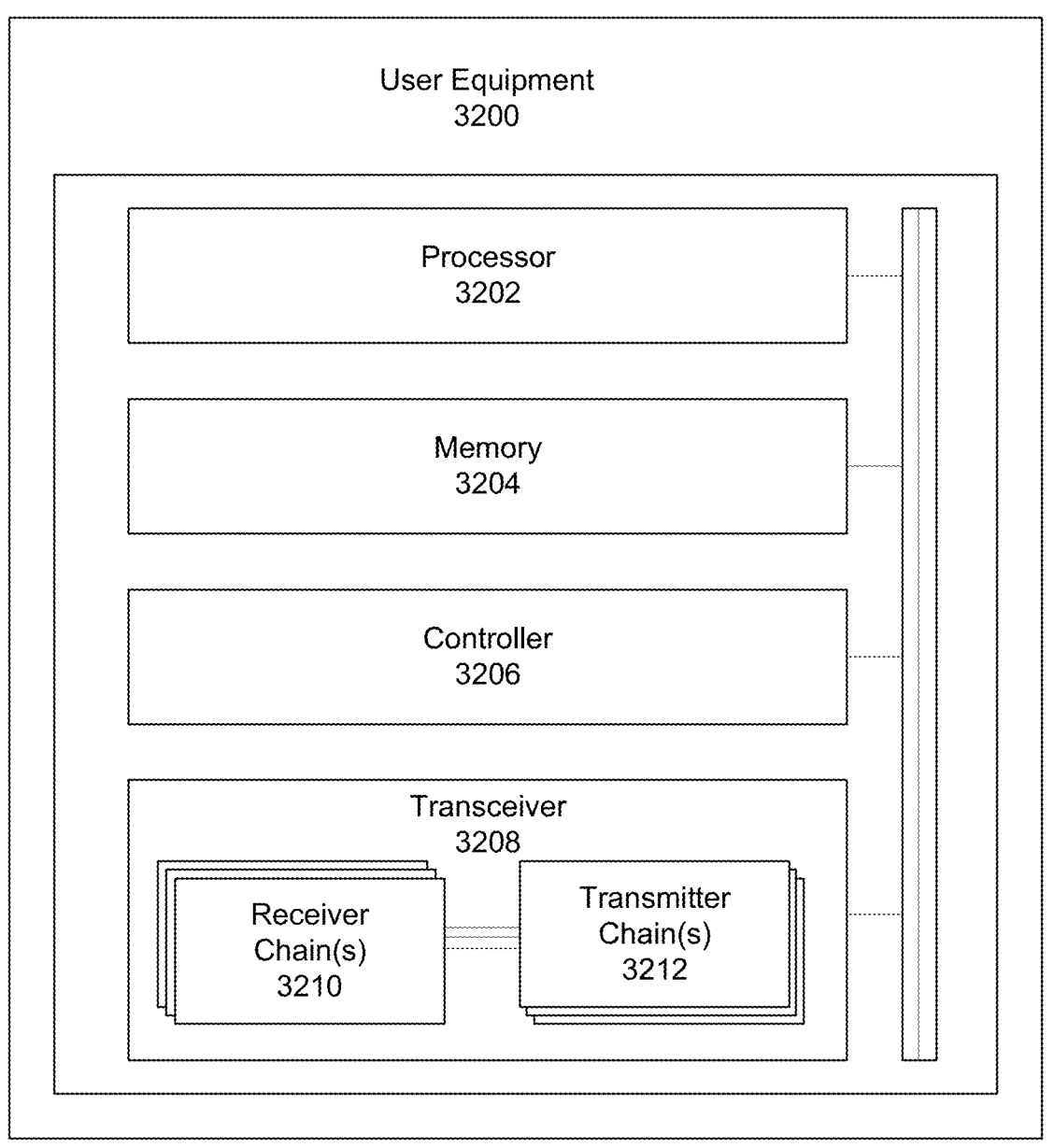
FIG. 32 illustrates an example of a UE in accordance with aspects of the present disclosure.

FIG. 32 illustrates an example of a UE 3200 in accordance with aspects of the present disclosure. The UE 3200 may include a processor 3202, a memory 3204, a controller 3206, and a transceiver 3208. The processor 3202, the memory 3204, the controller 3206, or the transceiver 3208, or various combinations thereof or various components thereof may be examples of means for performing various aspects of the present disclosure as described herein. These components may be coupled (e.g., operatively, communicatively, functionally, electronically, electrically) via one or more interfaces.

The processor 3202, the memory 3204, the controller 3206, or the transceiver 3208, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 3202 may include an intelligent hardware device (e.g., a general-purpose processor, a DSP, a central processing unit (CPU), an ASIC, a field programmable gate array (FPGA), or any combination thereof). In some implementations, the processor 3202 may be configured to operate the memory 3204. In some other implementations, the memory 3204 may be integrated into the processor 3202. The processor 3202 may be configured to execute computer-readable instructions stored in the memory 3204 to cause the UE 3200 to perform various functions of the present disclosure.

The memory 3204 may include volatile or non-volatile memory. The memory 3204 may store computer-readable, computer-executable code including instructions that, when executed by the processor 3202, cause the UE 3200 to perform various functions described herein. The code may be stored in a non-transitory computer-readable medium such the memory 3204 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 3202 and the memory 3204 coupled with the processor 3202 may be configured to cause the UE 3200 to perform one or more of the UE functions described herein (e.g., executing, by the processor 3202, instructions stored in the memory 3204). Accordingly, the processor 3202 may support wireless communication at the UE 3200 in accordance with examples as disclosed herein.

The controller 3206 may manage input and output signals for the UE 3200. The controller 3206 may also manage peripherals not integrated into the UE 3200. In some implementations, the controller 3206 may utilize an operating system (OS) such as iOS®, ANDROID®, WINDOWS®, or other operating systems. In some implementations, the controller 3206 may be implemented as part of the processor 3202.

In some implementations, the UE 3200 may include at least one transceiver 3208. In some other implementations, the UE 3200 may have more than one transceiver 3208. The transceiver 3208 may represent a wireless transceiver. The transceiver 3208 may include one or more receiver chains 3210, one or more transmitter chains 3212, or a combination thereof.

A receiver chain 3210 may be configured to receive signals (e.g., control information, data, packets) over a wireless medium. For example, the receiver chain 3210 may include one or more antennas for receiving the signal over the air or wireless medium. The receiver chain 3210 may include at least one amplifier (e.g., a low-noise amplifier (LNA)) configured to amplify the received signal. The receiver chain 3210 may include at least one demodulator configured to demodulate the received signal and obtain the transmitted data by reversing the modulation technique applied during transmission of the signal. The receiver chain 3210 may include at least one decoder for decoding/processing the demodulated signal to receive the transmitted data.

A transmitter chain 3212 may be configured to generate and transmit signals (e.g., control information, data, packets). The transmitter chain 3212 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 3212 may also include at least one power amplifier configured to amplify the modulated signal to an appropriate power level suitable for transmission over the wireless medium. The transmitter chain 3212 may also include one or more antennas for transmitting the amplified signal into the air or wireless medium.

Figure 33:
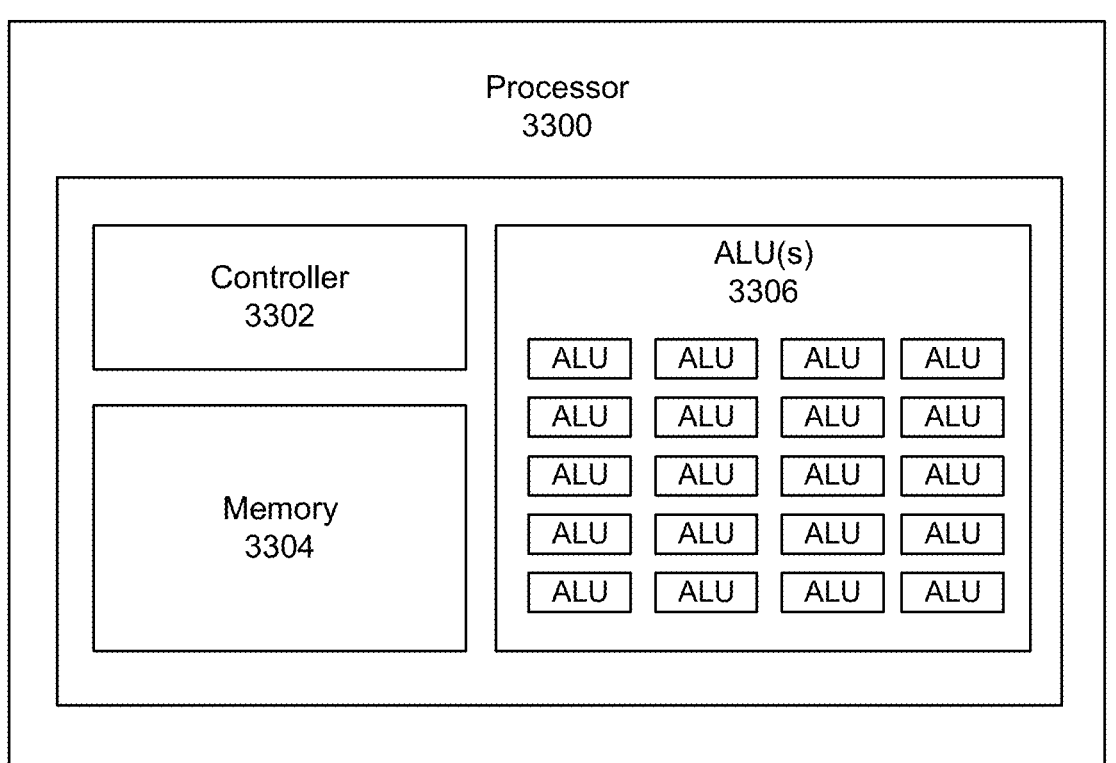
FIG. 33 illustrates an example of a processor in accordance with aspects of the present disclosure.

FIG. 33 illustrates an example of a processor 3300 in accordance with aspects of the present disclosure. The processor 3300 may be an example of a processor configured to perform various operations in accordance with examples as described herein. The processor 3300 may include a controller 3302 configured to perform various operations in accordance with examples as described herein. The processor 3300 may optionally include at least one memory 3304, which may be, for example, an L1/L2/L3 cache. Additionally, or alternatively, the processor 3300 may optionally include one or more arithmetic-logic units (ALUs) 3306. One or more of these components may be in electronic communication or otherwise coupled (e.g., operatively, communicatively, functionally, electronically, electrically) via one or more interfaces (e.g., buses).

The processor 3300 may be a processor chipset and include a protocol stack (e.g., a software stack) executed by the processor chipset to perform various operations (e.g., receiving, obtaining, retrieving, transmitting, outputting, forwarding, storing, determining, identifying, accessing, writing, reading) in accordance with examples as described herein. The processor chipset may include one or more cores, one or more caches (e.g., memory local to or included in the processor chipset (e.g., the processor 3300) or other memory (e.g., random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), and others).

The controller 3302 may be configured to manage and coordinate various operations (e.g., signaling, receiving, obtaining, retrieving, transmitting, outputting, forwarding, storing, determining, identifying, accessing, writing, reading) of the processor 3300 to cause the processor 3300 to support various operations in accordance with examples as described herein. For example, the controller 3302 may operate as a control unit of the processor 3300, generating control signals that manage the operation of various components of the processor 3300. These control signals include enabling or disabling functional units, selecting data paths, initiating memory access, and coordinating timing of operations.

The controller 3302 may be configured to fetch (e.g., obtain, retrieve, receive) instructions from the memory 3304 and determine subsequent instruction(s) to be executed to cause the processor 3300 to support various operations in accordance with examples as described herein. The controller 3302 may be configured to track memory address of instructions associated with the memory 3304. The controller 3302 may be configured to decode instructions to determine the operation to be performed and the operands involved. For example, the controller 3302 may be configured to interpret the instruction and determine control signals to be output to other components of the processor 3300 to cause the processor 3300 to support various operations in accordance with examples as described herein. Additionally, or alternatively, the controller 3302 may be configured to manage flow of data within the processor 3300. The controller 3302 may be configured to control transfer of data between registers, arithmetic logic units (ALUs), and other functional units of the processor 3300.

The memory 3304 may include one or more caches (e.g., memory local to or included in the processor 3300 or other memory, such RAM, ROM, DRAM, SDRAM, SRAM, MRAM, flash memory, etc. In some implementations, the memory 3304 may reside within or on a processor chipset (e.g., local to the processor 3300). In some other implementations, the memory 3304 may reside external to the processor chipset (e.g., remote to the processor 3300).

The memory 3304 may store computer-readable, computer-executable code including instructions that, when executed by the processor 3300, cause the processor 3300 to perform various functions described herein. The code may be stored in a non-transitory computer-readable medium such as system memory or another type of memory. The controller 3302 and/or the processor 3300 may be configured to execute computer-readable instructions stored in the memory 3304 to cause the processor 3300 to perform various functions. For example, the processor 3300 and/or the controller 3302 may be coupled with or to the memory 3304, the processor 3300, the controller 3302, and the memory 3304 may be configured to perform various functions described herein. In some examples, the processor 3300 may include multiple processors and the memory 3304 may include multiple memories. One or more of the multiple processors may be coupled with one or more of the multiple memories, which may, individually or collectively, be configured to perform various functions herein.

The one or more ALUs 3306 may be configured to support various operations in accordance with examples as described herein. In some implementations, the one or more ALUs 3306 may reside within or on a processor chipset (e.g., the processor 3300). In some other implementations, the one or more ALUs 3306 may reside external to the processor chipset (e.g., the processor 3300). One or more ALUs 3306 may perform one or more computations such as addition, subtraction, multiplication, and division on data. For example, one or more ALUs 3306 may receive input operands and an operation code, which determines an operation to be executed. One or more ALUs 3306 be configured with a variety of logical and arithmetic circuits, including adders, subtractors, shifters, and logic gates, to process and manipulate the data according to the operation. Additionally, or alternatively, the one or more ALUs 3306 may support logical operations such as AND, OR, exclusive-OR (XOR), not-OR (NOR), and not-AND (NAND), enabling the one or more ALUs 3306 to handle conditional operations, comparisons, and bitwise operations.

In various implementations, the processor 3300 may support the functions of a base station, in accordance with examples as disclosed herein. For example, the processor 3300 may be configured to support a means for transmitting a plurality of SSB bursts within each beam frequency effective region of a plurality of beam frequency effective regions within a carrier frequency BW and in accordance with a frequency region configuration. In such implementations, each SSB burst comprises a plurality of SSBs, where the number of the plurality of beam frequency effective regions is based at least in part on a width of each beam frequency effective region.

The processor 3300 may be configured to support a means for associating a respective RO (e.g., PRACH resource occasion within the RO) with each beam frequency effective region of an SSB transmission based at least in part on the frequency region configuration. The processor 3300 may be configured to support a means for receiving a PRACH transmission from a UE, e.g., during an RO.

The processor 3300 may be configured to support a means for determining a respective beam frequency effective region corresponding to the UE (e.g., and, optionally, a corresponding SSB index) based on a PRACH configuration (and/or RACH configuration) and the PRACH transmission. The processor 3300 may be configured to support a means for establishing a connection with the UE using resources associated with the respective beam frequency effective region (e.g., a UE-selected frequency effective region corresponding to an optimal beam). For example, the processor 3300 may schedule subsequent communications via subcarriers within the respective beam frequency effective region. As another example, the processor 3300 may allocate one or more UL resources within the respective beam frequency effective region. The processor 3300 may associate the UE with the respective beam frequency effective region until another beam frequency effective region becomes optimal, e.g., due to changes in the UE's position or environment.

In some embodiments, the frequency region configuration indicates: A) a number of beam frequency effective regions; B) a RB length of one or more beam frequency effective regions; C) an RB start of a lowest-indexed beam frequency effective region; D) an RB start of a first beam frequency effective region; E) an RB start of each beam frequency effective region; F) a periodicity of the plurality of beam frequency effective regions; G) a semi-static, periodic, or aperiodic pattern (e.g., time domain behavior) of the plurality of beam frequency effective regions; or a combination thereof.

In some embodiments, the frequency region configuration indicates a first set of CD-SSBs and a second set of NCD-SSBs. In one embodiment, the plurality of beam frequency effective regions comprises non-overlapping frequency regions. In another embodiment, the plurality of beam frequency effective regions comprises one or more partially overlapping frequency regions.

In some embodiments, the processor 3300 is configured to transmit an SSB burst of the plurality of SSB bursts for each beam frequency effective region in the carrier frequency BW and based at least in part on a time shift from a reference SSB burst or a frequency shift from the reference SSB burst, or a combination thereof.

In some embodiments, a respective SSB of an SSB burst is associated with a plurality of PRACH resource occasions within a corresponding RO, where each PRACH resource occasion comprises a plurality of time-frequency resource subsets and/or PRACH preamble subsets, and where each time-frequency resource subset and/or PRACH preamble subset is associated with a configured beam frequency effective region. In some embodiments, the processor 3300 is configured to separately configure (e.g., indicate or broadcast to a UE) a respective SSB-to-RO mapping for each SSB burst and RO within each beam frequency effective region.

In some embodiments, the frequency region configuration indicates an SSB transmission pattern associated with one or more of: A) a time periodicity, a number of SSBs; B) a number of simultaneously transmitted SSBs; C) a time-frequency resources of one or more of SSBs; D) a frequency offset of an SSB to a reference subcarrier, or reference RB, or a reference SSB; E) a time gap between two adjacent SSBs; F) a frequency domain bitmap indicator for transmitted SSBs, or muted SSBs, or both; G) a time domain bitmap indicator for transmitted SSBs, or muted SSBs, or both; or a combination thereof.

In certain embodiments, the processor 3300 is configured to transmit the plurality of SSB bursts according to a sweeping pattern (i.e., a pattern for beam sweeping or beam hopping) for the plurality of beam frequency effective regions, where the sweeping pattern repeats the same SSB transmission using the same spatial filter within a one or more ROs prior to different SSB transmissions during different ROs.

In certain embodiments, the sweeping pattern comprises an interleaved pattern of the plurality of beam frequency effective regions and configured SSB bursts. In certain embodiments, the SSB transmission pattern indicates a transmission of a same SSB over two or more beam frequency effective regions at the same time.

In some embodiments, a respective beam frequency effective region corresponds to an antenna panel with an array of antenna elements. In such embodiments, the respective beam frequency effective region comprises a plurality of subcarriers having an array beam gain that satisfies a beam gain threshold. In certain embodiments, a precoder for the antenna panel (e.g., precoding architecture) comprises multiple RF chains and a number of TD units insufficient to satisfy the beam gain threshold over the carrier frequency BW.

Figure 34:
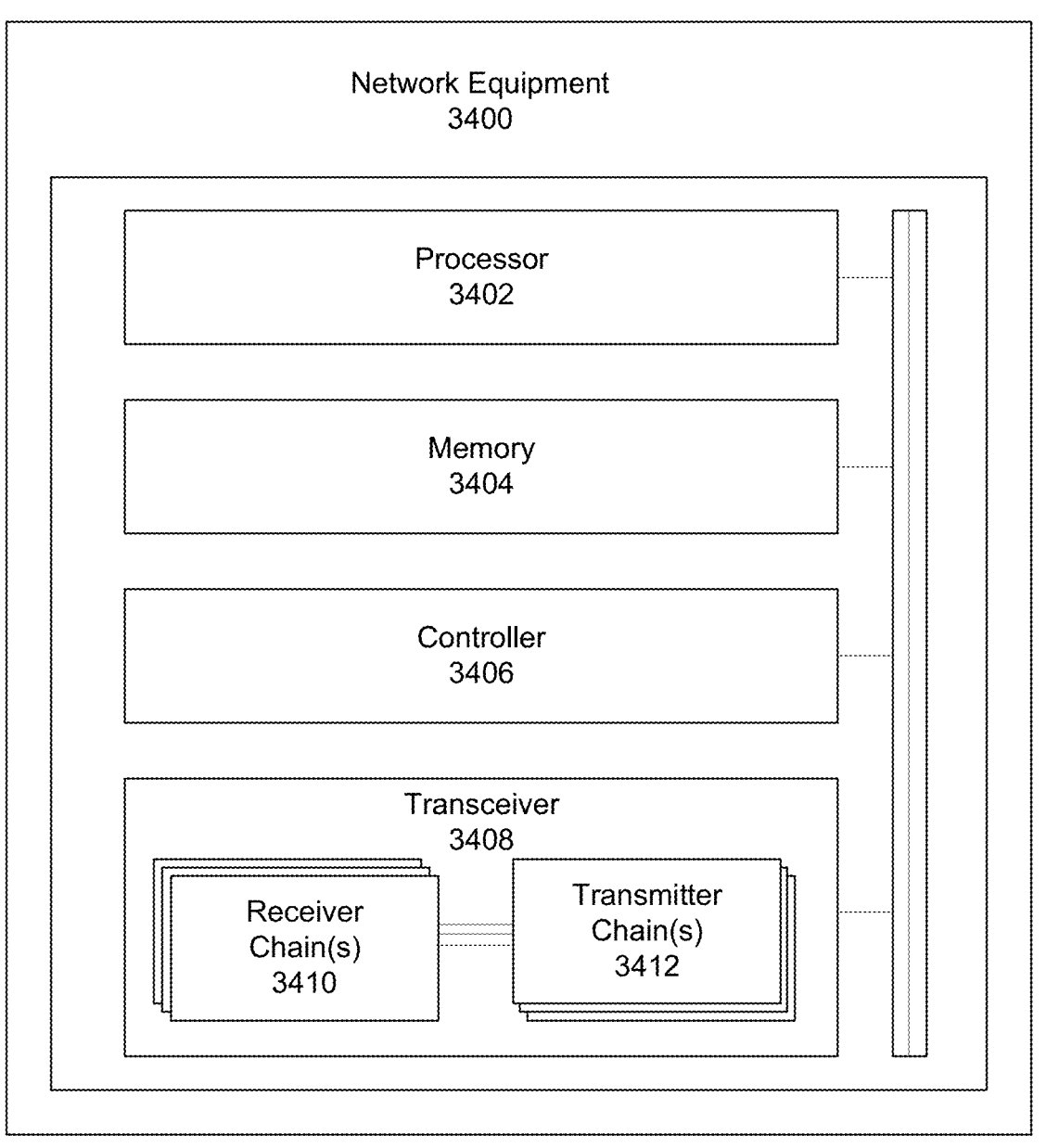
FIG. 34 illustrates an example of a network equipment (NE) in accordance with aspects of the present disclosure.

FIG. 34 illustrates an example of an NE 3400 in accordance with aspects of the present disclosure. The NE 3400 may include a processor 3402, a memory 3404, a controller 3406, and a transceiver 3408. The processor 3402, the memory 3404, the controller 3406, or the transceiver 3408, or various combinations thereof or various components thereof may be examples of means for performing various aspects of the present disclosure as described herein. These components may be coupled (e.g., operatively, communicatively, functionally, electronically, electrically) via one or more interfaces.

The processor 3402, the memory 3404, the controller 3406, or the transceiver 3408, or various combinations or components thereof may be implemented in hardware (e.g., circuitry). The hardware may include a processor, a DSP, an ASIC, or other programmable logic device, or any combination thereof configured as or otherwise supporting a means for performing the functions described in the present disclosure.

The processor 3402 may include an intelligent hardware device (e.g., a general-purpose processor, a DSP, a CPU, an ASIC, an FPGA, or any combination thereof). In some implementations, the processor 3402 may be configured to operate the memory 3404. In some other implementations, the memory 3404 may be integrated into the processor 3402. The processor 3402 may be configured to execute computer-readable instructions stored in the memory 3404 to cause the NE 3400 to perform various functions of the present disclosure.

The memory 3404 may include volatile or non-volatile memory. The memory 3404 may store computer-readable, computer-executable code including instructions when executed by the processor 3402 cause the NE 3400 to perform various functions described herein. The code may be stored in a non-transitory computer-readable medium such the memory 3404 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 3402 and the memory 3404 coupled with the processor 3402 may be configured to cause the NE 3400 to perform one or more base station functions as described herein (e.g., executing, by the processor 3402, instructions stored in the memory 3404). Accordingly, the processor 3402 may support the communication at the NE 3400 in accordance with examples as disclosed herein.

For example, the NE 3400 may be configured to support a means for. transmitting a plurality of SSB bursts within each beam frequency effective region of a plurality of beam frequency effective regions within a carrier frequency BW and in accordance with a frequency region configuration. In such implementations, each SSB burst comprises a plurality of SSBs, where the number of the plurality of beam frequency effective regions is based at least in part on a width of each beam frequency effective region.

The NE 3400 may be configured to support a means for associating a respective RO (e.g., PRACH resource occasion within the RO) with each beam frequency effective region of an SSB transmission based at least in part on the frequency region configuration. The NE 3400 may be configured to support a means for receiving a PRACH transmission from a UE, e.g., during an RO.

The NE 3400 may be configured to support a means for determining a respective beam frequency effective region corresponding to the UE (e.g., and, optionally, a corresponding SSB index) based on a PRACH configuration (and/or RACH configuration) and the PRACH transmission. The NE 3400 may be configured to support a means for establishing a connection with the UE using resources associated with the respective beam frequency effective region (e.g., a UE-selected frequency effective region corresponding to an optimal beam). For example, the NE 3400 may schedule subsequent communications via subcarriers within the respective beam frequency effective region. As another example, the NE 3400 may allocate one or more UL resources within the respective beam frequency effective region. The NE 3400 may associate the UE with the respective beam frequency effective region until another beam frequency effective region becomes optimal, e.g., due to changes in the UE's position or environment.

In some embodiments, the frequency region configuration indicates: A) a number of beam frequency effective regions; B) a RB length of one or more beam frequency effective regions; C) an RB start of a lowest-indexed beam frequency effective region; D) an RB start of a first beam frequency effective region; E) an RB start of each beam frequency effective region; F) a periodicity of the plurality of beam frequency effective regions; G) a semi-static, periodic, or aperiodic pattern of the plurality of beam frequency effective regions; or a combination thereof.

In some embodiments, the frequency region configuration indicates a first set of CD-SSBs and a second set of NCD-SSBs. In one embodiment, the plurality of beam frequency effective regions comprises non-overlapping frequency regions. In another embodiment, the plurality of beam frequency effective regions comprises one or more partially overlapping frequency regions.

In some embodiments, the NE 3400 is configured to transmit an SSB burst of the plurality of SSB bursts for each beam frequency effective region in the carrier frequency BW and based at least in part on a time shift from a reference SSB burst or a frequency shift from the reference SSB burst, or a combination thereof.

In some embodiments, a respective SSB of an SSB burst is associated with a plurality of PRACH resource occasions within a corresponding RO, where each PRACH resource occasion comprises a plurality of time-frequency resource subsets and/or PRACH preamble subsets, wherein each time-frequency resource subset and/or each PRACH preamble subset is associated with a configured beam frequency effective region. In some embodiments, the NE 3400 is configured to separately configure (e.g., indicate or broadcast to a UE) a respective SSB-to-RO mapping for each SSB Burst and ROs within each beam frequency effective region.

In some embodiments, the frequency region configuration indicates an SSB transmission pattern associated with one or more of: A) a time periodicity, a number of SSBs; B) a number of simultaneously transmitted SSBs; C) a time-frequency resources of one or more of SSBs; D) a frequency offset of an SSB to a reference subcarrier, or reference RB, or a reference SSB; E) a time gap between two adjacent SSBs; F) a frequency domain bitmap indicator for transmitted SSBs, or muted SSBs, or both; G) a time domain bitmap indicator for transmitted SSBs, or muted SSBs, or both; or a combination thereof.

In certain embodiments, the NE 3400 is configured to transmit the plurality of SSB bursts according to a sweeping pattern (i.e., a pattern for beam sweeping or beam hopping) for the plurality of beam frequency effective regions, where the sweeping pattern repeats the same SSB transmission using the same spatial filter within a one or more ROs prior to different SSB transmissions during different ROs.

In certain embodiments, the sweeping pattern comprises an interleaved pattern of the plurality of beam frequency effective regions and configured SSB bursts. In certain embodiments, the SSB transmission pattern indicates a transmission of a same SSB over two or more beam frequency effective regions at the same time.

In some embodiments, a respective beam frequency effective region corresponds to an antenna panel with an array of antenna elements. In such embodiments, the respective beam frequency effective region comprises a plurality of subcarriers having an array beam gain that satisfies a beam gain threshold. In certain embodiments, a precoder of the NE 3400 (e.g., precoding architecture of the NE 3400) comprises multiple RF chains and a number of TD units insufficient to satisfy the beam gain threshold over the carrier frequency BW.

The controller 3406 may manage input and output signals for the NE 3400. The controller 3406 may also manage peripherals not integrated into the NE 3400. In some implementations, the controller 3406 may utilize an operating system such as iOS®, ANDROID®, WINDOWS®, or other operating systems. In some implementations, the controller 3406 may be implemented as part of the processor 3402.

In some implementations, the NE 3400 may include at least one transceiver 3408. In some other implementations, the NE 3400 may have more than one transceiver 3408. The transceiver 3408 may represent a wireless transceiver. The transceiver 3408 may include one or more receiver chains 3410, one or more transmitter chains 3412, or a combination thereof.

A receiver chain 3410 may be configured to receive signals (e.g., control information, data, packets) over a wireless medium. For example, the receiver chain 3410 may include one or more antennas for receiving the signal over the air or wireless medium. The receiver chain 3410 may include at least one amplifier (e.g., a low-noise amplifier (LNA)) configured to amplify the received signal. The receiver chain 3410 may include at least one demodulator configured to demodulate the received signal and obtain the transmitted data by reversing the modulation technique applied during transmission of the signal. The receiver chain 3410 may include at least one decoder for decoding/processing the demodulated signal to receive the transmitted data.

A transmitter chain 3412 may be configured to generate and transmit signals (e.g., control information, data, packets). The transmitter chain 3412 may include at least one modulator for modulating data onto a carrier signal, preparing the signal for transmission over a wireless medium. The at least one modulator may be configured to support one or more techniques such as AM, FM, or digital modulation schemes like PSK or QAM. The transmitter chain 3412 may also include at least one power amplifier configured to amplify the modulated signal to an appropriate power level suitable for transmission over the wireless medium. The transmitter chain 3412 may also include one or more antennas for transmitting the amplified signal into the air or wireless medium.

FIG. 35 depicts one embodiment of a method 3500 in accordance with aspects of the present disclosure. In various embodiments, the operations of the method 3500 may be implemented by a base station, as described herein. In some implementations, the base station may execute a set of instructions to control the function elements of the base station to perform the described functions.

At step 3502, the method 3500 may include transmitting a plurality of SSB bursts within each beam frequency effective region of a plurality of beam frequency effective regions within a carrier frequency bandwidth (BW) and in accordance with a frequency region configuration. In such embodiments, each SSB burst comprises a plurality of SSBs, where a number of the plurality of beam frequency effective regions is based at least in part on a width of each beam frequency effective region. The operations of step 3502 may be performed in accordance with examples as described herein. In some implementations, aspects of the operations of step 3502 may be performed by an NE, as described with reference to FIG. 34.

At step 3504, the method 3500 may include associating a respective RO with each beam frequency effective region of an SSB transmission based at least in part on the frequency region configuration. The operations of step 3504 may be performed in accordance with examples as described herein. In some implementations, aspects of the operations of step 3504 may be performed by an NE, as described with reference to FIG. 34.

At step 3506, the method 3500 may include receiving a PRACH transmission from a UE during an RO. The operations of step 3506 may be performed in accordance with examples as described herein. In some implementations, aspects of the operations of step 3506 may be performed by a NE, as described with reference to FIG. 34.

At step 3508, the method 3500 may include determining a respective beam frequency effective region associated with the UE based on a PRACH configuration and the PRACH transmission. The operations of step 3508 may be performed in accordance with examples as described herein. In some implementations, aspects of the operations of step 3508 may be performed by an NE, as described with reference to FIG. 34.

At step 3510, the method 3500 may include establishing a connection with the UE using resources associated with the respective beam frequency effective region. The operations of step 3510 may be performed in accordance with examples as described herein. In some implementations, aspects of the operations of step 3510 may be performed by a NE, as described with reference to FIG. 34.

It should be noted that the method 3500 described herein describes one possible implementation, and that the operations and the steps may be rearranged or otherwise modified and that other implementations are possible.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A base station for wireless communication, comprising:
   at least one memory; and
   at least one processor coupled with the at least one memory and configured to cause the base station to:
   transmit a plurality of synchronization signal block (SSB) bursts within each beam frequency effective region of a plurality of beam frequency effective regions within a carrier frequency bandwidth (BW) and in accordance with a frequency region configuration, wherein each SSB burst comprises a plurality of SSBs, wherein a number of the plurality of beam frequency effective regions is based at least in part on a width of each beam frequency effective region;
   associate a respective random access channel (RACH) occasion (RO) with each beam frequency effective region of an SSB transmission based at least in part on the frequency region configuration;
   receive a physical RACH (PRACH) transmission from a user equipment (UE) during an RO;
   determine a respective beam frequency effective region associated with the UE based on a PRACH configuration and the PRACH transmission; and
   establish a connection with the UE using resources associated with the respective beam frequency effective region.

2. The base station of claim 1, wherein the frequency region configuration indicates:
   a number of beam frequency effective regions;
   a resource block (RB) length of one or more beam frequency effective regions;
   an RB start of a lowest-indexed beam frequency effective region;
   an RB start of a first beam frequency effective region;
   an RB start of each beam frequency effective region;
   a periodicity of the plurality of beam frequency effective regions;
   a semi-static, periodic, or aperiodic pattern of the plurality of beam frequency effective regions;
   or a combination thereof.

3. The base station of claim 1, wherein the plurality of beam frequency effective regions comprises non-overlapping frequency regions or one or more partially overlapping frequency regions.

4. The base station of claim 1, wherein the at least one processor is configured to cause the base station to transmit an SSB burst of the plurality of SSB bursts for each beam frequency effective region in the carrier frequency BW and based at least in part on a time shift from a reference SSB burst or a frequency shift from the reference SSB burst, or a combination thereof.

5. The base station of claim 1, wherein a respective SSB of an SSB burst is associated with a plurality of PRACH resource occasions within a corresponding RO, wherein each PRACH resource occasion comprises a PRACH preamble subset, and wherein each PRACH preamble subset is associated with a configured beam frequency effective region.

6. The base station of claim 1, wherein the at least one processor is configured to cause the base station to separately indicate a respective SSB-to-RO mapping for each SSB burst and RO within each beam frequency effective region.

7. The base station of claim 1, wherein the frequency region configuration indicates an SSB transmission pattern associated with one or more of:
    a time periodicity;
    a number of SSBs;
    a number of simultaneously transmitted SSBs;
    a time-frequency resources of one or more of SSBs;
    a frequency offset of an SSB to a reference subcarrier, or reference resource block (RB), or a reference SSB;
    a time gap between two adjacent SSBs;
    a frequency domain bitmap indicator for transmitted SSBs, or muted SSBs, or both;
    a time domain bitmap indicator for transmitted SSBs, or muted SSBs, or both;
    or a combination thereof.

8. The base station of claim 7, wherein the at least one processor is configured to cause the base station to transmit the plurality of SSB bursts in accordance with a beam sweeping pattern for the plurality of beam frequency effective regions, wherein the beam sweeping pattern repeats the SSB transmission using a same spatial filter and within a group of ROs prior to different SSB transmissions during different groups of ROs.

9. The base station of claim 8, wherein the beam sweeping pattern comprises an interleaved pattern of the plurality of beam frequency effective regions and configured SSB bursts.

10. The base station of claim 1, wherein the frequency region configuration indicates a first set of cell-defining SSBs (CD-SSBs) and a second set of non-cell-defining SSBs (NCD-SSBs).

11. The base station of claim 1, wherein a respective beam frequency effective region corresponds to an antenna panel with an array of antenna elements, wherein the respective beam frequency effective region comprises a plurality of subcarriers having an array beam gain that satisfies a beam gain threshold.

12. The base station of claim 11, wherein a precoder of the base station comprises multiple radio frequency (RF) chains and a number of time delay (TD) units insufficient to satisfy the beam gain threshold over the carrier frequency BW.

13. A method performed by a base station, the method comprising:
    transmitting a plurality of synchronization signal block (SSB) bursts within each beam frequency effective region of a plurality of beam frequency effective regions within a carrier frequency bandwidth (BW) and in accordance with a frequency region configuration, wherein each SSB burst comprises a plurality of SSBs, wherein a number of the plurality of beam frequency effective regions is based at least in part on a width of each beam frequency effective region;
    associating a respective random access channel (RACH) occasion (RO) with each beam frequency effective region of an SSB transmission based at least in part on the frequency region configuration;
    receiving a physical RACH (PRACH) transmission from a user equipment (UE) during an RO;
    determining a respective beam frequency effective region associated with the UE based on a PRACH configuration and the PRACH transmission; and
    establishing a connection with the UE using resources associated with the respective beam frequency effective region.

14. The method of claim 13, wherein the frequency region configuration indicates one or more of:
    a number of beam frequency effective regions;
    a resource block (RB) length of one or more beam frequency effective regions;
    an RB start of a lowest-indexed beam frequency effective region;
    an RB start of a first beam frequency effective region;
    an RB start of each beam frequency effective region;
    a periodicity of the plurality of beam frequency effective regions;
    a semi-static, periodic, or aperiodic pattern of the plurality of beam frequency effective regions;
    or a combination thereof.

15. The method of claim 13, further comprising transmitting an SSB burst of the plurality of SSB bursts for each beam frequency effective region in the carrier frequency BW and based at least in part on a time shift from a reference SSB burst or a frequency shift from the reference SSB burst, or a combination thereof.

16. The method of claim 13, wherein a respective SSB of the SSB burst is associated with a plurality of PRACH resource occasions within a corresponding RO, wherein each PRACH resource occasion comprises a PRACH preamble subset, and wherein each PRACH preamble subset is associated with a configured beam frequency effective region.

17. The method of claim 13, further comprising separately indicating a respective SSB-to-RO mapping for each SSB burst and RO within each beam frequency effective region.

18. The method of claim 13, wherein the frequency region configuration indicates an SSB transmission pattern associated with one or more of:
    a time periodicity;
    a number of SSBs;
    a number of simultaneously transmitted SSBs;
    a time-frequency resources of one or more of SSBs;
    a frequency offset of an SSB to a reference subcarrier, or reference resource block (RB), or a reference SSB;
    a time gap between two adjacent SSBs;
    a frequency domain bitmap indicator for transmitted SSBs, or muted SSBs, or both;
    a time domain bitmap indicator for transmitted SSBs, or muted SSBs, or both;
    or a combination thereof.

19. The method of claim 18, further comprising transmitting the plurality of SSB bursts in accordance with a beam sweeping pattern for the plurality of beam frequency effective regions, wherein the beam sweeping pattern repeats the SSB transmission using a same spatial filter and within one or more ROs prior to different SSB transmissions during different ROs.

20. A processor for wireless communication, comprising:
    at least one controller coupled with at least one memory and configured to cause the processor to:
        transmit a plurality of synchronization signal block (SSB) bursts within each beam frequency effective region of a plurality of beam frequency effective regions within a carrier frequency bandwidth (BW) and in accordance with a frequency region configuration, wherein each SSB burst comprises a plurality of SSBs, wherein a number of the plurality of beam frequency effective regions is based at least in part on a width of each beam frequency effective region;
        associate a respective random access channel (RACH) occasion (RO) with each beam frequency effective region of an SSB transmission based at least in part on the frequency region configuration;

receive a physical RACH (PRACH) transmission from a user equipment (UE) during an RO;

determine a respective beam frequency effective region associated with the UE based on a PRACH configuration and the PRACH transmission; and establish a connection with the UE using resources associated with the respective beam frequency effective region.

\* \* \* \* \*